United States Patent [19]

Parnell, Sr. et al.

[11] Patent Number: 6,007,229
[45] Date of Patent: Dec. 28, 1999

[54] RAPID ROBOTIC HANDLING OF MOLD PARTS USED TO FABRICATE CONTACT LENSES

[75] Inventors: Phillip King Parnell, Sr.; Victor Lust; Michael William Litwin, all of Jacksonville, Fla.

[73] Assignee: Johnson & Johnson Vision Products, Inc., Jacksonville, Fla.

[21] Appl. No.: 08/869,833

[22] Filed: Jun. 5, 1997

[51] Int. Cl.[6] .................................................. G06F 19/00
[52] U.S. Cl. ...................................... 364/468.22; 264/2.5
[58] Field of Search .................. 364/474.03, 468.22; 264/2.5; 198/345.3; 425/347; 318/568.18

[56] References Cited

U.S. PATENT DOCUMENTS

| | | | |
|---|---|---|---|
| 4,770,598 | 9/1988 | Kotani | 414/752 |
| 4,774,445 | 9/1988 | Penkar | 318/568.18 |
| 5,474,166 | 12/1995 | Santandrea et al. | 198/345.3 |
| 5,555,504 | 9/1996 | Lepper et al. | 364/468.22 |
| 5,631,028 | 5/1997 | Mizokawa et al. | 425/28.1 |
| 5,744,357 | 4/1998 | Wang et al. | 425/347 |

FOREIGN PATENT DOCUMENTS

| | | |
|---|---|---|
| 0 268 492 A2 | 5/1988 | European Pat. Off. . |
| 0 605 306 A1 | 7/1994 | European Pat. Off. . |
| 0 624 448 A1 | 11/1994 | European Pat. Off. . |
| 0 686 491 | 12/1995 | European Pat. Off. . |
| 0 686 585 | 12/1995 | European Pat. Off. . |
| 0 688 648 | 12/1995 | European Pat. Off. . |
| 0 740 998 | 11/1996 | European Pat. Off. . |
| 0 750 983 | 1/1997 | European Pat. Off. . |
| 59-086515 | 9/1984 | Japan . |
| 61 098 522 | 5/1986 | Japan . |
| 02 127 020 | 5/1990 | Japan . |
| 03 180 905 | 8/1991 | Japan . |
| 07 125 022 | 5/1995 | Japan . |
| 07024752A | 5/1995 | Japan . |
| 08 020 051 | 1/1996 | Japan . |
| 08132487 | 5/1996 | Japan . |

*Primary Examiner*—William Grant
*Assistant Examiner*—Chad Rapp

[57] ABSTRACT

A method for removing and transporting ophthalmic lens fabricating mold sections from a molding device to an inert chamber in a predetermined time, controlled by a central processor, is disclosed. The method includes starting a timer upon opening the molding device and exposing the mold sections; actuating a robotic arm to transport the mold sections from the molding device to an intermediate position using a compound movement; actuating a cam-controlled arm to transport the mold sections from the intermediate position to a pallet held on a conveyor belt at a cam-arm pre-part release location; and releasing the pallet to move on the conveyor belt to the inert chamber for continued transport of mold containing pallets to a treatment or processing facility for producing and/or packaging of the contact lenses. The method also includes raising a nest to receive the mold sections at the intermediate position; and lowering the nest, after transfer thereon of the molded sections from the robotic arm, for transferring the molded sections to the cam-controlled arm. In a racetrack mode, the pallets continue moving into the inert chamber, while the molded sections are discarded. In a sample mode, a sample bin is moved to the discard location to collect a sample of the molded sections.

22 Claims, 44 Drawing Sheets

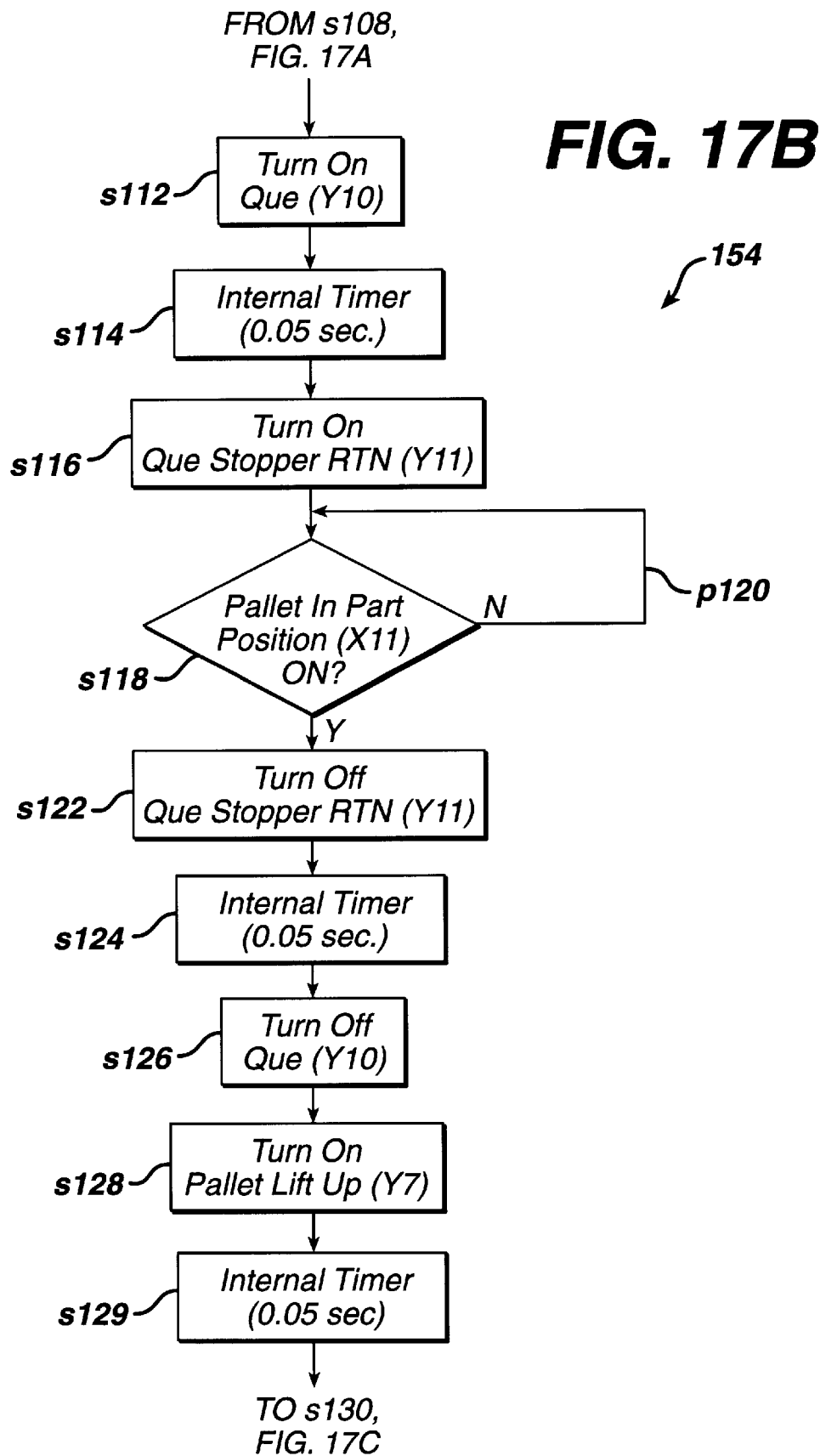

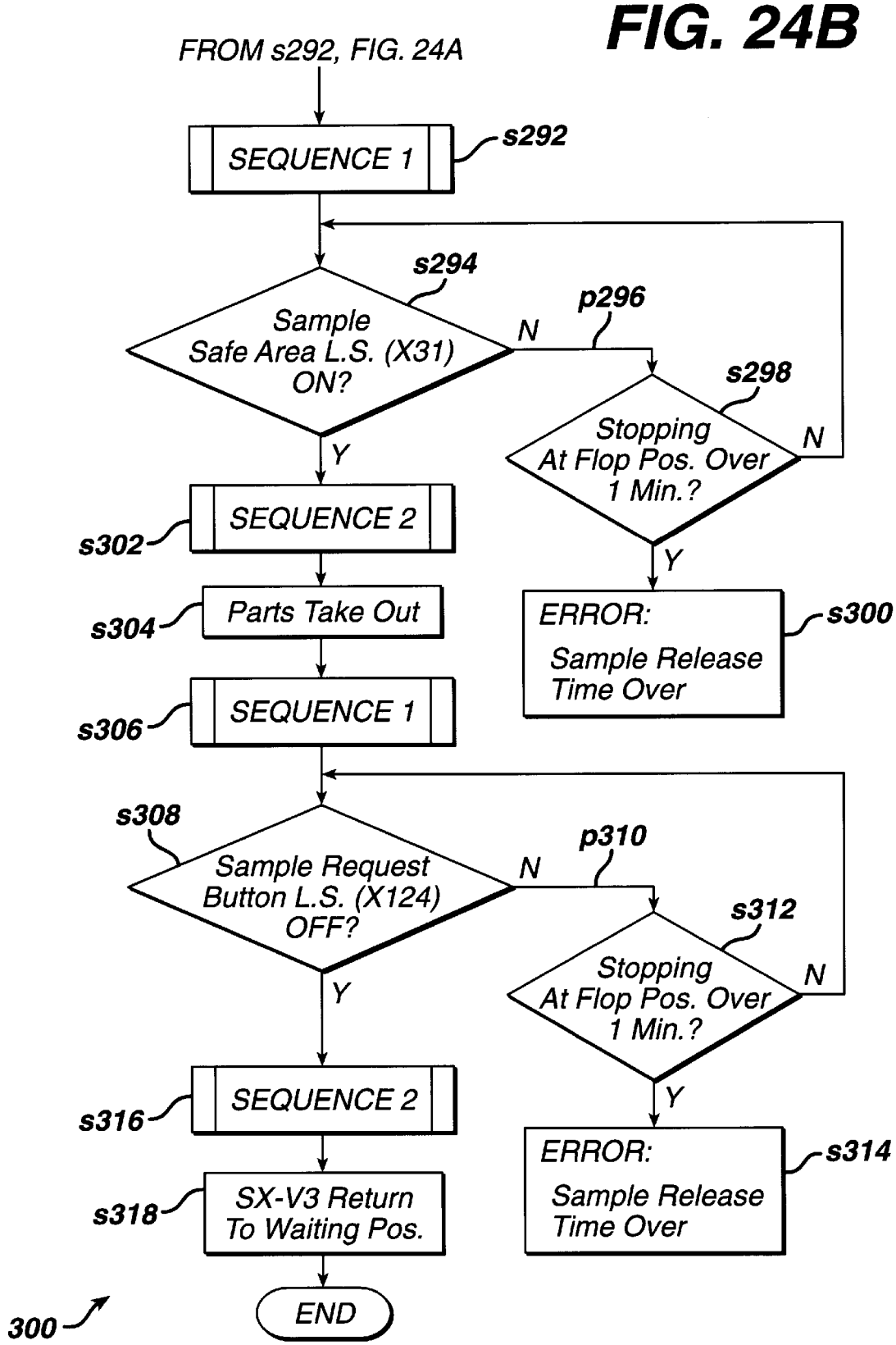

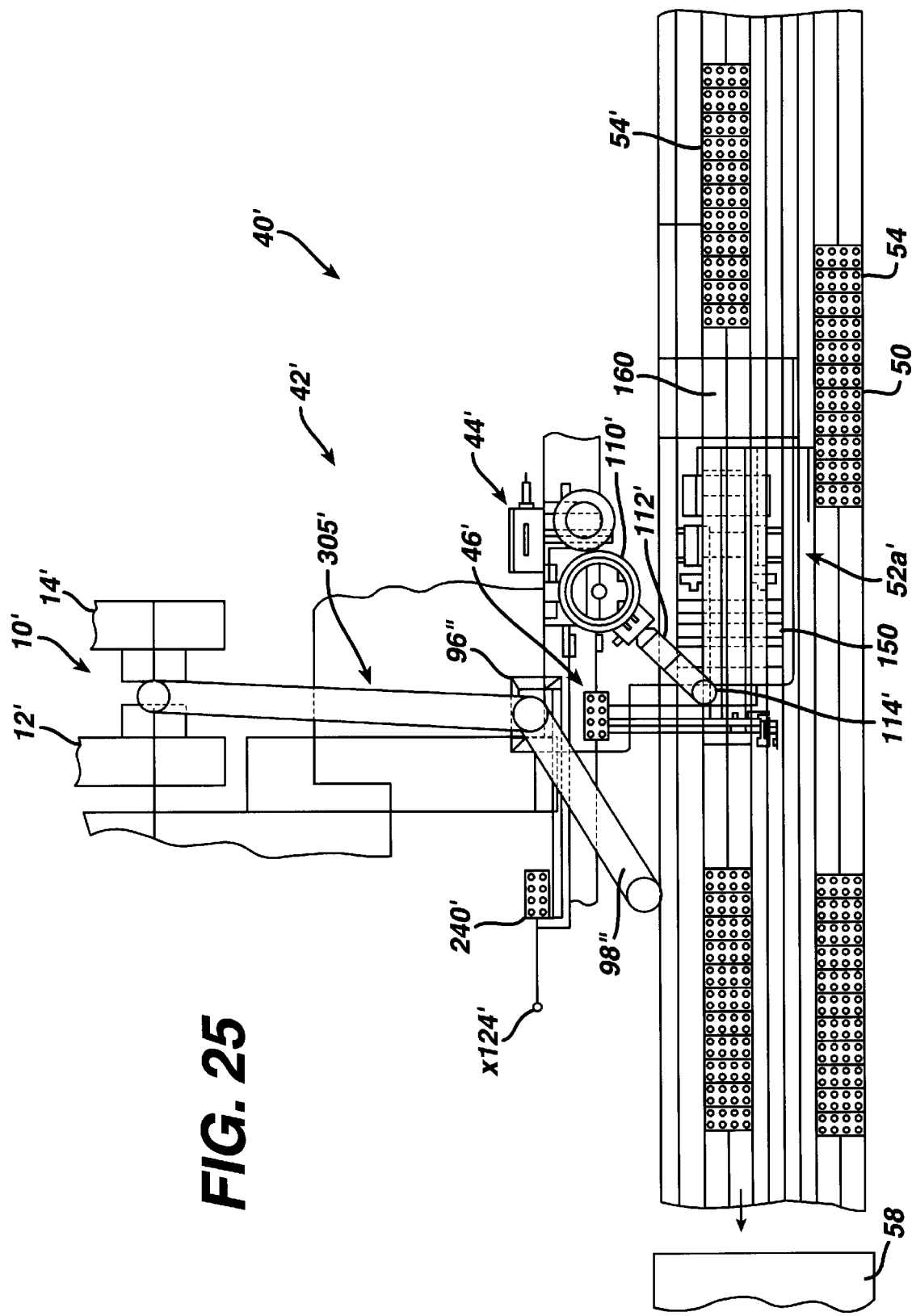

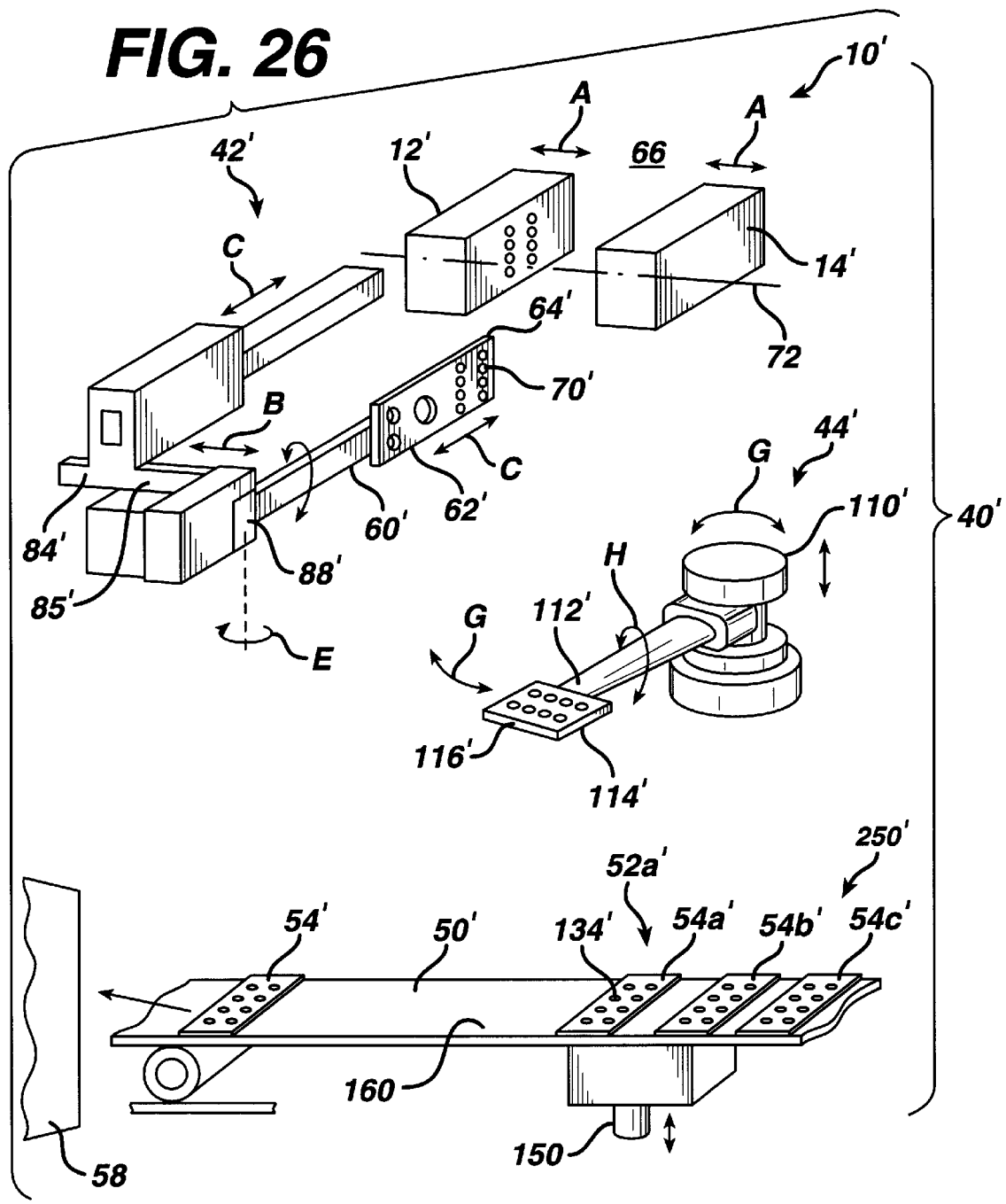

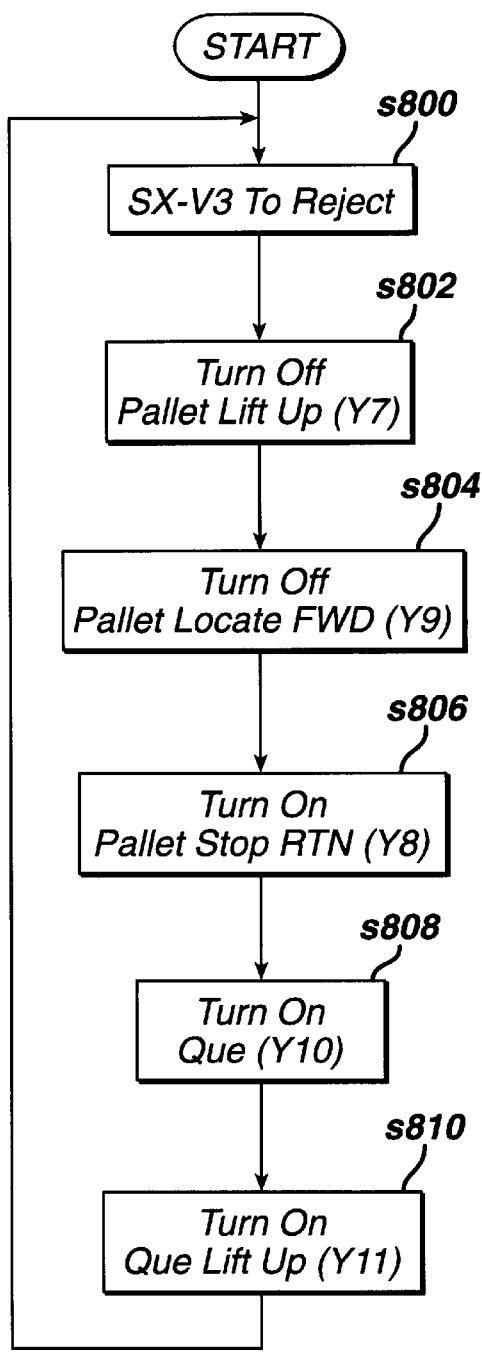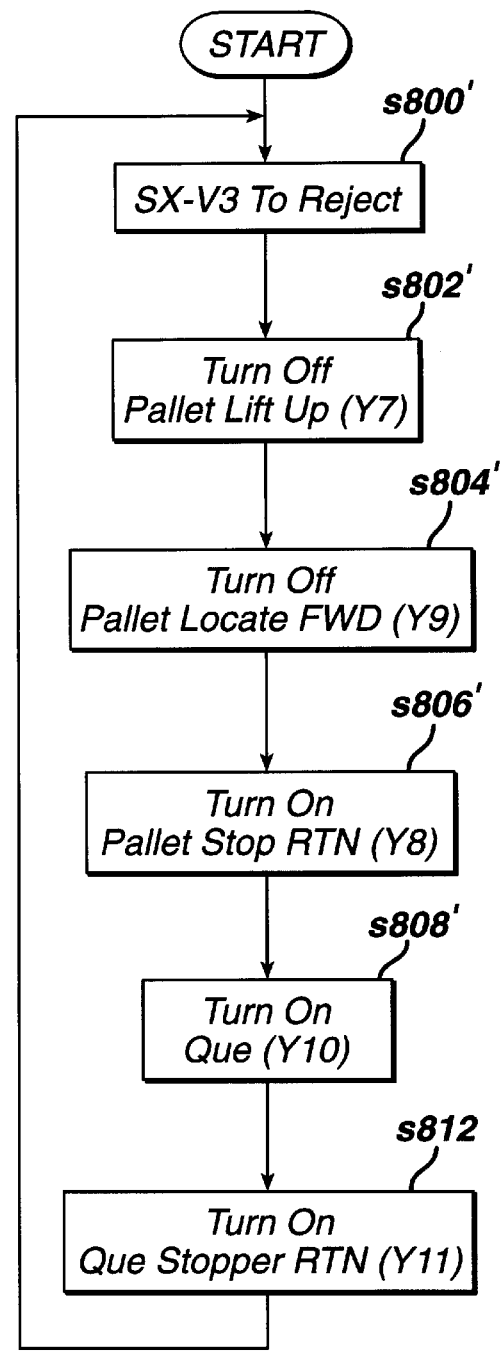

RAPID ROBOTIC HANDLING OF MOLD PARTS USED TO FABRICATE CONTACT LENSES

BACKGROUND OF THE INVENTION

1. Field of the Invention

The present invention relates, in general, to a method for rapid robotic handling of small articles removed from molds. More specifically, the present invention pertains to such a method which is particularly well suited for removing the articles from a molding machine having molds in which they are molded, and thereafter carrying the articles within a very short period of time away from the molds and depositing the articles for further processing in a high speed, automated production system.

2. Description of the Prior Art

Recently, attention has been directed by industry toward economically forming large quantities of high-quality contact lenses in a precisely operating, high-speed automated molding system. In such a lens molding system, each lens is formed by sandwiching a monomer in an interspace which is present between front and back mold sections, normally identified as, respectively, front and base or back curves. The monomer is polymerized to form a contact lens, which is then removed from the mold sections, further treated and then packaged for consumer use.

The mold sections used in the above-mentioned process may themselves be formed through the intermediary of injection molding or compression molding processes. These mold sections may be made from the family of materials consisting of thermoplastics; for example, preferably such as polystyrene, which has been determined to constitute an excellent material for making these mold sections. Polystyrene does not chemically react with the hydrophilic material normally employed to make the contact lenses; for instance, such as hydroxy ethylene methacrylate (HEMA). Therefore, it is possible to form very high quality contact lenses of that type of material in polystyrene molds. In addition, polystyrene is widely available in industry and commerce and, as a result, is relatively inexpensive. Because of the ease and low cost with which polystyrene mold sections may be produced and then employed to mold contact lenses, each pair of complementary front and base curve polystyrene mold sections is typically used only a single time in order to mold only one contact lens, and may then be discarded or recycled for other uses.

In the above-discussed automated contact lens production system, it is desirable to eliminate or to minimize any exposure to oxygen of the hydrophilic monomer used for the manufacture of the contact lenses. Correspondingly, it is desirable to eliminate or minimize the exposure of the lens mold sections to oxygen. Therefore, when the polystyrene mold sections are formed and then used for the purpose of making contact lenses in the above-discussed manner, it is desirable to rapidly transfer these mold sections from the mold in which they are made to a low oxygen (preferably nitrogen) environment. It has been difficult to achieve the desired transfer speed with conventional robot assemblies or controls because presently available robots do not move with adequate rapidity and precisely enough to enter into, and exit from, the molding apparatus at the desired rate of speed in effectuating the removal of the molded articles. In particular, if these robots are operated at the necessary rate of speed, they tend to waffle and shake or vibrate undesirably as they come to a sudden stop, and the movements of the robot are resultingly not sufficiently precise. On the other hand, if the robots are slowed down so as to be able to move more precisely, the robots no longer possess the desired speed to facilitate the contact lens mass-producing process.

Moreover, in the above-mentioned automated contact lens production system, the contact lens mold sections may not be fully solidified when they are ejected or removed from the mold in which they are formed. It is, therefore, important that any robot or apparatus which is used to carry the contact lens-forming mold sections away from that mold will not interfere so as to adversely affect the desired optical qualities of the contact lens mold sections. In particular, it is important that any such robot or apparatus be capable of absorbing the kinetic energy of the lens mold sections as they are being transferred to such transporting robot or apparatus without deleteriously altering the shape, form or dimensions of the lens mold sections. The robot and mold transfer method employed must, likewise, be able to transport the lens mold sections in a manner that permits those lens mold sections to cool and completely harden in a desired manner.

In addition, in order to maximize the optical quality of the contact lenses, it is preferred that the optical surfaces of the front and base curve polystyrene mold sections; that is, the surfaces of those mold sections which touch or lie against the hydrophilic monomer as the lens preform is being molded, not be engaged or contacted by any mechanical handling equipment while the mold sections are being transported by and positioned in the lens molding system.

In order to achieve the foregoing kind of transport system, pursuant to the disclosure of copending U.S. patent application Ser. No. 08/258,267 now U.S. Pat. No. 5,681,138, there is described an apparatus for removing and transporting ophthalmic or contact lens mold sections from a mold, and which generally comprises first, second and third assemblies. The first assembly removes the lens mold sections from the mold and transports the lens mold sections to a first location, the second assembly receives the lens mold sections from the first assembly and transports the lens mold sections to a second location, and the third assembly receives the lens mold sections from the second assembly and transports the lens mold sections to a third location. Preferably, the first assembly comprises a hand including vacuum structure to receive the lens mold sections from the mold and to releasably hold the lens mold sections, and a support subassembly connected to the hand to support the hand and to move the hand between the mold and the first location.

The second assembly preferably includes a support frame, a platform to receive the lens mold sections from the first assembly and supported by the support frame for movement between the first and second locations, and moving means for moving the platform along the support frame and between these first and second locations.

The preferred design of the third assembly includes a transport subassembly and a support column. The transport subassembly receives the lens mold sections from the second assembly, releasably holds those lens mold sections, and carries the lens mold sections to the third location; and the support column supports the transport subassembly for movement between the second and third locations.

In an effort designed to simplify and provide further improvements on the foregoing transport apparatus, alternative embodiments have been developed more recently, as disclosed in copending U.S. patent application Ser. No. 08/431,884 now U.S. Pat. No. 5,540,543, which discloses an apparatus for removing and transporting articles, such as ophthalmic contact lens mold sections, or primary contact lens packaging elements, such as the base members of blister packages, from a mold. The apparatus, in one embodiment thereof, which is employed in the manufacture of lens mold base curves, includes first, second, and third assemblies; the first of which removes the articles from the molding station at a first location and transports them to a second location; the second assembly receives the articles from the first assembly and transports them to a third location, and the third assembly receives the articles from the second assembly and transports them to a fourth location.

A second embodiment of the apparatus which is used in the forming of lens mold front curves additionally includes a flipper assembly disposed between the first and third assemblies, which flipper assembly receives the articles from the first assembly and inverts them before depositing them onto the third assembly. This second embodiment is useful in conjunction with molded articles which are transported to the flipper assembly in an inverted position.

A third embodiment, which produces primary packaging components, such as the base members of blister packages for housing the contact lenses, includes second and third assemblies which further include means for altering the relative spacing between the articles while the articles are being transported.

Although the foregoing embodiments and operative versions of the apparatus, as elucidated in the aforementioned copending U.S. patent applications, are employable in providing the molded components constituting mold sections for forming contact lenses, and also primary package elements for contact lenses, such as the contact lens-receiving base members of blister packages, there are problems associated with vibration, speed and rejection of molded components overly exposed to oxygen. The numerous operating and transfer assemblies and stations which are required for transporting the molded components at high rates of speed from the molding installation in which they are formed to their ultimate depositions onto pallets for further treatment, such as in a low oxygen or nitrogen atmosphere, are of considerable complexity, subject to waffling and vibration and rendering the efficacy of producing acceptable articles difficult to maintain as a result of the multiplicity of operative apparatus components, and transfer and transport paths employed in the various apparatus embodiments. For example, numerous programmable logic controllers (PLCs) used to individually control various sections of the assemblies and stations prevent increasing operating speeds and reducing oxygen exposure time. This is due, for example, to the time needed for the PLCs to communicate with each other or with other PLCs of downstream or upstream assemblies.

SUMMARY OF THE INVENTION

Pursuant to the present invention, there is contemplated a simplified method that increases speed of operation of assemblies for transferring and transporting high quality articles which have been molded, such as contact lens mold sections and primary package elements for contact lenses. This is achieved by replacing various programmable logic controllers (PLCs) by a supervisory microprocessor that increases communication and synchronization between the molding apparatus and an ultimate conveyance element, such as a pallet, for transporting these molded articles into a nitrogen or low oxygen environment or other desired location for further processing.

The object of the present invention is to provide a computer controlled method for removing and transporting ophthalmic lens fabricating mold sections from a molding device to an inert chamber in a predetermined time that eliminates the problems of conventional methods.

Another object of the present invention is to provide a method that eliminates various programmable logic controllers (PLCs).

Yet another object of the present invention is to provide a method that reduces response time in processing molded components, and quickly determining and discarding unacceptable molded components without disrupting the continuous operation of assemblies, including upstream and downstream assemblies.

A further object of the present invention is to provide a method that includes rapid communication with upstream and downstream assemblies, and precise high speed, as well as vibration and shock free, movement to transfer among the various assemblies molded articles, which may not yet be completely cured or hardened, without causing undue plastic deformations of the articles.

A still further object of the present invention is to provide a method that includes multi-tasking, where various tasks are controlled by a supervisory microprocessor.

An additional object of the present invention is to provide a method that accurately determines total oxygen exposure time to correctly reject overly exposed mold components, and rapidly remove and transport articles made from the family of thermoplastics, such as polystyrene, from a mold in which those articles are made through the intermediary of sophisticated robotics, into a low oxygen environment of an automated contact lens molding system, within a period or time interval of only a few seconds.

A still further object of the present invention is to provide a method that removes a plurality of discrete molded articles from a mold with the molded articles arranged in a matrix array, and to selectively either preserve that matrix array during subsequent handling of the molded articles, or reorient the matrix and the relative spacing of the molded articles therein according to a second predetermined matrix prior to being transported to a further locale.

These and other objects of the inventions are achieved by a method by a central processor controlled for removing and transporting ophthalmic lens fabricating mold sections from a molding device to an inert chamber in a predetermined time comprising the steps of:

starting a timer upon opening the molding device and exposing the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location; and releasing the pallet to move on the conveyor belt to the inert chamber.

A further step includes identifying molded articles as unacceptable when the pallet enters the inert chamber in a time that exceeds the predetermined time.

The robotic arm actuating step includes the steps of:

accelerating the robotic arm along a curvilinear path from a waiting position to an opening in the molding device in a synchronism with the opening of the molding device, in accordance with acceleration parameters stored in a memory of a central processor; and decelerating the robotic arm after an acceleration time stored in the memory, where the robotic arm is approximately in the opening of the molding device, to provide a damping effect for allowing transfer of the mold sections from the molding machine to the robotic arm.

A further embodiment includes the steps of:

generating control parameters for a plurality of motors to effectuate a curvilinear motion of the robotic arm between the waiting position and the opening of the molding device;

storing the control parameters in the memory of the central processor;

opening the molding device and exposing the mold sections;

accelerating the robotic arm along a curvilinear path from the waiting position to the opening in the molding device in a synchronism with the opening of the molding device, in accordance with the control parameters stored in the memory; and decelerating the robotic arm when the robotic arm is approximately in the opening of the molding device, to provide a damping effect for allowing transfer of the mold sections from the molding machine to the robotic arm.

Illustratively, the control parameters for each of the motors include acceleration and deceleration parameters, and acceleration and deceleration time parameters.

Additional steps includes raising a nest to receive the mold sections at the intermediate position; lowering the nest after transfer thereon of the molded sections from the robotic arm; and transferring the molded sections from the lowered nest to the cam-controlled arm. A further step includes, in the case the mold sections are primary package molds for example, actuating cylinders to rotate and resize the mold sections.

The cam-controlled arm movement includes moving the cam-controlled arm to the intermediate position; lowering the cam-controlled arm to pick the molded sections from a nest that receives the mold sections from the robotic arm; raising the cam-controlled arm up to the intermediate position after picking the molded sections from the nest; moving the cam-controlled arm to the pallet; lowering the cam-controlled arm while raising the pallet from the cam-arm pre-part release location to a cam-arm part release location; and transferring the molded sections from the cam-controlled arm to the pallet.

Alternatively, the cam-controlled arm movement includes moving the cam-controlled arm to a first position aligned with the intermediate position at a center height of the cam-controlled arm which is lower than the intermediate position; raising the cam-controlled arm to the intermediate position from first position to pick the molded sections from the robotic arm; moving the cam-controlled arm down from the intermediate position to the first position after picking the molded sections; relocating the cam-controlled arm along the center height to a second position aligned with the cam-arm pre-part release location; lowering the cam-controlled arm to the cam-arm part release location; raising a pallet from the cam-arm pre-part release location to the cam-arm part release location; and transferring the molded sections onto the pallet. Illustratively, the relocating step further includes rotating the cam-controlled arm by approximately 180° around an axis longitudinal thereto.

Initializing the robotic and cam-controlled arms are performed, as needed, to position them collision free zones.

With respect to the pallet that receives the molded articles for transport to the inert chamber on the conveyor belt, the following steps are performed:

raising the pallet from the cam-arm pre-part release location to the cam-arm part release location;

transferring the molded sections from the cam-controlled arm to the pallet; and lowering the pallet containing the molded section from the cam-arm part release location to the cam-arm pre-part release location.

Prior to the pallet releasing step, the following steps may be performed: actuating a pallet stop device to stop the pallet at the cam-arm pre-part release location; actuating a lift to raise the pallet held at the cam-arm pre-part release location by the pallet stop device in order for the pallet to receive the molded articles from the cam-controlled arm; and actuating a pallet locate device to hold the raised pallet at the cam-arm release location.

Pallets may be held in a que upstream from the pallet that receives the molded articles from the cam-controlled arm located at the cam-arm pre-part release location; and released one at a time to proceed to the cam-arm pre-part release location. Releasing these pallets in the que includes actuating a cylinder that simultaneously releases a first pallet in the que and holds a second pallet.

Alternatively two cylinders are used to release the pallets in the que one at a time. In this case, the following steps are performed: actuating a first cylinder which holds the first pallet located in the que; and actuating a second cylinder which releases the second pallet located downstream from the first pallet.

In a racetrack mode, actuating the robotic arm transports the mold sections from the molding device to a discard bin for discarding the molded articles, while empty pallets move on the conveyor belt to the inert chamber. Similarly, in a sample mode, actuating the robotic arm transports the mold sections from the molding device to a sample pallet located at the discard bin location, where the sample pallet is moved from a standby position to the discard location for receiving the mold sections from the robotic arm.

In another embodiment, whether a first pallet is located in a que position of the conveyor belt is determined. When the first pallet is located in the que position, then the robotic and cam-controlled arms are actuated.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 25 illustrates a schematic plan view of a front curve transport apparatus according with the present invention;

FIG. 26 illustrates a diagrammatic perspective view of the apparatus of FIG. 25 according with the present invention;

FIG. 42 illustrates a flow chart of a racetrack mode sequence for primary package mold sections according with the present invention; and FIG. 43 illustrates a flow chart of a racetrack mode sequence for front and back curve mold sections according with the present invention;

DETAILED DESCRIPTION OF THE PREFERRED EMBODIMENTS

Figure 1:
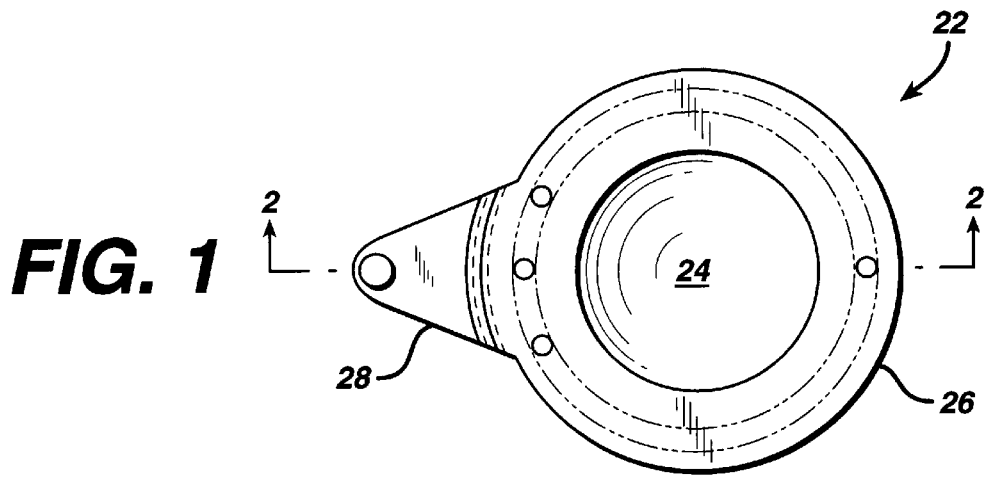
FIG. 1 illustrates a plan view of a front curve adapted to be removed and transported from a molding machine by an apparatus in accordance with the present invention.
Figure 2:
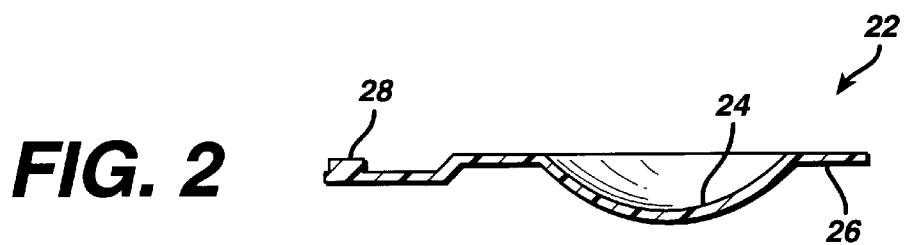
FIG. 2 illustrates a sectional view taken along line 2—2 in FIG. 1.

Disclosed hereinbelow are embodiments of methods that relate to the removal of molded articles which are used in the fabrication and/or packaging of contact lenses, and which are transported at regular intervals from a molding installation to a first location, and thereafter to a second location for the subsequent disposition of the articles, such as deposition onto pallets on a conveyor system for further treatment or processing. As such, the present application incorporates, by reference, the specification and disclosure of U.S. patent application Ser. No. 08/654,399, to Parnell et al., for "Apparatus And Method For Removing And Transporting Articles From Molds", which is a continuation-in-part of U.S. patent application Ser. No. 08/431,884, which is a continuation-in-part of U.S. patent application Ser. No. 08/258,267 (Attorney Docket Nos. VTN-329, VTN-192 and VTN-78). In addition, U.S. patent application Ser. No. 08/258,654 to Martin, et al. (Attorney Docket No. VTN-0092) for "Consolidated Contact Lens Molding" is also incorporates herein by reference.

The present invention is particularly suited for carrying out the above-identified functions in the transporting of the molded articles in an improved manner and simpler mode than through the use of prior or currently employed devices and assemblies. For example, the present invention eliminates various programmable logic controllers (PLCs). This eliminates time needed for communication between the PLCs, thus reducing response time in processing the molded components, and quickly determining and discarding unacceptable molded components without disrupting the continuous operation of assemblies, including upstream and downstream assemblies.

Instead of the conventional PLCs, a supervisory microprocessor is used for multi-tasking. In addition, exposure time of the molded articles to air or oxygen is determine in series using a timer, for example, instead of adding several partial exposure times counted by several timers associated with the various conventional PLCs. This increases accuracy of exposure time and determination of overly exposed mold components for rejection. The timer may be implemented by hardware, or preferably by software instruction to the supervisory processor, which may be a microprocessor or a computer, for example. Thus, in contrast to conventional methods, the present invention increases speed of operation while preventing rejection of proper molded components that were rejected using conventional methods due to incorrect and inaccurate determination the exposure time.

The following descriptions, with references to the corresponding figures as detailed hereinbelow, set forth the salient features and elements of essentially three distinct but inventively interrelated embodiments of the present invention. The first embodiment is directed to the removal from a molding installation and transportation of back curve mold halves for the formation of ophthalmic or contact lenses. FIGS. 6–21 are related to the fabrication of back curve mold halves. The second embodiment is directed to the removal and transportation of front curve mold halves which are designed to eventually mate with the back or base curves mold halves. FIGS. 25–32 are related to the fabrication of front curve mold halves. The third embodiment is directed to the removal from the molding installation and transportation of molded contact lens packaging elements, such as the base members for contact lens blister packages, referred to as primary packages. FIGS. 33–41 are related to the fabrication of primary packages molds.

The process of fabricating contact lenses, in a manner regarding which the present invention is extremely useful, comprises creating a pair of mold halves, between which a liquid monomer may be disposed, shaped into a lens, and subsequently irradiated to prompt sufficient cross linking to impart appropriate structural integrity to the lens. The mold half sections which are used in creating the lenses are themselves molded; the molding process being especially intolerant of irregularities to the optical perfection required of the surfaces. The mold sections are created in a rapid injection molding machine which produces a multiplicity of mold sections every 2.5 to 6 seconds, for example.

Figure 4:
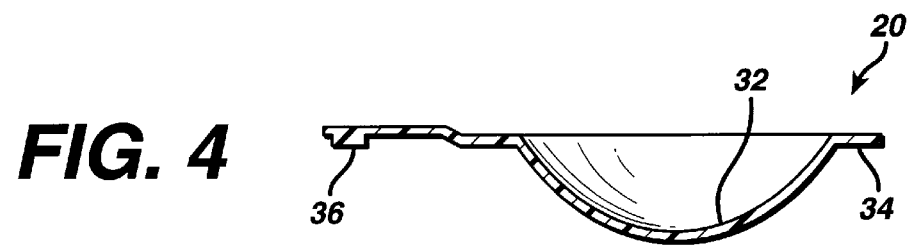
FIG. 4 illustrates a sectional view taken along line 4—4 in FIG. 3.
Figure 5:
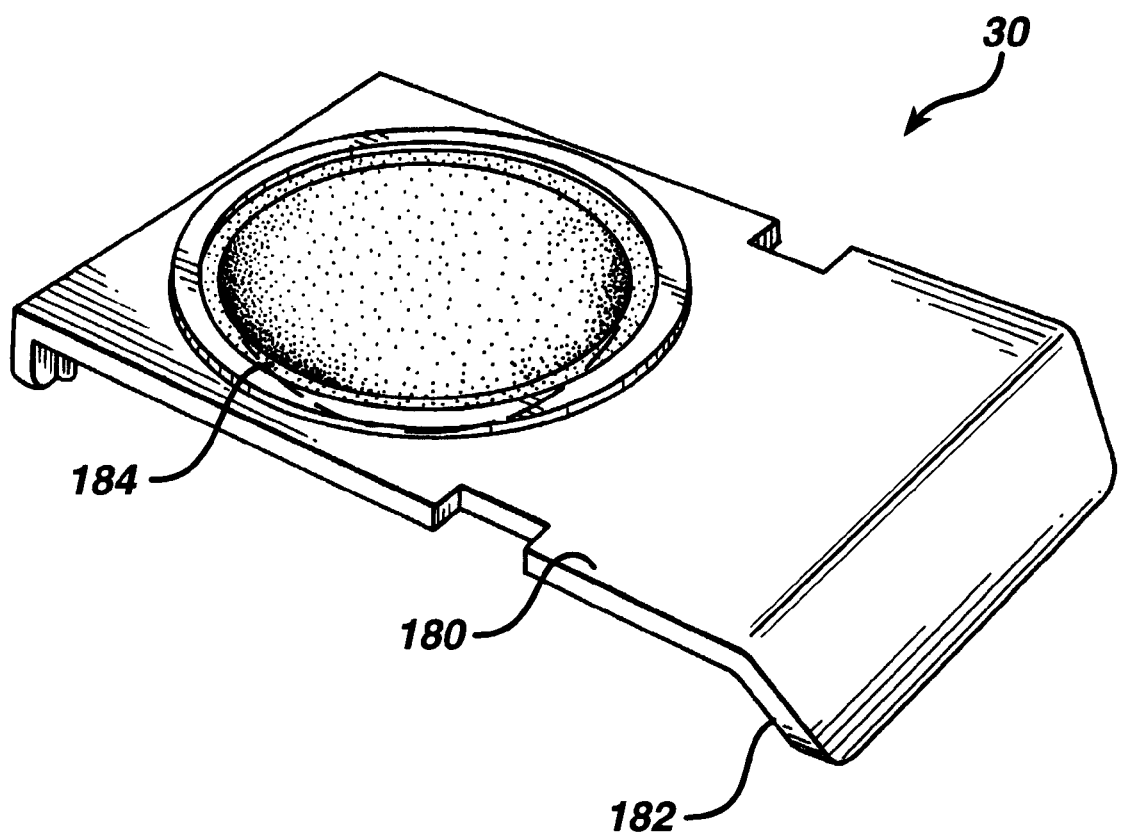
FIG. 5 illustrates a perspective view of a typical primary package base member.
Figure 6:
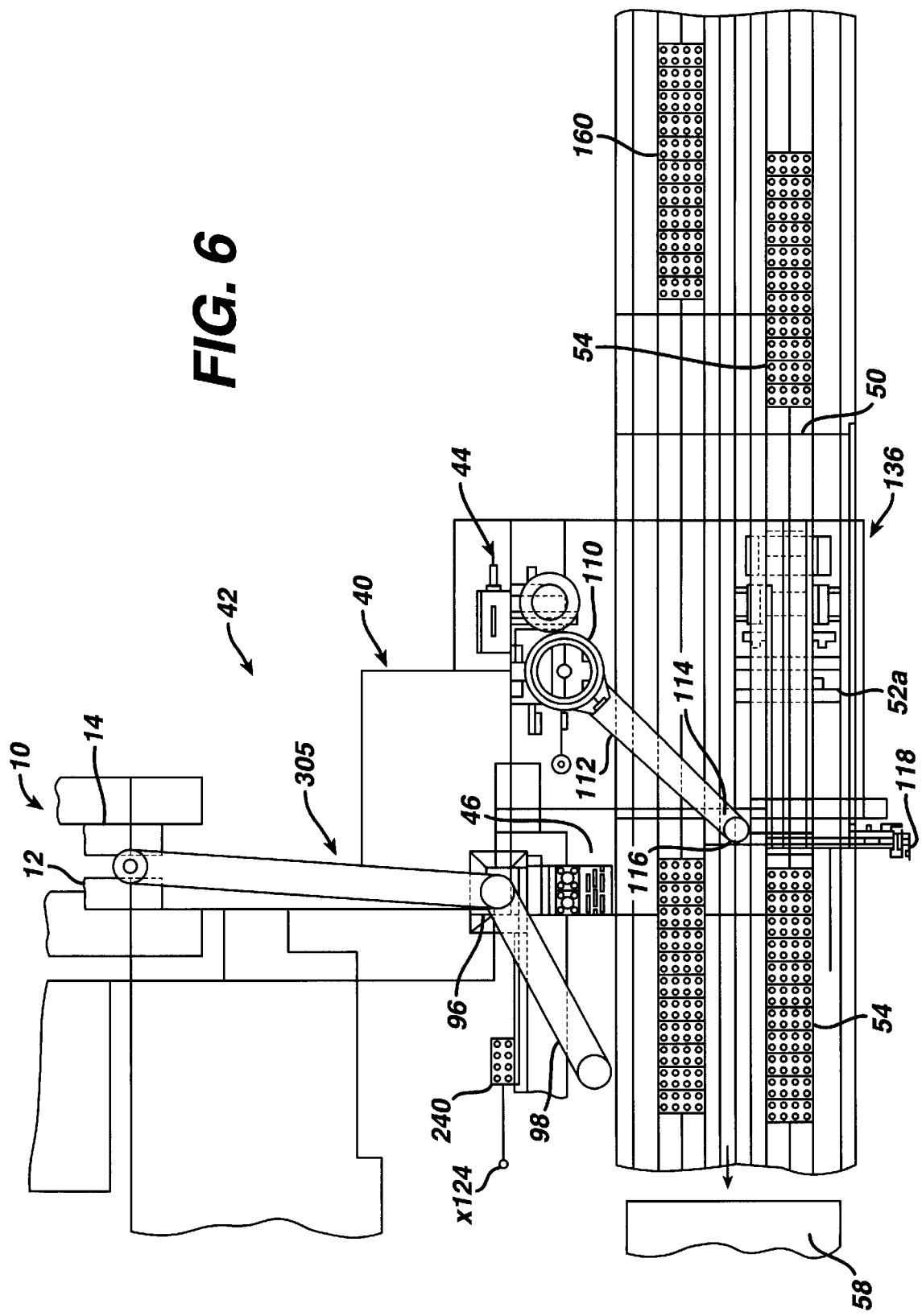
FIG. 6 illustrates a schematic plan view of a base curve transport apparatus according with the present invention.
Figure 7:
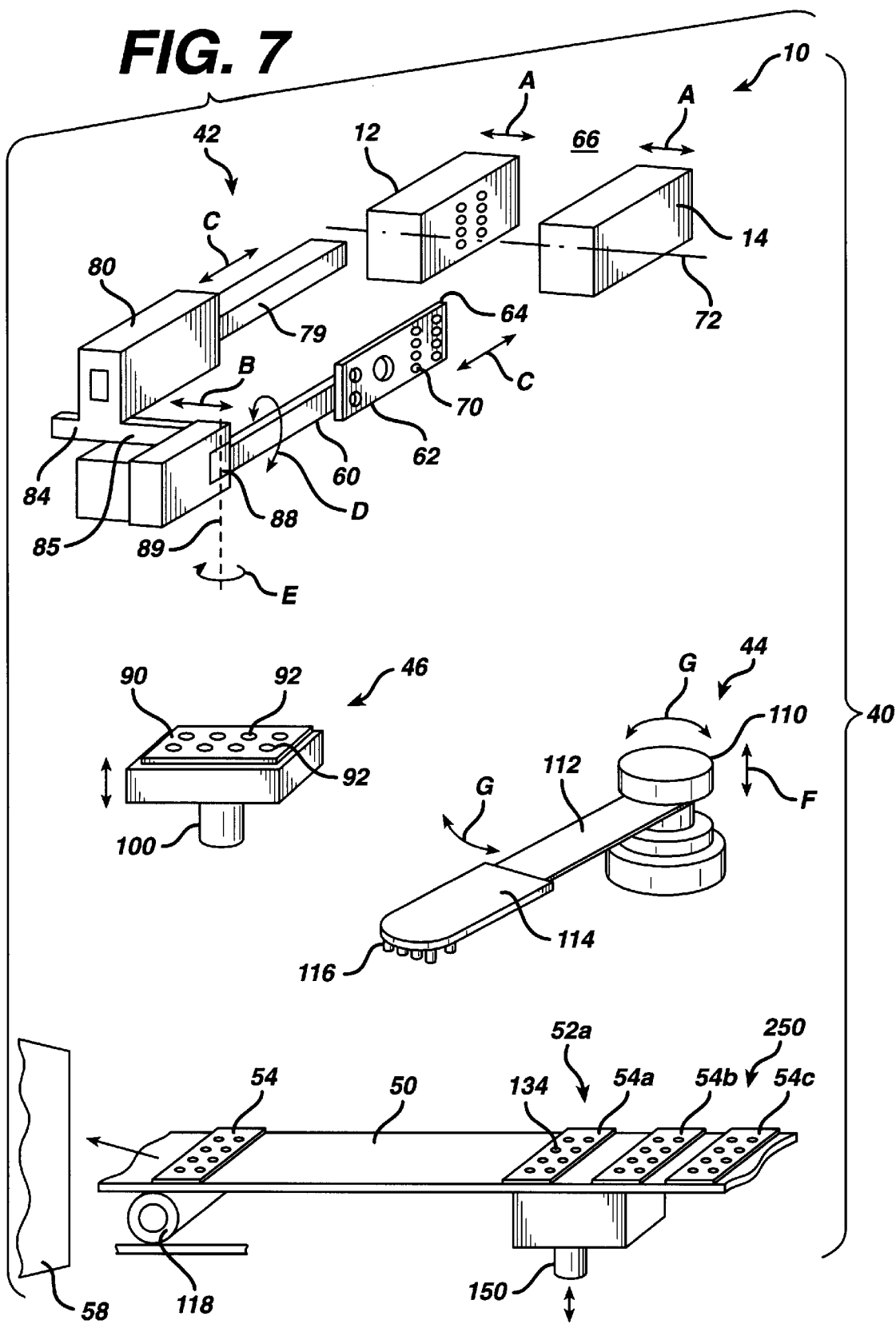
FIG. 7 illustrates a diagrammatic perspective view of the apparatus of FIG. 6 according with the present invention.

A molding machine 10, as illustrated diagrammatically in the various drawings, such as FIGS. 6–7, comprises two opposing elements 12, 14 which interface to shape the back or front mold halves 20, 22, or the primary package molds 30, shown in FIGS. 1–5. One of the two elements 12, 14 has an array of regularly spaced concave recesses, while the opposing element has a corresponding array of convex protuberances, and with concave recesses and convex protuberances defining, therebetween, a shaped volume for producing mold half sections 20, 22, or primary package molds 30, shown in FIGS. 1–5. A more detailed description of the molding machine, in conjunction with which the present invention is utilized, may be found in copending U.S. patent application Ser. No. 08/257,785 for "Mold Halves and Molding Assembly for Making Contact Lenses" (Attorney Docket No. VTN-079), the disclosure of which is incorporated In n by reference.

In operation, first the opposing elements 12, 14 come together. Next, the material of the mold halves 20, 22 or the primary package molds 30, for example, molten polymer, is injected into the shaped volumes between the surfaces of the opposing elements 12, 14. The mold halves 20, 22 or the primary package molds 30 are held for a period of time sufficient to set their shapes.

Figure 3:
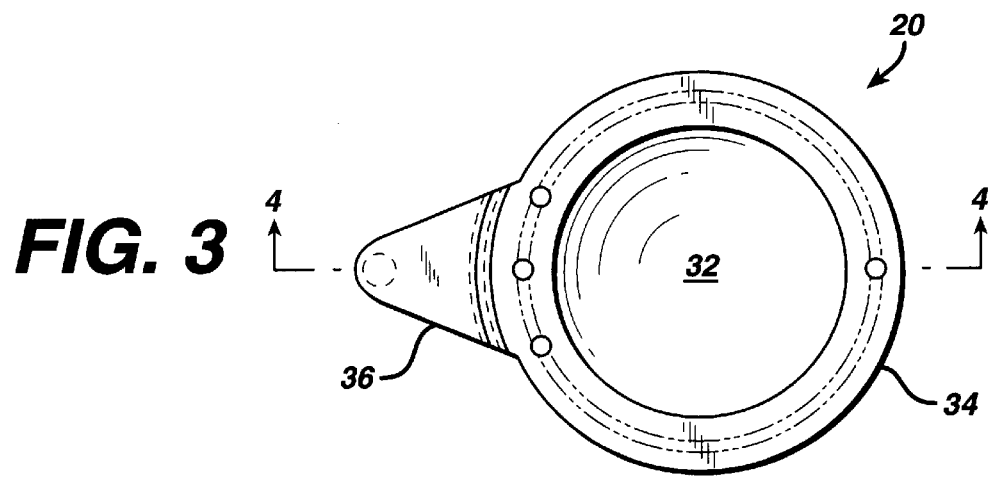
FIG. 3 illustrates a plan view of a base or back curve.

FIGS. 1 to 4 show, respectively, front and base or back curve mold sections 20, 22 which are used in the manufacture of contact lenses. FIGS. 3 and 4 are top and side views, respectively, of a back curve mold section 20. The back curve mold section 22 includes a central lens shaping curved portion 32, an annular flange portion 34, and a tab 36.

Because, in the case of the back curve, the central curved portion is used to form or shape the back curve or surface of a contact lens, it is desirable to minimize direct contact therewith. Therefore, the flange and tab portions 34, 36 are used to facilitate handling and positioning of the molded article. The simultaneous molding of the curve surface with the annular flange 34 and tab portions 36 has an additional manufacturing benefit in that it optimizes the injection molding process.

Preferably, the base and front mold sections 20, 22 are each integrally molded from a plastic material from the family of thermoplastics, such as polystyrene or another suitable material. Illustratively, each mold section 20, 22 has a thickness of 0.8 mm and 0.6 mm, respectively. Preferably, the thickness and rigidity of each mold section 20, 22 allow the mold section to effectively transmit light and withstand prying forces, which are applied to separate the mold sections from the mold in which those sections were made. The mold sections are also described in detail in the above-referenced copending U.S. patent application Ser. No. 08/257,758.

Once the shape of the base and front mold halves 20, 22, or of the primary package 30, has been set, the opposing elements 12, 14 of the molding machine 10 (FIGS. 6–7) separate and the mold halves 20, 22, or the primary package 30, are removed. The back curve mold half 20 is referred to as such because it provides the convex optical mold surface which shapes the portion of the contact lens which contacts the eye. In contrast, the front curve mold half 22 is so called, because it provides the concave optical surface which molds the front face of the lens.

In accordance with methods set forth to maintain optimal optical surface integrity, the molding machine 10 which produces the back curve mold sections is designed specifically so that upon separation of elements 12 and 14, the non-optically relevant, concave surfaces of the mold halves are exposed (the convex surfaces remaining within the concave recesses).

While the molding machine 10' (FIGS. 25–26) which produces the front curve mold sections 22 (FIGS. 1–2) each having portions 24, 26 and 28, which are analogous to portions 32, 34 and 36 of the back curve molds 20 (FIGS. 3–4), is identical in nearly every functional aspect to the above-described back curve mold half producing machine, when the opposing elements of the front curve molding machine separate, the front curve mold sections remain in contact with the convex protuberances. Once the opposing elements of the molding machines that produce the back, front and primary package molds have separated, then the molded articles may be removed.

The mold sections 20, 22 are used to ultimately produce the ophthalmic or contact lenses, whereas the base members 30 of blister packages, as shown by way of example in FIG. 5, provide the primary packaging for the formed contact lenses at some subsequent point during the production cycle. The three embodiments that produce base (or back) and front mold halves 20, 22, and the primary packaging mold 30 share many features, where various modifications thereof, are detailed hereinbelow. Three embodiments of an apparatus for transporting the three mold section 20, 22, 30 are described in detail in the above-mentioned U.S. patent application Ser. No. 08/654,399. A summary of the three machines is described below as related to the present invention.

(A) Transportation of Base Curves

FIG. 6 shows a plan view of base curve mold section transportation apparatus 40 which is directed to the removal and non-damaging rapid transport of the back curve contact lens mold halves 20 from a molding machine 10 to a remote location; for example, to a pallet transportable on a belt conveyor 50 of a contact lens fabrication assembly line, as described further on herein.

More particularly, referring to the diagrammatic illustration of FIG. 6, the apparatus 40 includes first and second material handling assemblies 42 and 44. The first assembly 42 is provided for removing the base curve molded articles 20 from the molding machine 10, and transporting the articles 20 to a first location at 46. The second assembly 44 is positioned for receiving the molded articles 20 from the first assembly 42 and transporting the articles from the first location 46 to a second location 52.

A transport conveyor 50 is provided for receiving the articles 20 from the second assembly 44 at the second location 52 where, for example, pallets 54 are sequentially transportable on a conveyor belt 50. The base curve molded articles 20 are deposited on the pallets 54, so as to position the articles 20 in recesses in the pallets 54, which are thereafter advanced to suitable installations, for instance, an inert chamber 58 for further processing or treatment. Illustratively, the inert chamber contains nitrogen.

FIG. 7 shows the base curve mold section transportation apparatus 40 in greater detail. As shown in FIG. 7, the first assembly 42 is provided with an arm member 60 which has one free end thereof equipped with a plate 62 having a vacuum head 64 for receiving the base curve molded articles 20 when the molding machine 10 has its elements 12, 14 separate. The vacuum head 64 has an array of a plurality of article pick-up cups 70 of a resilient material which communicate with a vacuum source (not shown).

The molding machine elements 12, 14 move along arrow A in opposite direction. An opening 66 is formed upon separation of the molding machine elements 12, 14, one of which contains the base curve molded articles 20. The opening 66 enables insertion therein of the vacuum head 64.

As shown in FIG. 7, the plate 62 the first assembly 42 is in a vertical position retracted from the opening 66. This is referred to as the waiting position. Illustratively, the first assembly includes a side entry robot SX-V3, made by Yushin corporation excluding the plate 62 and control instructions, which are customized for different applications as will become apparent. The SX-V3 42 is controlled by a central processor, such as a microprocessor or computer, for compound movement. As will be described, the central processor also controls other aspects of transferring the molded articles 20,22, 30 from the molding machine to the nitrogen chamber or other downstream processing stations.

Figure 8:
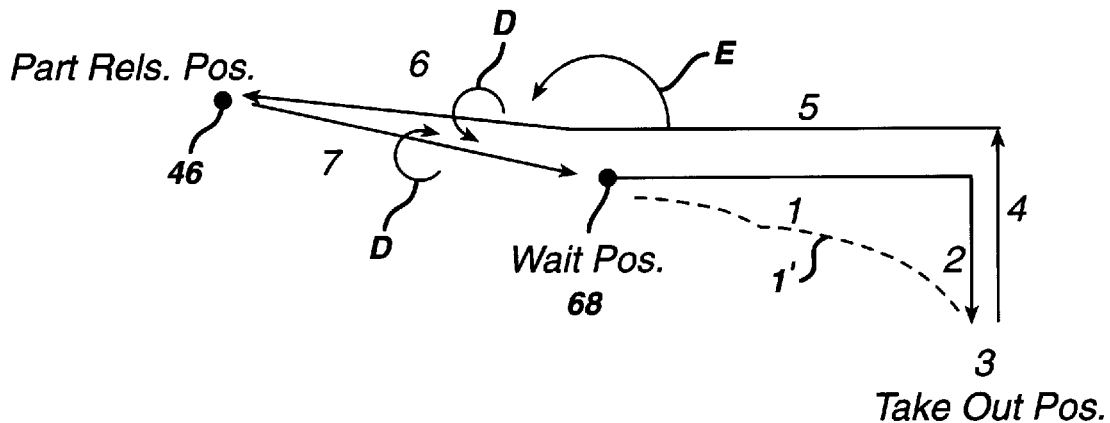
FIG. 8 illustrates movement of a robotic arm according with the present invention.
Figure 9:
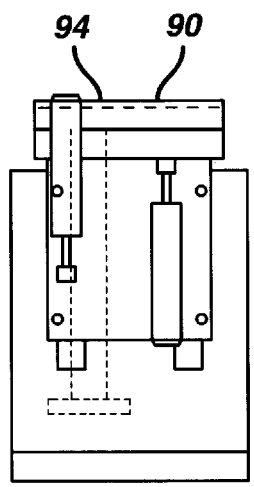
FIGS. 9, 10 and 11 illustrate, respectively, front, side and top views of a nesting arrangement for receiving base curves from a robotic arm transfer assembly shown in FIGS. 6 and 7.
Figure 10:
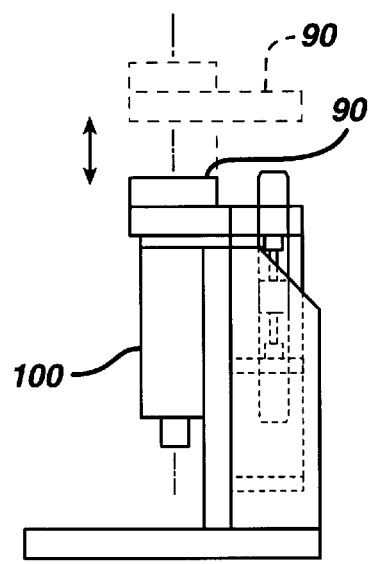

FIG. 8 shows the movement of the SX-V3 42. Referring to FIGS. 7–8, the SX-V3 42 moves toward the opening 66 from its waiting position 68, which is the position shown in FIG. 7. This movement is shown in FIG. 8 as reference numerals 1 and 2. Preferably, this movement is a compound curvilinear movement, shown as dotted line 1', instead of two discrete orthogonal movements 1, 2. At the take out position 3, shown in FIG. 3, the plate 62 is positioned within the opening 66 located between the two molding machine elements 12, 14, shown in FIG. 7.

The compound curvilinear movement 1' of the SX-V3 robot is synchronized with opening of the molding device 10, to begins upon receiving a signal from molding machine 10 (FIG. 7) that its elements 12, 14 have separated to form the opening 66 therebetween. The compound curvilinear movement 1' begins by accelerating the robotic arm 60 along the curvilinear path 1' from the waiting position 68 to the opening 66 in the molding device 10, in accordance with acceleration parameters stored in a memory of the central processor.

After an acceleration time stored in the memory, the robotic arm 60 decelerates where the robotic arm is approximately in the opening 66 of the molding device 10. This deceleration is according to deceleration parameters stored in the central processor memory. The deceleration provides a damping effect for allowing smooth transfer of the mold sections from the molding machine to the robotic arm, with minimal vibration, thus ensuring the molded articles 20, 22, 30 do not fall off the robots suction cups 70.

Upon pick up of base curve molded sections from one of the two molding machine elements 12, 14 by turning on the vacuum of the vacuum heads 64, the SX-V3 arm 60 retraces its movement, back toward its waiting position 68, as shown by numeral 4, 5 in FIG. 8, which movement is a also preferably a compound curvilinear movement along the dotted line 1'. This reverse curvilinear motion along path 1' from the molding machine 10 to the robot SX-V3 waiting position 68 is also controlled by speed, acceleration, deceleration and time parameters stored in the memory, as described above.

The movement of the SX-V3 or robotic arm 60 is programmable and controlled by the central processor, which controls various motors. For example as shown in FIG. 7, a drive motor 80 effectuates movement along an axis C, which is transverse to the movement direction A of the two molding machine elements 12, 14 along a conveyor belt 79; a kick motor 84 effectuates movement along an axis B parallel to direction A along a roller and guide rail structure 85; and a rotary motor effectuates rotary movement along an arrow D, through a rotary joint 88.

Control parameters are generated for each of the motors, which operate simultaneously to provide movements in the three directions B, C and D, to effectuate the curvilinear motion 1' (FIG. 8) of the SX-V3 robotic arm between the waiting position 68 and the opening 66 of the molding device 10. Illustratively, the control parameters for each motor include acceleration and deceleration parameters, and 1acceleration time and deceleration time parameters.

Once the proper control parameters are generated, they are stored in the memory of the central processor. Illustratively, the proper control parameters are generated by initially moving the SX-V3 robotic arm at a slow speed and generating a first set of control parameters. These control parameters are adjusted as the speed of the SX-V3 robotic arm is increased until the proper and optimal control parameters are generated, so that the SX-V3 robotic arm can move in and out of the molding machine opening 66 and pick up the molded articles smoothly.

Illustratively, the time that the SX-V3 robotic arm moves round trip between waiting position 68 and the opening 66 of the molding device 10 is increased from 1.5 seconds (used to generates an initial set of control parameters) to its normal operating time of approximately 400 ms to 800 ms. Preferably, the normal operating time is approximately 500 ms and is programmable to other desired values. The speed of the SX-V3 robotic arm varies from 0 to 1000 mm/sec, where its preferable operating is approximately 800–850 mm/sec.

Illustratively, the acceleration and deceleration parameters range approximately from 50% to 70% of full acceleration and deceleration. In particular, 70% of full acceleration and deceleration is used to move the SX-V3 robotic arm in and out of the molding device opening 66, i.e., between its waiting position 68 and the opening 66, as quickly as possible. In moving the SX-V3 robotic arm between its waiting position 68 and its parts release location 46, slower acceleration and deceleration may be used, such as 50% of full acceleration and deceleration.

After returning to the waiting position 68 with base curve molded sections vacuum attached to the suction cups 70, the arm 60 by 90° rotate around an axis parallel and passing through the arm 60 along direction D. This rotate the plate 62 from the vertical direction, shown in FIG. 7, to a horizontal position facing down. The downwardly facing vacuum cups 70 hold the base curve molded sections by the suction created by the applied vacuum. During the rotation along direction D, the arm 60 also moves around an axis 89, shown as dashed lines, which is perpendicular and passing through the rotary joint 88 along direction E from the waiting position 68 to the first location 46, also referred to as an SX-V3 parts release position, as shown in FIG. 8.

At the parts release location 46, the downwardly facing plate 62, having the base curve molded sections held thereon by vacuum, is in a vertical alignment above a pallet-shaped nest 90. The nest 90, as shown in FIGS. 6, 7, and 9 to 11, is raised by means of a suitable hydraulic or pneumatic actuator 100 to cause recesses 92 formed in an upper surface 94 therein to come into seating contact with the molded articles which are located on the SX-V3 cups 70.

The vacuum in the cups 70 is then released and pressure generated to produce a blow off of the articles which causes the molded articles to be positioned in the recesses 92. Next, the nest 90 with the molded articles is lowered. This enables the arm member 60 to return to its previous position, as mentioned hereinbefore, to repeat the cycle of removing a successive batch of molded articles or base mold sections 20 from the molding machine 10 in continuous repetitive sequences.

Figure 12A:
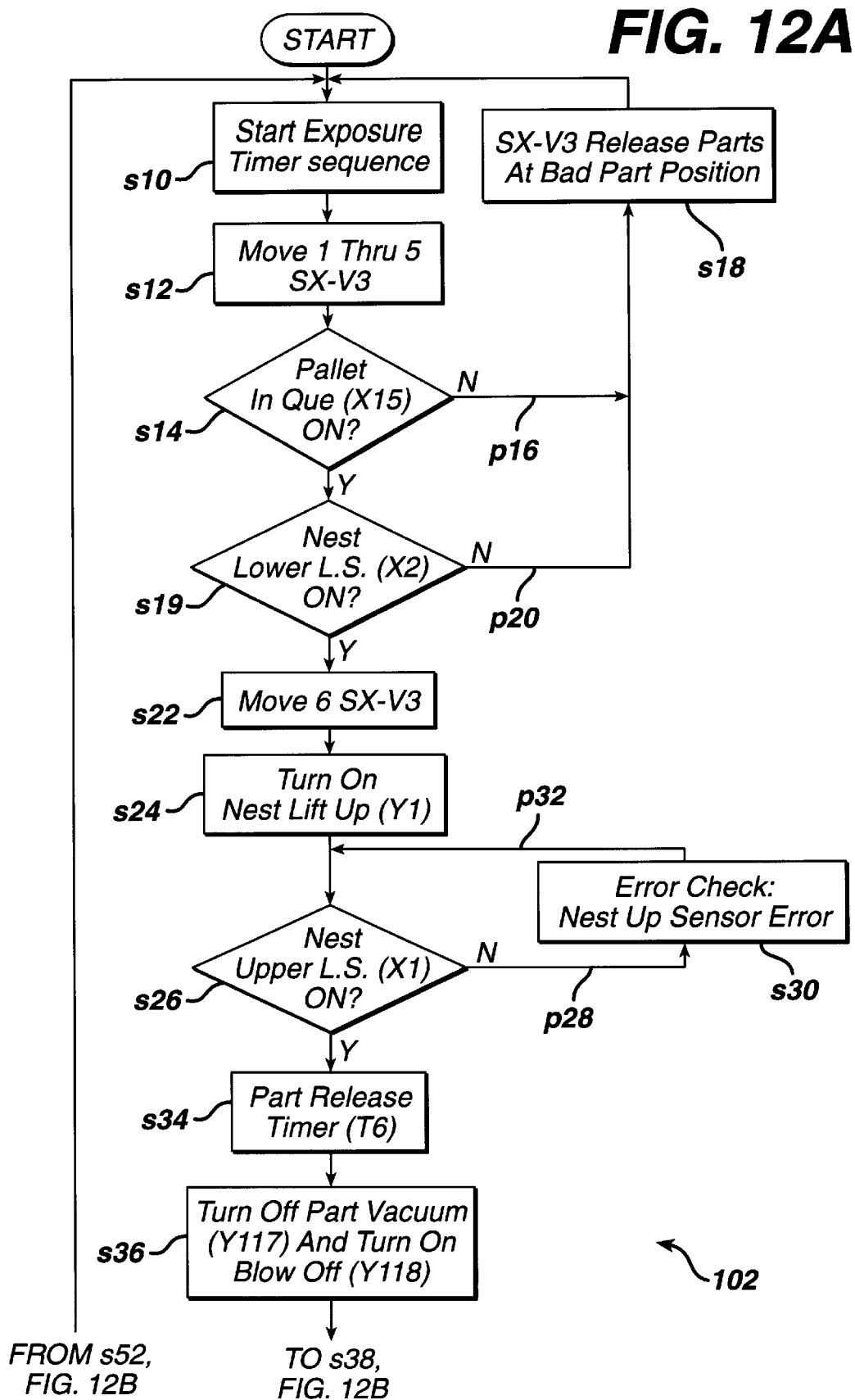
FIG. 12 illustrates a flow chart of a robotic arm automatic sequence to transport base curves according with the present invention.
Figure 12B:
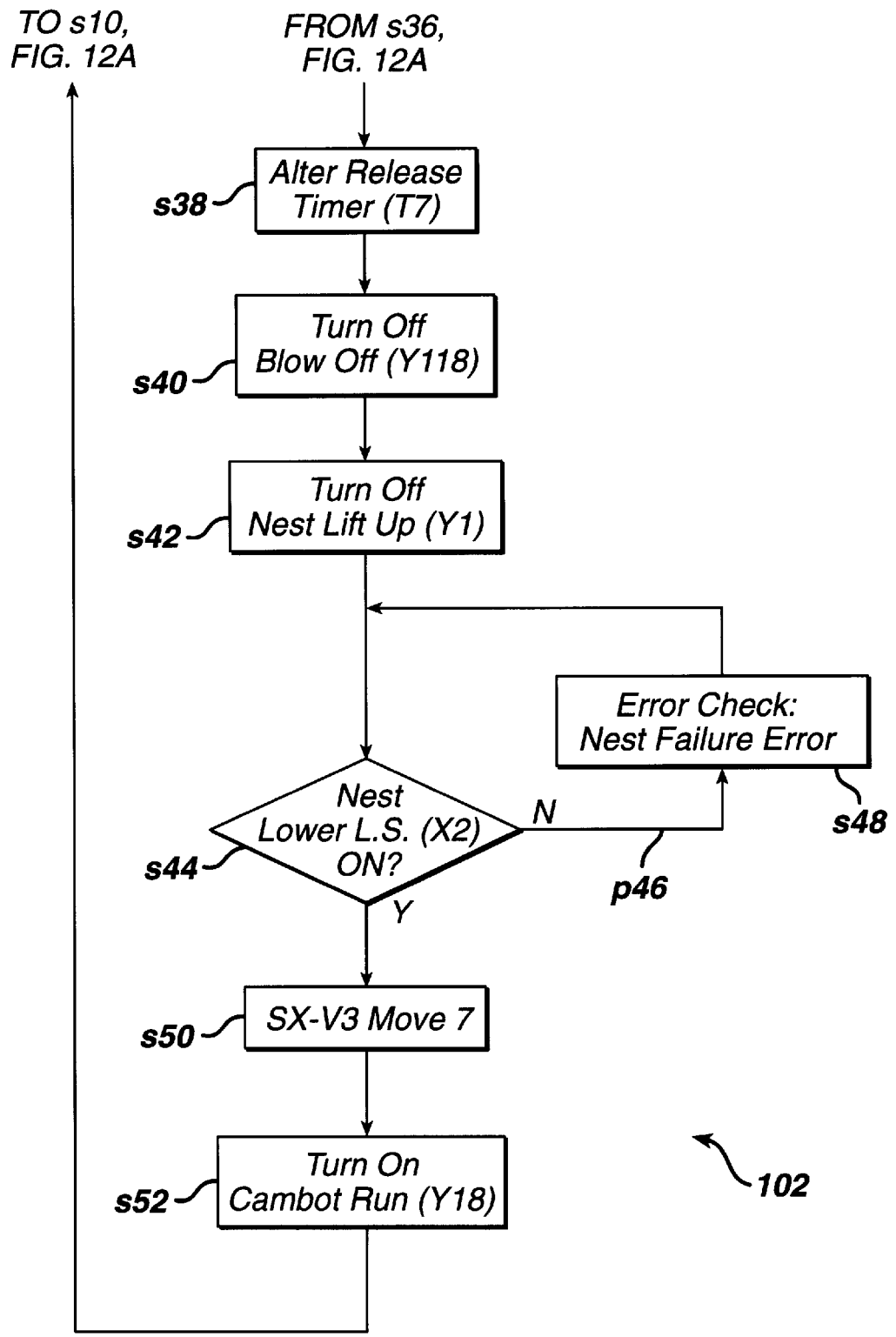

FIG. 12 shows a flow chart 102 of the SX-V3 automatic sequence for base curves. The flow chart 102 describes a method for automatically and rapidly performing continuous repetitive steps, while keeping track of oxygen or air exposure time of the base mold sections 20, beginning from removal thereof from the molding machine 10 to arrival thereof in the nitrogen chamber 58 shown in FIGS. 6–7.

As shown in step s10 of FIG. 12, the base curve automatic sequence method 102 starts by turning on an exposure time upon separation of the two molding machine elements 12, 14, which begins exposing the base mold sections 20 formed thereon to air. In step s12, the SX-V3 arm 60 moves from its waiting position 68 (FIG. 8), which is the position shown in FIG. 7, through movement 1 through 5, as described in connection with FIGS. 7–8, where the plate 62 removes base curve mold section 20 (FIGS. 3–4) from the molding machine 10 and returns to its waiting position 68.

In step s14 of FIG. 12, and referring to FIG. 6, the central processor checks whether a pallet 54b is present in a que 250 (FIGS. 7, 18, 19) located on the conveyor belt 50. The pallet 54b located at the que 250 later advances to a Cambot pre-part release position 52a for being raised by lift 150 to the second position 52, also referred to as a Cambot part release position 52 (FIG. 13), for receiving the base curve mold section 20, currently attached by vacuum suction on the SX-V3 plate 62. Ascertaining whether a pallet 54b is present in a que 250 is achieved by checking the status of a switch or sensor X15, which is activated when a pallet 54b is present in the que position 250, shown in FIGS. 7, 18 and 19. In the following flow charts, monitoring inputs are designated by an "X" followed by a particular numeral, while outputs causing performance of actions are designated by an "Y" followed by a specific numeral.

Figure 18:
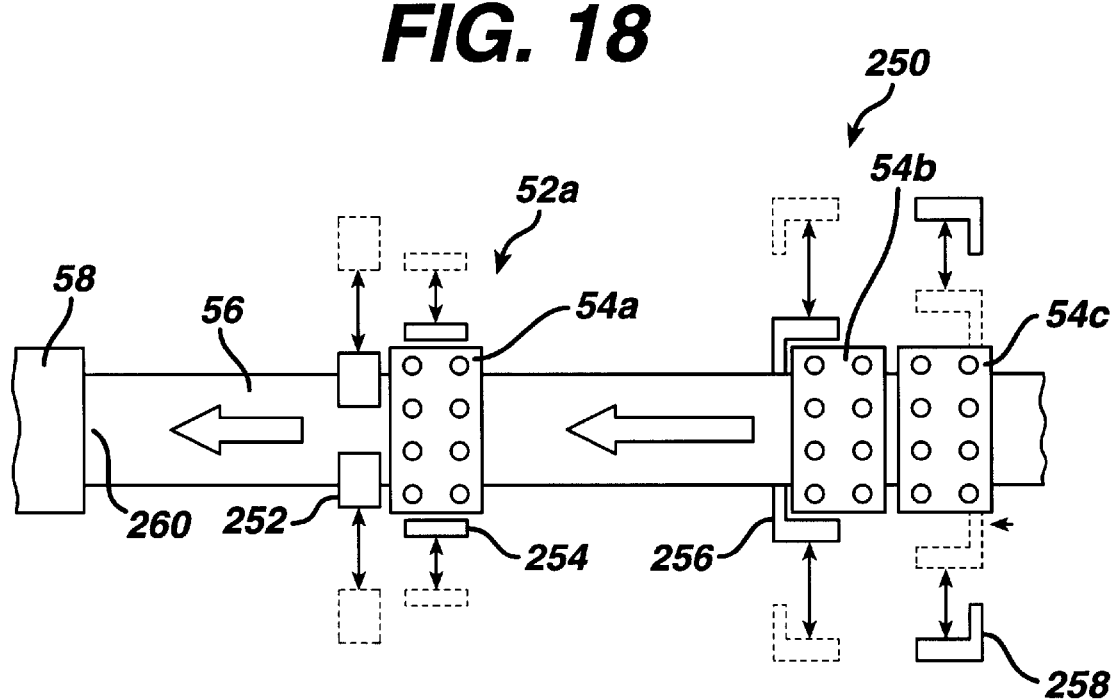
FIGS. 18 and 19 illustrate, respectively, top and side views of the conveyor belt near a pallet pre-part release position according with the present invention.
Figure 19:
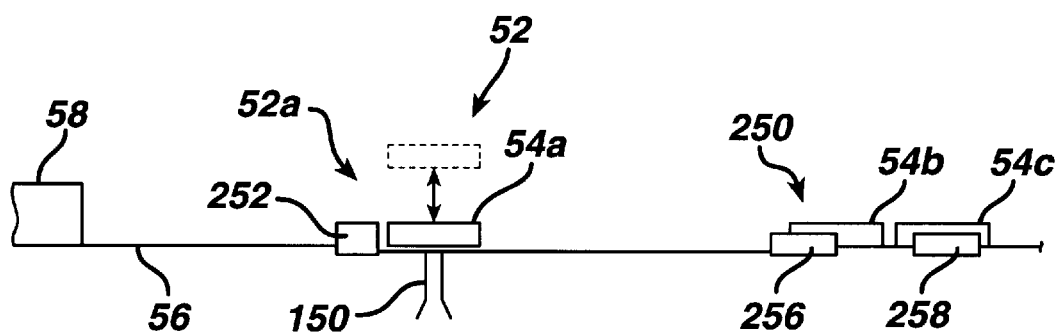

In step s14 and referring to FIGS. 18–19, the presence of a pallet 54b at the que 250 is ascertained instead of the presence of a pallet 54a at the Cambot pre-parts release location 52a. This prevents loss of an opportunity to transfer a set of molded articles to the pallet 54a, at the Cambot pre-parts release location 52a. Otherwise, if the presence of a pallet 54a at the Cambot pre-parts release location 52a is ascertained, then a set of molded articles may have to be discarded due to the high transfer speed, where the robot SX-V3 arm 60 moves at 1000 mm/sec, for example.

If a pallet 54b is not present in the que position 250, then path p16 is followed to step s18 where the SX-V3 42 releases the base curve mold section 20, which are attached to the SX-V3 suction cups 70, at a bad part position, shown in FIG. 6 as a rectangular element 96 having an opening therein which receives the bad part released from the SX-V3 plate 62 and discards it through a tube 98. Preferably, a vacuum source (not shown) provides suction through the tube 98 for discarding the released bad part. As will become apparent, all three mold transfer assemblies that transfer the base curve, front curve and primary package mold sections 20, 22, 30, respectively, have the bad part release element 96 which receives bad parts released from the SX-V3 plate 62 and discards them through the vacuum tube 98.

If a pallet 54b (FIGS. 7, 18, 19) is present in the que position 250, then the base curve SX-V3 auto sequence 102 (FIG. 12) proceeds to step s19, where the central processor checks a sensor or limit switch (LS) X2 to determine whether the nest 90 is in the low position. If the nest 90 is not in the low position, to prevent the SX-V3 from colliding with the nest 90 which is in a high position, i.e., in the SX-V3 part release position 46, then method 102 proceeds via path p20 to step s18 where the SX-V3 42 releases the base curve mold section 20 at the bad part position 96. In addition, to prevent a collision between an up nest 90 and the SX-V3 plate 62, stopping the SX-V3 at the bad parts position 96 and releasing the base curve mold section 20 held on plate 62, allows continuous operation of the various assembly lines without interruption, where the SX-V3 returns to restart from step 10.

If the nest 90 is in the low position, the SX-V3 auto sequence 102 proceeds to step s22, where the SX-V3 moves by movement 6, described in connection with FIG. 8, where the SX-V3 arm 60 rotate in direction E, while simultaneously rotating 90° in direction D to position the plate 62 in a horizontal direction facing downwardly over the lowered nest 90 at the SX-V3 part release position 46.

In step s24, the central processor turns on switch Y1 to activate the actuator 100 (FIG. 10) to lift the nest 90 to the SX-V3 parts release position 46 for contacting the base curve mold section 20 located on the SX-V3 suction cups 70. In step s26, the central processor checks to determine that a nest up limit switch (LS) X1 is on, indicating that the nest 90 is in the up position. If the nest 90 is not in the up position, then path p28 is followed to step s30, where the transfer assembly 40 is shut down, including the molding machine 10, the SX-V3 robot 42 and Cambot 44.

In step s30, a nest up sensor error message is displayed indicating the nest 90 has not yet reached its upper position at the SX-V3 parts release location 46. From step s30, path p32 returns the SX-V3 auto sequence 102 back to step s26, where the nest up LS X1 is checked again. If the nest never reaches its up position 46, then the SX-V3 auto sequence 102 remains in the infinite loop defined by steps and paths s26, p28, s30, p32, where the entire transfer assembly 40 is shut down. At this point, corrective action is taken, e.g., by manual intervention.

During this infinite loop, if the nest 90 reaches its up position, then the transfer assembly 40 restarts and the SX-V3 auto sequence 102 continues to execute step s34 after step s26. In this case, the nest up sensor is reset, e.g., by an operator, to clear the error message displayed in step s30.

If after step s24, the nest 90 is in the up position then, the SX-V3 auto sequence 102 continues to step s34 from step s26. In step s34, a part release timer T6 delays further processing for a predetermined time. The delay time is programmable and allows the nest 90 and the SX-V3 to be in the proper positions; where the nest 90 is the up position and the SX-V3 is properly located over the nest 90, at the SX-V3 part release position 46.

Next, in step s36, the central processor turns off the vacuum of the SX-V3 that provides suction to the suction cups 70. The processor achieves this by turning off a vacuum switch Y117. Instead of vacuum, pressured air is introduced, by turning on an air blow switch Y118, to blow off the base curve molded sections 20 from the SX-V3 suction cups 70 onto the nest 90.

In step s38, another delay timer, referred to as an after release timer T7, provides a programmable delay to allow the base curve molded sections 20 to settle on the nest 90. Next, in step s40, the central processor turns off the air blow switch Y118 to stop the flow of pressurized air from the suction cups 70.

In step s42, the nest lift up switch Y1 is turned off to lower the nest 90. When the nest 90 moves down to the low position, a nest low limit switch (LS) X2 is activated, which is checked in step s44. In the nest low LS X2 in not on, indicating the nest 90 has not reached its low position, then path p46 is followed to step s48. Step s48 is similar to step s30, except that in step s48, a nest down sensor error message is displayed instead of the nest up sensor error message displayed in step s30. As in step s30, in step s48, the entire transfer assembly 40 is shut down until the nest lower limit switch X2 turns on.

If the nest low limit switch X2 is on, i.e., the nest 90 is in the low position, then in step s50 the SX-V3 arm 60 moves by movement 7 as described in connection with FIG. 8, essentially being the reverse of movement 6, to return from the part release position 46 back to its waiting position 68. The waiting position 68, shown in FIG. 8, is also the position of the SX-V3 42 as shown in FIG. 7, where the plate 62 in the vertical position, ready for entry into the opening 66 of the molding machine 10 to remove another set of base curve mold sections 20, and repeat the above describe sequence 102, starting from step s10. The SX-V3 arm 60 does not move until the nest 90 is lowered to prevent near collision therebetween.

After the nest 90 that has the base curve molded sections 20 thereon is lowered, and the SX-V3 moves back to its waiting position 68 (FIG. 8) in step s50, and prior to repeating the base curve SX-V3 auto sequence 102 by returning to the first step s10 thereof and starting the exposure timer sequence, the second assembly 44, shown in FIG. 6–7, is activated in step s52 by turning on a Cambot run switch Y18.

Figure 11:
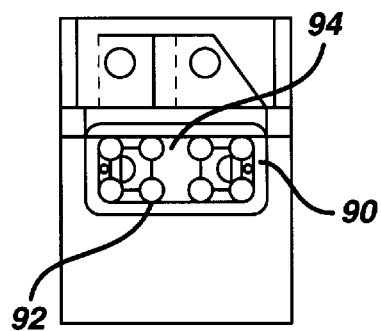

The second assembly 44 essentially comprises a rotary parts handling system, including a Cambot Rotary Parts Handler (registered trademark) manufactured by the Camco Corporation, which includes a rotatable cam-controlled member 110 which is also adapted to vertically reciprocate in direction F, and which mounts an elongate arm member 112 extending horizontally therefrom. The distal or free end of the arm member 112 has a head end plate 114 having an array of suction cups 116 positioned thereon, as illustrated in FIGS. 6–7. The array of suction cups 116 is in correlation with the spacing of the recesses 92 in nest 90 (FIG. 11).

As shown in FIG. 7, the Cambot rotates in direction G, e.g., in a horizontal plane around a vertical axis going through its pivoted end 110, which is opposite the head end plate 114. Referring to the top plan view of the transfer assembly 40 shown in FIG. 6, this Cambot rotation in direction G moves the Cambot arm 112 between horizontal and vertical positions, as viewed from the top and shown in FIG. 6. Illustratively, the Cambot rotate by an angle of 90°, between the SX-V3 part release location 46, where the nest 90 is located, and the Cambot pre-part release position 52a on the conveyor belt 50 where a pallet 54a is held (by stop 252 shown in FIGS. 18, 19), waiting to be raised by lift 150 (FIGS. 7, 13) to the Cambot part release position 52 for receiving base curve molded sections 20 from the Cambot suction cups 116, after being transferred thereon from the nest 90.

Figure 13:
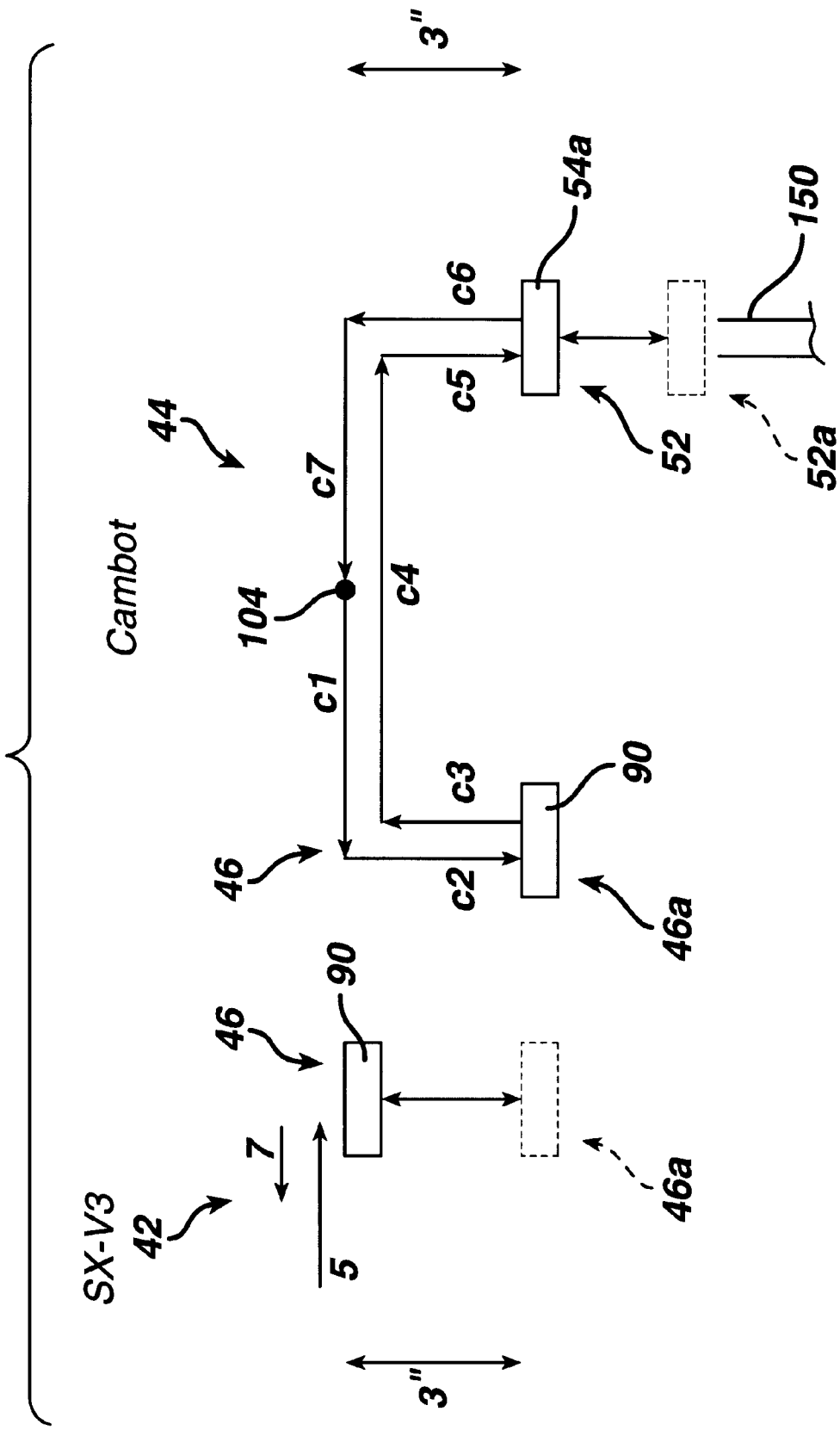
FIG. 13 illustrates movement of a rotary cam-controlled arm for transporting base curve and primary package molds according with the present invention.

The Cambot arm 112 as shown in FIGS. 6–7 is in its home position located approximately midway between the SX-V3 part release and Cambot part release positions 46, 52. Referring to FIG. 6, the Cambot arm 112 is approximately in a horizontal direction when its head 114 is positioned over the nest 90 at the SX-V3 part release location 46, and in a vertical direction when positioned over the Cambot pre-part release position 52a. The Cambot plate 114 faces downwardly and picks up base curve molded sections 20 from the nest 90 by use of vacuum suction, from a vacuum source (not shown), through its suction cups 116, and releases the base curve molded sections 20 onto a pallet 54a raised from the Cambot pre-part release position 52a to the Cambot part release position 52 (FIG. 13). The base curve molded sections 20 are released from the Cambot suction cups 116 to the pallet 54a by reversing the Cambot vacuum to provide forced air to blow off the base curve molded sections 20 onto pallet 54.

FIG. 13 shows movement of the Cambot 44, which moves, shown as movement c1 in FIG. 13, from its home position 104 toward the SX-V-3 parts release position 46. This movement c1 is essentially a rotary movement in the horizontal plane along direction G, shown in FIG. 7, which moves the Cambot arm 112 to the horizontal position as viewed from the top and shown in FIG. 6, to vertically align the suction cups 116 with their counterpart recesses 92 in the nest 90 that contains the molded articles 20. The rotary arm member 112 is then lowered by the rotatable member 110, shown in movement c2 in FIG. 13, so as to contact the molded articles 20 located on the nest 90, which is in a low position 46a (FIG. 13), also referred to as a Cambot parts pick position. For comparison, SX-V3 movements 5 and 7 (FIG. 8) are shown in FIG. 13. A vacuum is applied to the suction cups 116 on the plate 114 of the arm member 112 so as to cause the suction cups 116 to engage the articles 20.

The arm member 112 is then raised by the rotatable member 110, shown in movement c3 in FIG. 13, and rotates through an angle of approximately 90° in direction G (FIG. 7), shown as movement c4 in FIG. 13, so as to extend into a position, wherein the plate 114 with its suction cups 116 retaining the molded articles is located above the conveyor belt 50, vertically aligned with the Cambot part release position 52, as shown in FIG. 13. As shown more specifically in FIGS. 14–15, the conveyor belt 50 is adapted to be driven through the intermediary of a suitable motor 118.

A plurality of pallets 54 each having an array of molded article-receiving recesses 134 are positioned in contiguous sequence at an upstream position 136 relative to the Cambot arm member 112 of the Cambot rotary part member 110 on the conveyor belt 50. The pallets 54 are adapted to be individually advanced in spaced succession towards the Cambot pre-part release position 52a in synchronism with each pivotal movement of the arm member 112 having the suction cups 116 holding an array of molded articles 20 positioned over the conveyor belt 50, which articles 20 have been previously retrieved from the recesses 92 in the nest 90 located at the Cambot parts pick position 46*a*.

As the pallets 54 are advanced, they are separated and individually forwarded by an indexing device a single pallet at one time, described later in connection with FIGS. 18–19, until a leading pallet 54*b* in a que 250 is moved to the Cambot pre-part release position 52*a* directly in alignment below the arm member 112. The cam-controlled or Cambot arm 112 is now pivoted over the conveyor 50 with the molded articles 20 being held by the downwardly facing suction cups 116 over the lead pallet 54, also shown as pallet 54*a* in FIGS. 18–19.

Figure 14:
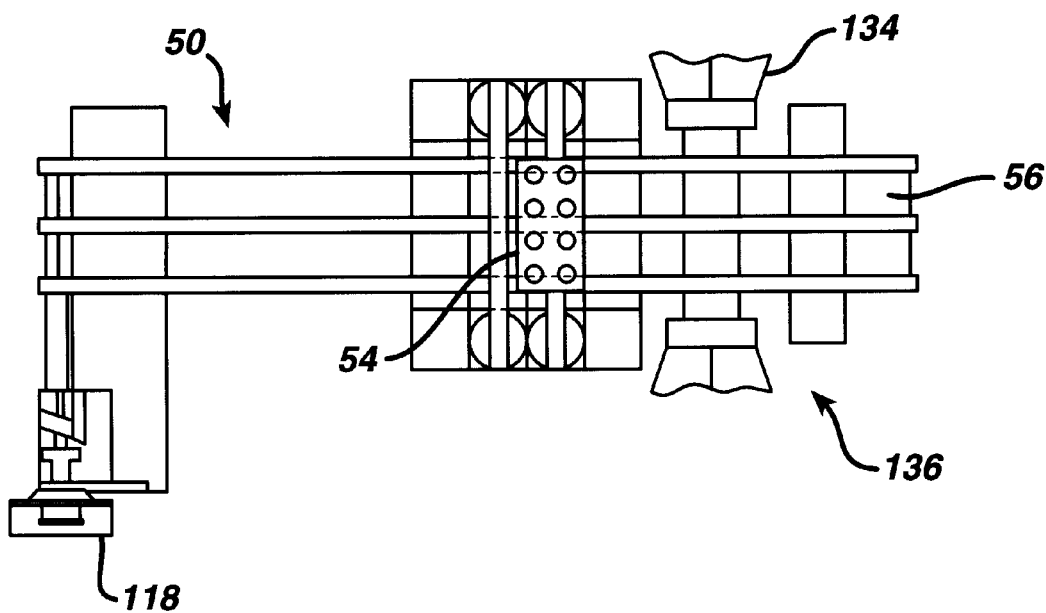
FIGS. 14 and 15 illustrate, respectively, top plan and side views of a conveyor system for receiving base curves from a cam-controlled transfer assembly shown in FIGS. 6 and 7.
Figure 15:
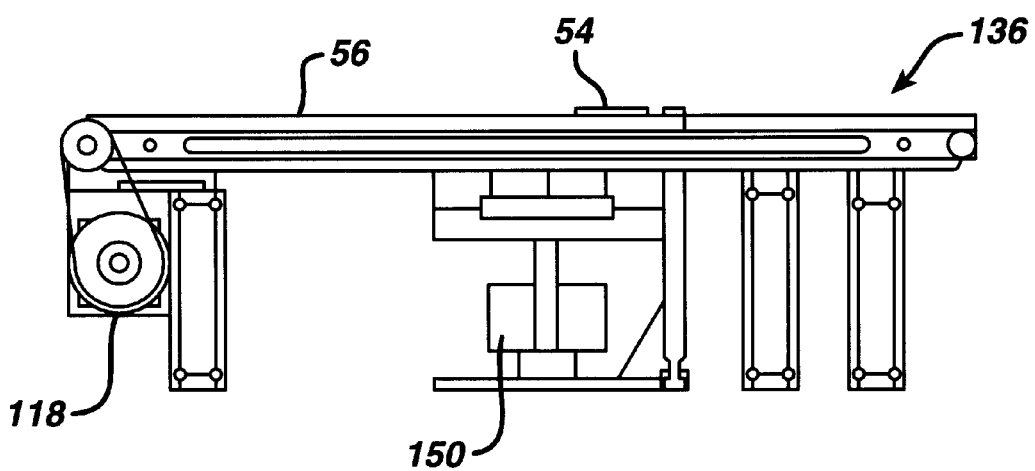

At that point, a lifting mechanism 150, shown in FIGS. 13–15, which may be either hydraulic or pneumatic, is adapted to raise the pallet 54 upwardly from the conveyor belt 50 to a predetermined extent, i.e., from the Cambot pre-part release position 52*a* to the Cambot part release position 52. After the lift 150 raises the pallet 54*a* to the Cambot parts release position 52, the arm member 112 of the rotatable cam-controlled member 110 is displaced downwardly, as shown by movement c5 in FIG. 13, so as to enable the cups 116 to deposit the articles or base curves 20 onto the facing recesses 134 formed in the pallet 54*a* (FIG. 7). The base curves 20 are transferred from the Cambot suction cups 116 to the pallet 54*a* by releasing the vacuum in the cups 116 and, preferably, imparting a slight superatmospheric pressure thereto, which will firmly push or blow off the base curves or articles 20 into the recesses 134 of the pallet 54*a*, as shown in FIG. 7.

Next, the lift 150 is lowered to place the pallet 54*a* back onto the conveyor belt 50 at the Cambot pre-part release position 52*a*. At this time, the Cambot arm 112 is raised, as shown by movement c6 in FIG. 13, and pivoted back towards the nest 90, shown as movement c7 in FIG. 13, to enable the pick-up of a subsequent batch of molded articles which have been deposited thereon by the SX-V3 42 as retrieved from the molding machine 10. Illustratively, as shown in FIG. 13, the up and down movements c2, c3, c5, c6 of the Cambot is 3 inches, for example. FIG. 13 also shows the SX-V3 42 and the nest 90 in a raised position at the SX-V3 parts release location 46, ready to receive the base curves 20 from the SX-V3 42. The up and down movement of the nest 90 toward and away from the SX-V3 arm 60 is approximately 4 inches, for example.

Upon receiving the base curve molds 20 and being lowered on conveyor belt 50 at the Cambot pre-part release location 52*a*, the lead pallet 54 is advanced by the conveyor belt 50 so as to form a continuous line with preceding base curve-filled pallets 54 which are then transported into a suitable chamber 58 containing, for example, a nitrogen atmosphere. This cycle is then continually repeated in the same manner of operation, rendering the entire apparatus and process of molded article transport extremely simple in comparison with currently employed material handling systems.

Figure 16A:
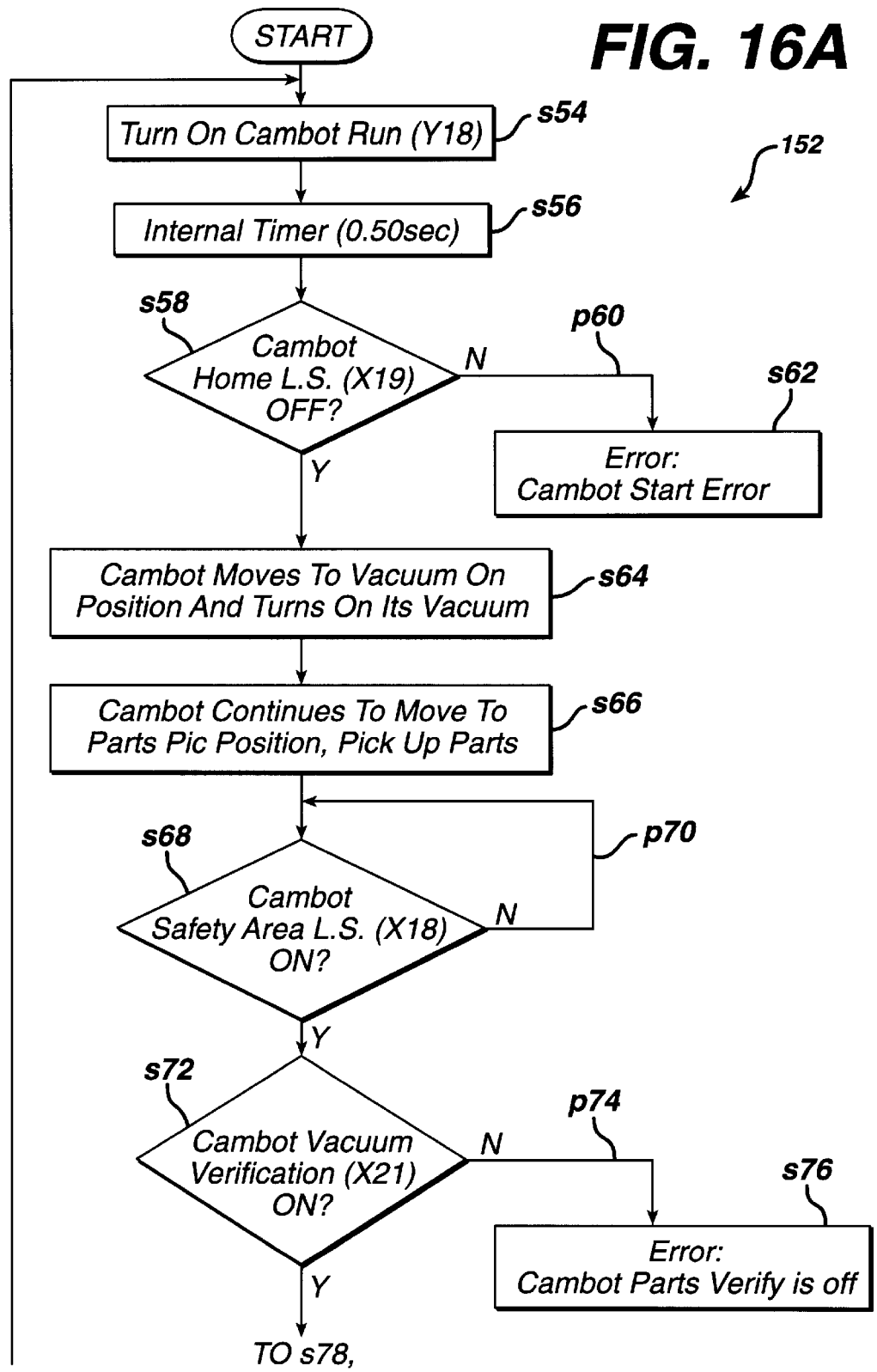
FIG. 16 illustrates a flow chart of a cam-controlled arm automatic sequence to transport base curves according with the present invention.
Figure 16B:
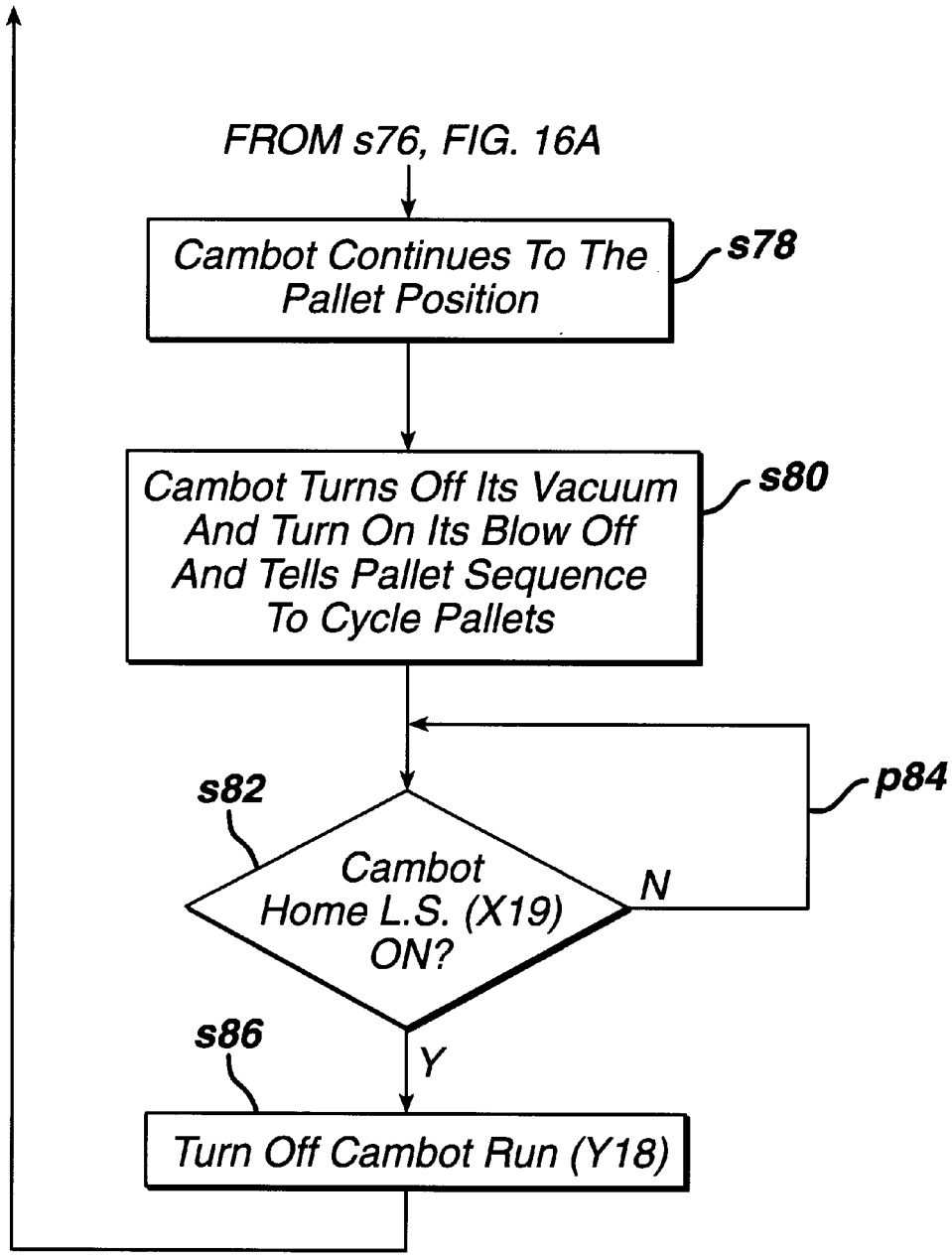

The Cambot run sequence is controlled by the central processor according a method 152 shown in FIG. 16. In step s52 of base curve SX-V3 auto sequence 102 shown in FIG. 12, turning on switch Y18 by the central processor begins the base curve Cambot run sequence 152 shown in FIG. 16. As shown in FIG. 16, the Cambot run sequence 152 begins by turning on switch Y18 in step s54, which is the same as step s52 in FIG. 12.

In step s56 an internal timer for synchronization and fine tuning is turned on to delay further Cambot processing for a predetermined time, such as 0.5 seconds. In step s58, the Cambot movement is ascertained by checking to see if the Cambot 44 has moved from its home position. In particular, if a Cambot home limit switch X19 is on, indicating that the Cambot is still at its home position 104 (FIG. 13) and has not moved therefrom, then path p60 is followed to step s62. The Cambot home position 104 is the position of the arm 112 shown in FIGS. 6–7 located approximately midway the nest and Cambot parts release positions 46, 52 (FIG. 13). At step s62, an error message indicating occurrence of a Cambot start error is displayed, and a signal is sent to the central processor of the SX-V3 to shut off the Cambot 44, until the operator corrects the error and restarts the system, for example.

If the Cambot has moved from its home position, thus turning off the Cambot home limit switch X19, then in step s64 the Cambot vacuum is turned on. Next, in step s66, the central processor causes the Cambot to move through movements c1 through c4, shown in FIG. 13; pick up the base curves 20 located on the nest 90 at the Cambot parts pick position 46*a*; and begin moving toward the Cambot parts release position 52 for transferring the base curves 20 onto the pallet 54.

As the Cambot arm 112 approaches its home position 104 (FIG. 13), a Cambot safety area limit switch X18 is activated, which indicates that the Cambot arm 112 is in a safe area which, referring to FIG. 6, is from the vertical Cambot arm position at the Cambot parts release position 52 (FIG. 13) to a position slightly passed its home position 104. In this Cambot safe area, the Cambot 44 cannot collide with other moving elements, such as with the SX-V3 42, or with the nest 90 when raised to the SX-V3 parts release location 46 for receiving the base curves 20 from the SX-V3 suction cups 70.

If the Cambot safety area limit switch X18 is not on, indicating the Cambot arm 112 has not moved far enough from the nest 90 toward the Cambot parts release position 52, then path p70 is followed to return to the beginning of step s68. When the Cambot arm 112 reaches the safety area, thus activating the Cambot safety area limit switch X18, execution is continued to step s72. In step s72, a Cambot vacuum verification switch X21 is checked for being in an on position, which indicates that the vacuum at the Cambot suction cups 116 is on, thus holding the base curves 20 picked up from the nest 90. If the vacuum switch X21 is not on, then path p74 is followed to step s76, where an error message is displayed to alert an operator that the Cambot vacuum is off, requiring manual intervention, for example, and resetting the system.

If the vacuum switch X21 is on, then in step s78, the Cambot continues to the Cambot parts release position 52 (FIG. 13), through movements c4 and c5 shown in FIG. 13, where the Cambot arm 112 is lowered to align over a pallet 54, which is raised by lift 150 to receive the base curves 20 from the Cambot suction cups 116 aligned with the pallet recesses 134 (FIG. 14). After this alignment, in step s80, the Cambot turns off its vacuum and turns on its blow off to transfer the base curves 20 onto the raised pallet 54.

Figure 17A:
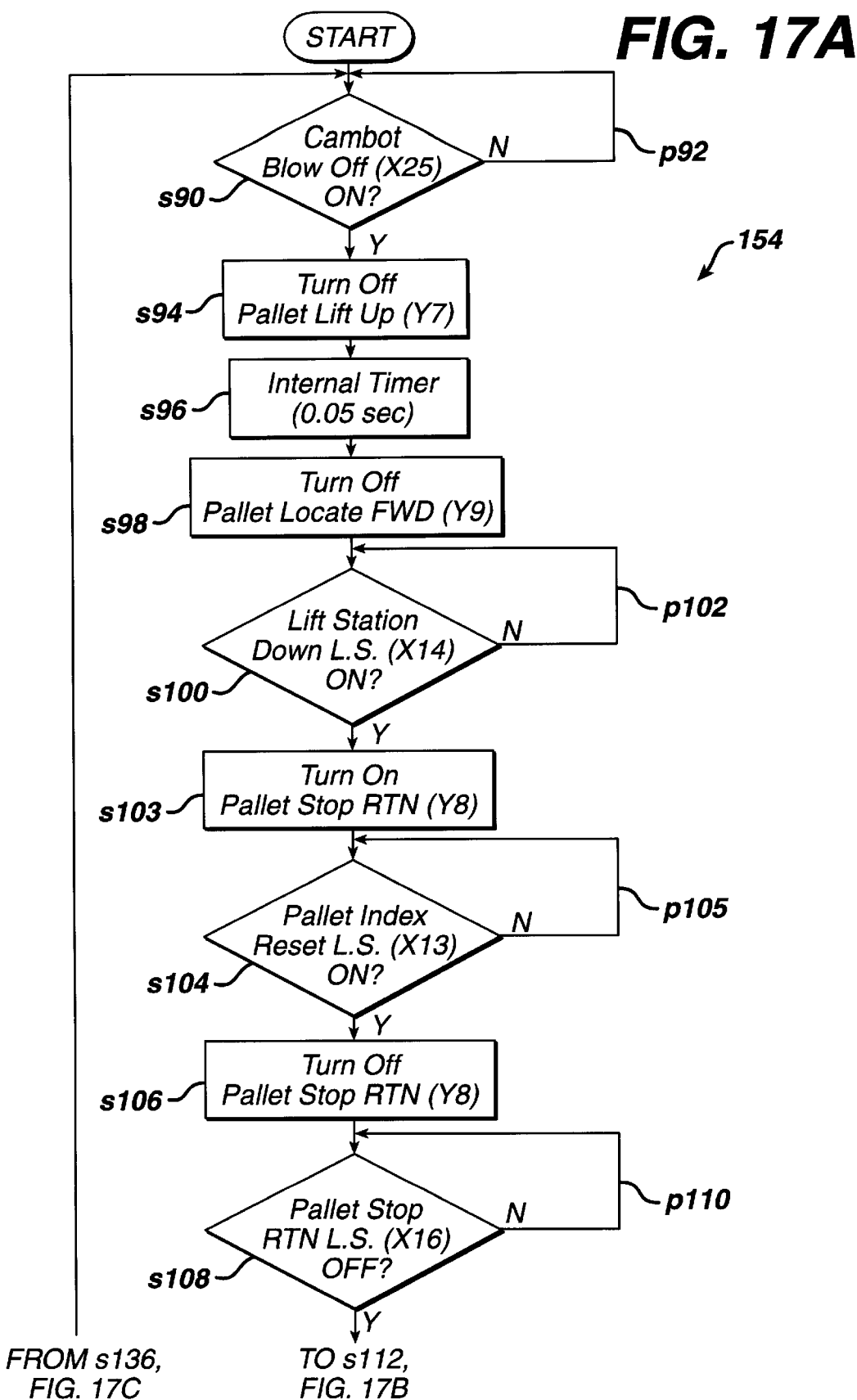
FIG. 17 illustrates a flow chart of an automatic sequence to transfer bases and front curves according with the present invention.
Figure 17C:
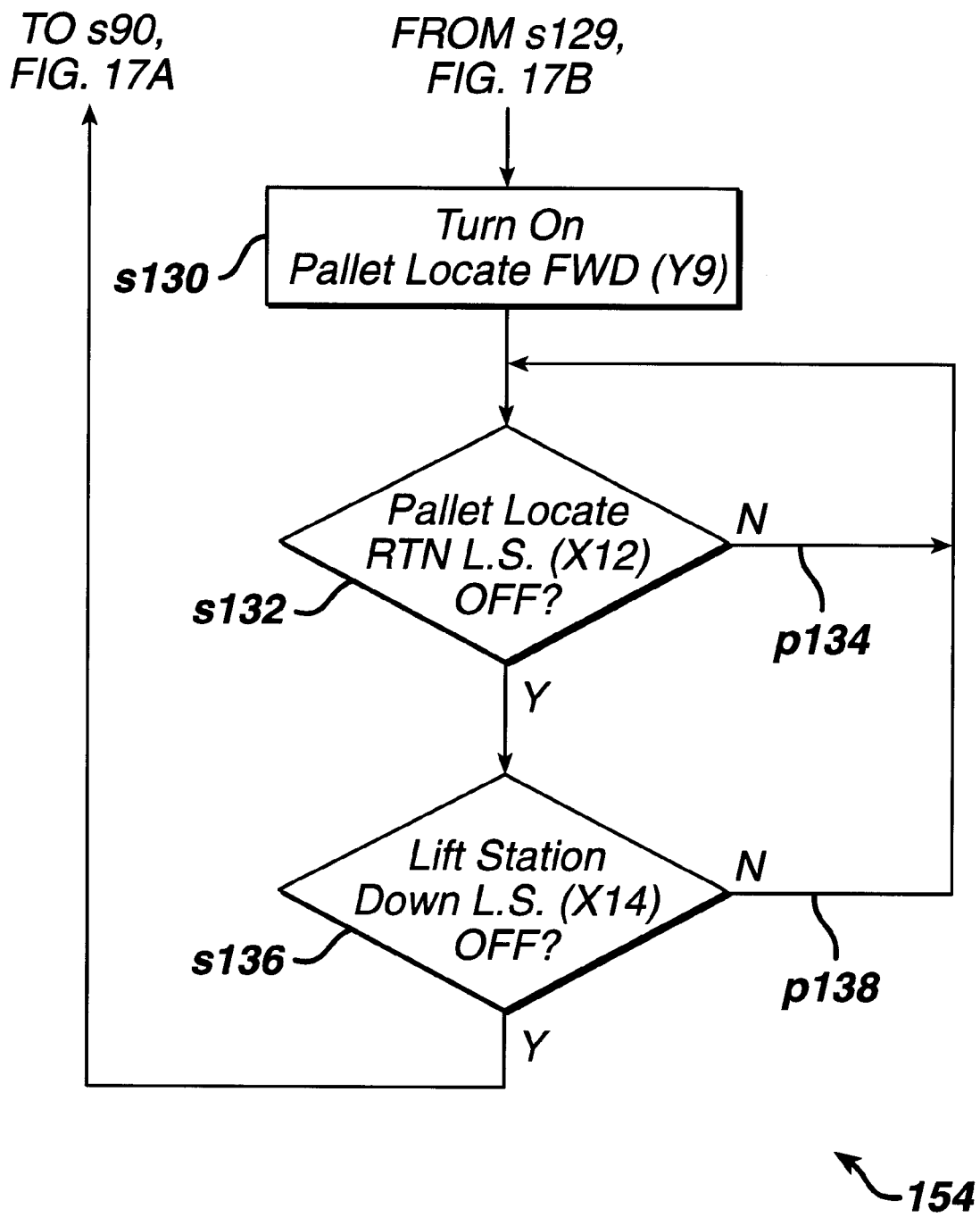

After the base curves 20 are transferred to the pallet 54, the central processor initiates a pallet sequence. The pallet sequence releases the pallet that contains the base curves 20 thereon. The released pallet moves on the conveyor belt 50 downstream and enters the nitrogen chamber 58. In addition, the pallet sequence positions an empty pallet at the Cambot pre-parts release location 52*a*, by releasing the empty pallet from the que 250 (FIGS. 7, 18, 19) located upstream from the Cambot pre-parts release location 52*a*. FIG. 17 shows this pallet sequence which is referenced by numeral 154.

Note, this pallet sequence 154 is an automatic sequence that transfers the molded parts, the base curves 20 in this case, from the Cambot suction cups 116 to pallets 54 located on the conveyor belt 50. In addition to transferring base curve mold sections 22, this sequence 154 is equally applicable for transferring front curve mold sections 22.

After step s80 in FIG. 16, the Cambot arm 112 is raised to begin its return to the home position, which is the Cambot arm 112 position as shown in the top view of FIG. 6, where the Cambot arm 112 is located between the SX-V3 parts release and Cambot pre-parts release positions 46, 52a. The Cambot home position is referenced as numeral 104 in FIG. 13. As shown in FIG. 13, the Cambot movement from the Cambot parts release position 52 back to its home position 104 is through movements c6, c7.

In step s82, the central processor checks to status of the Cambot home limit switch X19, similar to that in step s58. If this limit switch X19 is not on, then path p84 is followed to return to the beginning of step s82. When the Cambot arm 112 reaches its home position, the limit switch X19 turns on and the Cambot run sequence 152 proceeds to step s86 where it is terminated by turning off the Cambot run switch Y18. Thus, at end of the Cambot run sequence 152, the Cambot arm 112 is up raised and located at the home position 104 (FIG. 13).

As stated in describing step s80, the central processor initiates the pallet sequence 154 to cycle the pallets to move the pallet containing the base curves 20 to the nitrogen tunnel or chamber 58 and positions an empty pallet from an upstream que to receive another set of base curves 20 upon repeating the above mentioned methods. FIG. 17 shows the pallet sequence 154.

In the first step of the pallet sequence 154, designated as reference s90 in FIG. 17, the central processor checks to ascertain that the Cambot blow off switch is on, which switch was turned on in step s80 shown in FIG. 16. If this switch is not on, then essentially further processing is delayed until the switch is actually turned on from the command given in step s80 of FIG. 16. Thus, path p92 is followed to the beginning of the test step s90 when the Cambot blow off switch is not on.

The pallet cycle sequence 154 proceeds to step s94 when it is determined in step s90 that the Cambot blow off switch is on, indicating air is blowing through the suction cups 116 of the Cambot plate 114 to transfer the base curves 20 to the pallet 54 which is raised by lift 150 to the Cambot parts release position 52 (FIG. 13), while the Cambot arm is lowered by movement c5 shown in FIG. 13.

In step s94, the pallet lift 150 up switch Y7 is turned off, thus lowering the pallet 54 which now contains thereon the base curves 20. In step s96, an internal timer provides a programmable delay time, such as 0.05 sec, to allow the lift 150 to completely lower the pallet 54. FIGS. 18 and 19, which are provided to better understand cycling the pallets, are top and side views of the conveyor belt 50 near the Cambot pre-parts release position 52a, showing the pallet que position 250 located upstream from the Cambot pre-parts release position 52a and the nitrogen chamber 58 located downstream.

As shown in FIGS. 18–19, a pair of pallet stops 252 move toward or away from each other using a hydraulic or pneumatic cylinder, for example. In the position near each other shown as solid line in FIG. 18, the pallet stops 252 prevent a pallet 54a, which is positioned at the Cambot pre-parts release location 52a, from advancing downstream toward the nitrogen tunnel 58. When this pallet 54a is raised by the lift 150 (FIG. 19) from the Cambot pre-part release position 52a (FIG. 13) to the Cambot part release position 52 (FIG. 13), a pair of pallet locate cylinders 254 are actuated to move toward each other as shown by the solid lines in FIG. 18. This holds the pallet 54a as it is being raised and lowered by the lift 150. The pallet locate cylinders 254 are actuated after the pallet 54a is raised off the conveyor belt 50, to prevent the pallet locate cylinders 254 from engaging the conveyor belt 50.

At the pallet que 250, two pallets 54b, 54c, are held by first and second pair of que stoppers 256, 258, respectively. Illustratively, in the case of base and front curves 20, 22, the four pairs of hydraulic or pneumatic cylinders, namely, pallet stops 252, the pallet locate cylinders 254, and the first and second pair of que stoppers 256, 258, are individually controlled. By contrast, in the case of the primary packages 30, the first and second pair of que stoppers 256, 258, are collectively controlled by a single actuator or cylinder, referred to as an escapement cylinder.

Returning to FIG. 17, in step s98 a pallet locate forward switch Y9 is turned off to separate the pallet locate cylinders, as shown by the dotted cylinders 254 in FIG. 18. Next in step s100, the central processor checks to determine if a down limit switch X14 of the lift station 150 is on, indicating the lift station 150 is lowered to place the pallet 54a on the conveyor belt 50. This pallet 54a contains the base curves 20. If not, then path p102 is followed to the beginning of step s10 until the lift 150 is lowered to turn on the down limit switch X14.

At this point, the auto transfer sequence 154 of FIG. 17 progresses to step s103 where a switch Y8 is turned on to move the pallet stops away from each other, as shown by the dotted pallet stops 252 in FIG. 18. Since both the pallet stops 252 and locate cylinders 254 are in the dotted positions and separated from each other, and the lift 150 is low, conveyor belt 50 moves the pallet 54a containing the base curves 20 toward the nitrogen tunnel 58. Upon clearing the pallet stops 252, the pallet 54a passes and activates a pallet index reset limit switch X13 260. In step s104, the central processor checks to determine if the pallet index reset limit switch X13 260 is turned on. If not, then path p105 is followed back to the beginning of step s104 until this switch X13 260 is turned on, which indicates that the pallets 54a has cleared the pallet stops 252.

Next in step s106, the switch Y8 is turned off to move the pallet stops 252 toward each other, as shown by the solid lines 252 in FIG. 18. In step s108, the inward position of the pallet stops 252 is ascertained by examining the condition of a pallet stop return limit switch X16. If this switch is on, indicating the pallet stops 252 have not yet returned toward each other, then path p110 is followed to the beginning of step s108 for retesting the state of the pallet stop return limit switch X16.

When pallet stops 252 move toward each other to block any pallets from proceeding toward the nitrogen tunnel 58, thus turning off the pallet stop return limit switch X16, then a que switch Y10 is turned on in step s112. This moves the second or upstream pair of que stoppers 258 toward each other from its position shown as solid line in FIG. 18, to a position shown as dashed lines for holding the upstream pallet 54c and preventing its movement. To allow enough time for the upstream que stoppers 258 to move toward each other, a programmable delay is introduced by counting an internal timer for 0.05 seconds, for example, in step s114.

Next in step s116, a que stopper return switch Y11 is activated by the central processor. This moves the first or downstream pair of que stoppers 256 away from each other from its position shown as solid line in FIG. 18, to a position shown as dashed lines for releasing the downstream pallet 54b and allowing its movement downstream until it is stopped by the pallet stops 252, which have moved toward each other during step s106. A pallet in part position switch X11 is turned on when this pallet, which was released from the pallet que location 250, is positioned at the Cambot pre-parts release location 52a for receiving the next set of base (or front)curves from the Cambot.

In step s118, the on position of the pallet in part position switch X11 is ascertained. If the switch X11 is not on, indicating the pallet has not yet reached the Cambot pre-parts release location 52a, then path p120 is followed to return to the beginning of step s118 and retest the switch X11. When a pallet reaches the Cambot pre-parts release location 52a and is stopped by the closed pallet stoppers 252, the switch X11 turns on and the automatic pallet transfer sequence 154 continues to step s122.

In step s122, the central processor turns off the que stopper return switch Y11, which was turned on in step s116. The off switch Y11 moves the downstream pair of que stoppers 256 toward each other to prevent any pallets from proceeding further downstream. In step s124, which is similar to step s114, a programmable delay is introduced by counting an internal timer for 0.05 seconds, for example. This allows enough time for the downstream que stoppers 256 to move toward each other.

In step s126, the central processor turns off the que switch Y10, which was turned on in step s112. The off switch Y10 moves the upstream que stoppers 258 away from each other, thus releasing pallet 54c and allowing it to move downstream until it is stopped by the downstream que stoppers 256, which were moved toward each other in the previous two steps s122, s124.

In step s128, the central processor turns on the pallet lift up switch Y7, which was turned off in step s94. The on switch Y7 begins raising lift 150, which raises the pallet now stopped by pallet stops 252, shown as reference 54a in FIG. 18. Similar to steps s114, s124, in step s129, a programmable delay is introduced by counting an internal timer for 0.05 seconds, for example. In step s130, the pallet locate forward switch Y9 is turned on, which switch Y9 was turned off in step s94. The on switch Y9 moves the pallet locate cylinders 254 toward each other to clamp pallet 54a, as shown by the solid cylinders 254 in FIG. 18.

Step s132 ascertains whether the pallet locate cylinders 254 have moved toward each other and clamped the pallet 54a, by confirming that a pallet locate return limit switch X12 is off. If this switch X12 is not off, then path p134 is followed back to the beginning of step s132. When the switch X12 is off, the pallet transfer auto sequence 154 proceeds to step s136, where the status of a lift station down limit switch X14 is checked. If this switch X14 is not off, then path p138 is followed to return to the beginning of step s132, until the switch X14 turns off. The off switch X14 indicates that the lift 150, which was turned on to move up in step s128, has moved up to raise the pallet 54a from the Cambot pre-parts release position 52a to the Cambot parts release position 52 (FIG. 13) for receiving the base curves 20 from the Cambot.

If the lift station down limit switch X14 is off, i.e., pallet 54a is raised by the lift 150, then the auto sequence 154 that transfers the molded parts, either base or front curves 20, 22 from the Cambot to pallets located on the conveyor belt 50, is repeated by returning the beginning of the sequence 154 at step s90.

Figure 20:
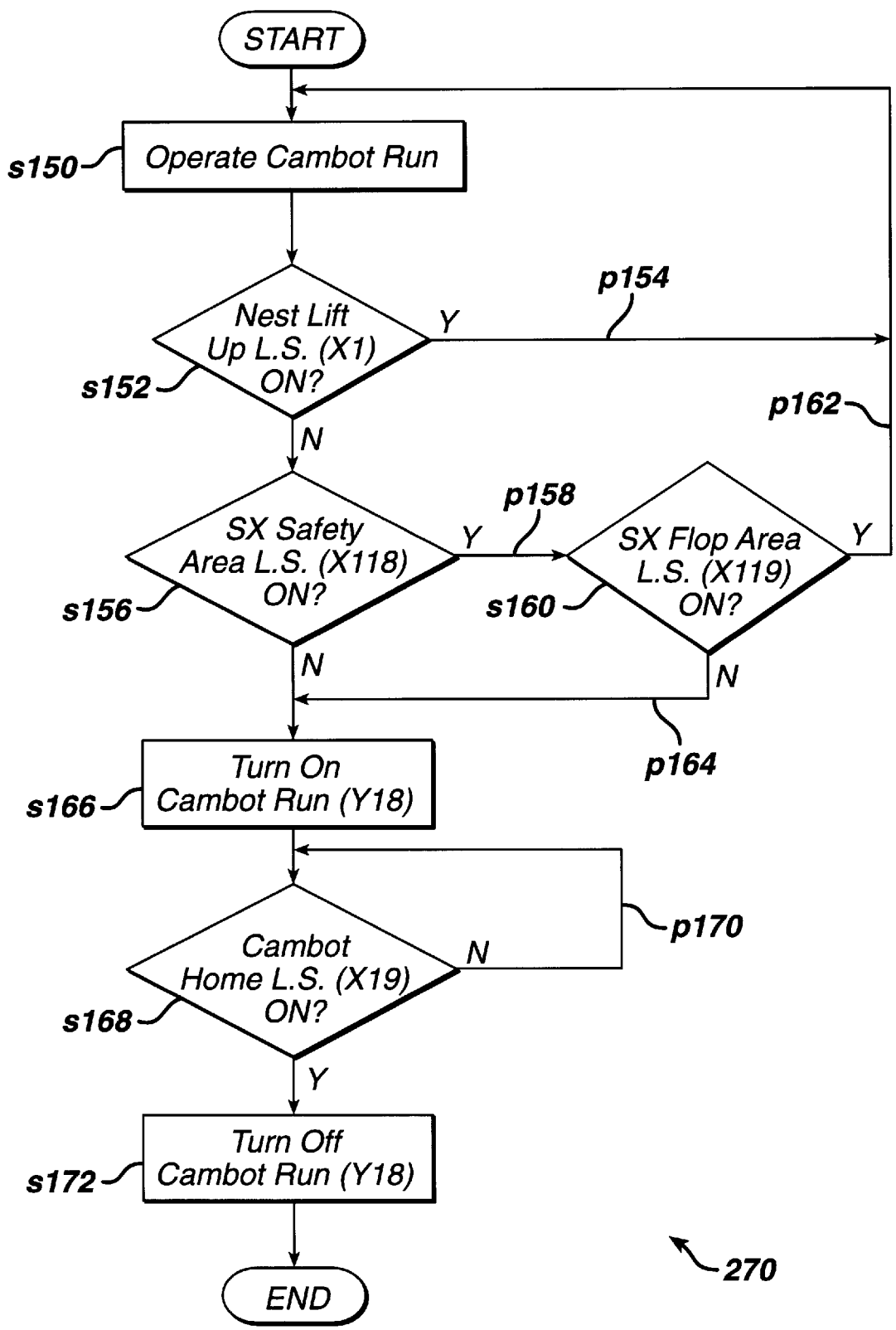
FIG. 20 illustrates a flow chart of a Cambot home sequence for base and primary package molds according with the present invention.

FIG. 20 shows a Cambot home sequence or method 270, which is used to initialize the Cambot 44 in a manual mode when necessary, for example, when power is interrupted or any of the auto sequences is stopped due to an error or alarm indication that requires operator intervention for correction thereof. Prior to commencing an auto sequence, the Cambot must be in its home position, which is achieved by the Cambot home sequence 270. This Cambot home sequence 270 is identical for both assemblies used for the manufacture of the base curve and primary package mold sections 20, 30 shown in FIGS. 1, 5, respectively.

The Cambot home sequence 270 returns the Cambot to its home position 104, shown in FIG. 13, where the Cambot arm 112 is raised and located approximately midway between the nest 90 and the Cambot parts release position 52. This Cambot home position is the location of the Cambot arm 112 shown in FIG. 6–7, and is the safe area where collision among the nest 90, the SX-V3 arm 60 and the Cambot arm 112 cannot occur.

As shown in FIG. 20, the Cambot manual mode home sequence 270 begins by proceeding to step s150, where, for example, an operator initiate the sequence 270 by activating a start switch. Next in step s152, the central processor checks to see if the nest up limit switch X1 is on, indicating that the nest 90 is in the up position. This step s152 is similar to step s26 shown in FIG. 12. If the switch X1 is on, where the nest 90 is in the up position, then path p154 is followed, which returns the Cambot manual mode home sequence 270 from step s152 to the beginning of step When the nest 90 is lowered, which turns off the switch X1, then the Cambot home sequence 270 proceeds to step s156 and the status of an SX-V3 safety area limit switch X118 is checked. The safe area of the SX-V3 robot 42 is an area where the SX-V3 arm 60 is near the molding apparatus 10, where the SX-V3 cannot collide with the nest 90 or the Cambot arm 112. If the SX-V3 safety switch X118 is on, indicating the SX-V3 is not in the safe area, then path p158 is followed to step s160.

In step s160, the status of an SX-V3 flop area limit switch X119 is checked by the central processor. Similar to the SX-V3 safe area, the SX-V3 flop area 305 is also an area where the SX-V3 42 cannot collide with the nest 90 of the Cambot arm 112. However, instead of the SX-V3 arm 60 being near the molding apparatus 10 as is the case for the SX-V3 safe area, the SX-V3 flop area 305 is near the nest 90. If the SX-V3 flop area limit switch X119 is on, indicating the SX-V3 is not in the safe flop area, then path p162 is followed from step s160 to the beginning of step s150.

If the SX-V3 flop area limit switch X119 is off, indicating that the SX-V3 is in a safe flop area, then path p164 is followed to step s166. Similarly, if the SX-V3 safety area limit switch X118 is off, indicating that the SX-V3 is in the safe area near the molding machine 10, then the Cambot home sequence 270 proceeds from step s156 to step s166.

In step s166, which is similar to step s54 shown in FIG. 16, the Cambot run switch Y18 is turned on. This cycles the Cambot through its movements c1–c7, shown in FIG. 13. In step s168, the central processor checks the status of the Cambot home limit switch X19, similar to step s82 shown in FIG. 16. Path p170 is followed back to the beginning of step s168, until the Cambot reaches its home position 104 (FIG. 13), and turns on the Cambot home limit switch X19. At this point, the Cambot home sequence 270 proceeds to step s172, where the central processor turns off the Cambot run switch Y18. This positions the Cambot 44 at its home position 104 (FIG. 13), which enable commencement of the various auto sequences, and ends Cambot home sequence 270.

Figure 21:
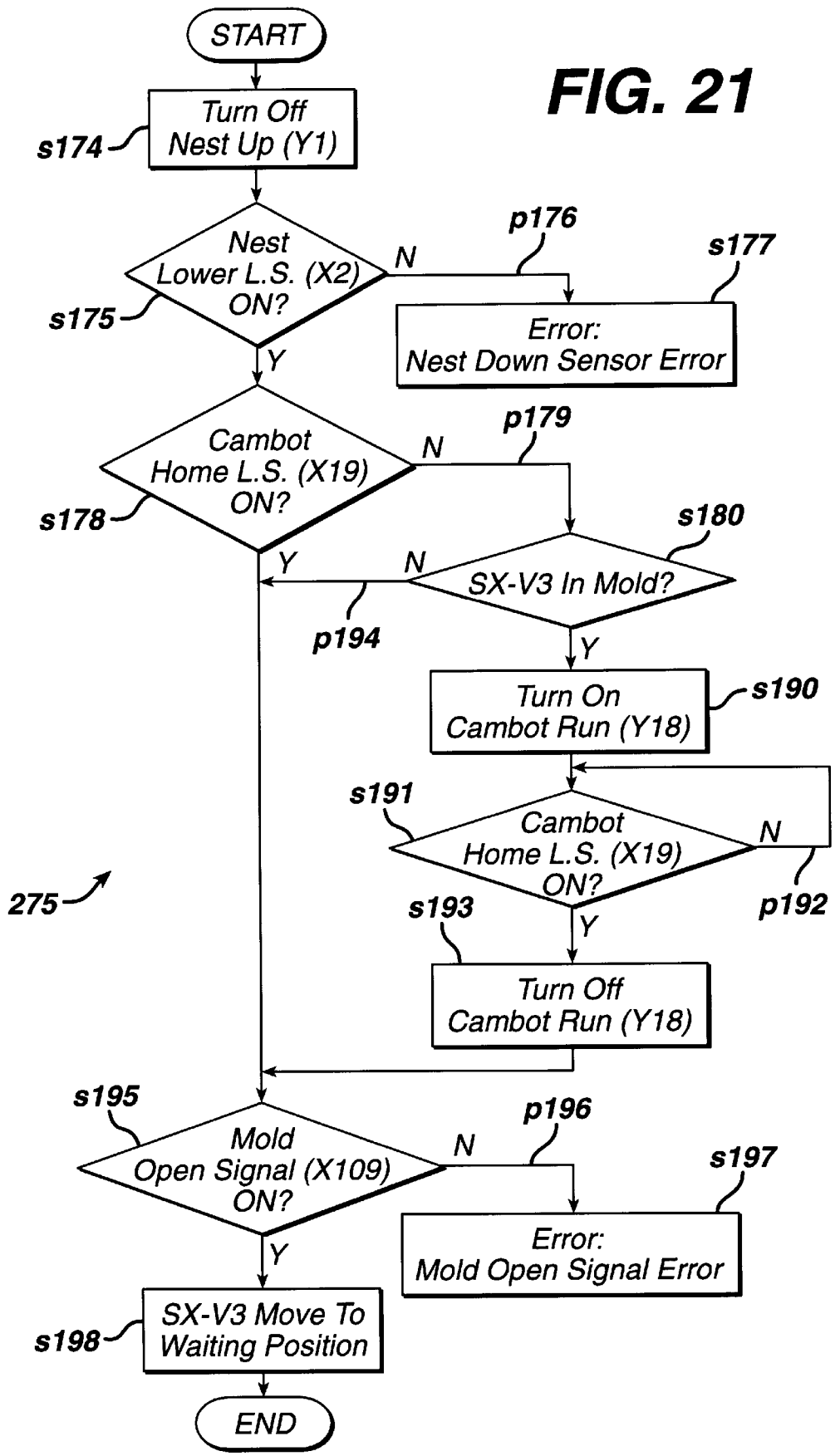
FIG. 21 illustrates a flow chart of a robotic arm home sequence for base and primary package molds according with the present invention.

FIG. 21 shows an SX-V3 home or initialization sequence 275, where its last step s198, returns the SX-V3 to its waiting position 68, shown in FIG. 8. In the first step s174 of the SX-V3 home sequence 275, the central processor turns of the nest lift up switch Y1, similar to that performed in step s42 of the SX-V3 auto sequence 102, shown in FIG. 12. This lowers the lift 150, thus lowering the nest 90.

Next in step s175, the central processor ascertains the status of the nest lift low limit switch X2, similar to that performed in step s44 of the SX-V3 auto sequence 102, shown in FIG. 12. If this switch X2 is off, then path p176 is followed and, in step s177, a message is displayed which is similar to that displayed in step s48 of the SX-V3 auto sequence 102, shown in FIG. 12. At this point, for example, the central processor turns off the base curve transfer assembly 40 awaiting error correction by an operator.

If in step s175, the nest lift low limit switch X2 is on, then in step s178, the central processor ascertains the status of the Cambot home limit switch X19, similar to step s82 of the Cambot run sequence 152, shown in FIG. 16. If the Cambot home limit switch X19 is off, indicating that the Cambot is not at its home position 104 (FIG. 13), then path p179 is followed to step s180.

In step s180 of the SX-V3 home sequence 275 shown in FIG. 21, the central processor ascertains whether the SX-V3 is in the mold position, which is located in the opening 66 (FIG. 7) between the two molding elements 12, 14 of the molding machine 10. If the SX-V3 is in the mold position, indicating that it is safe to move the Cambot, then in step s190, the central processor turns on the Cambot run switch Y18.

In step s191, the central processor ascertains the status of the Cambot home limit switch X19. If this switch X19 is off, indicating the Cambot is not at its home position 104 (FIG. 13), then path p192 is followed to repeat step s191. When the Cambot home limit switch X19 is on, indicating the Cambot is at its home position 104 (FIG. 13), then in step s193, the central processor turns off the Cambot run switch Y18, thus stopping the Cambot at its home position 104. Next, the SX-V3 home sequence 275 continues to step 195.

Returning to step s180, if the SX-V3 is not in the mold position, then path p194 is followed back to step s194. Similarly, if in step s178, the Cambot home limit switch X19 is on, indicating the Cambot is at its home position 104 (FIG. 13), then the SX-V3 home sequence 275 proceeds to step s195. In step s195, the central processor ascertains the status of a mold open signal X109. If this switch or signal X109 is off, then path p196 is followed to step s197, and the central processor displays an appropriate error message. At this point, the central processor may also shut down the transfer assembly 40, which includes the molding machine 10, the SX-V3 robot 42 and the Cambot 44 (FIG. 7), until the error is correct by an operator, for example.

If in step s195, the mold open signal X109 is on, indicating the two molding element 12, 14 of the molding machine 10 (FIG. 6–7) are separated to form the opening 66, then the SX-V3 moves to its waiting position 68, shown in FIG. 8. Note, the SX-V3 home sequence 275 is identical for both the back curve mold sections 20 (FIG. 1) and the primary package 30 (FIG. 5).

This completes the various sequences of transporting the base curves 20 from the molding machine 10 to the nitrogen tunnel 58, which must be performed rapidly, as measured by the exposure timer sequence initiated at step s10 in the SX-V3 auto sequence 102 shown in FIG. 12.

Figure 22:
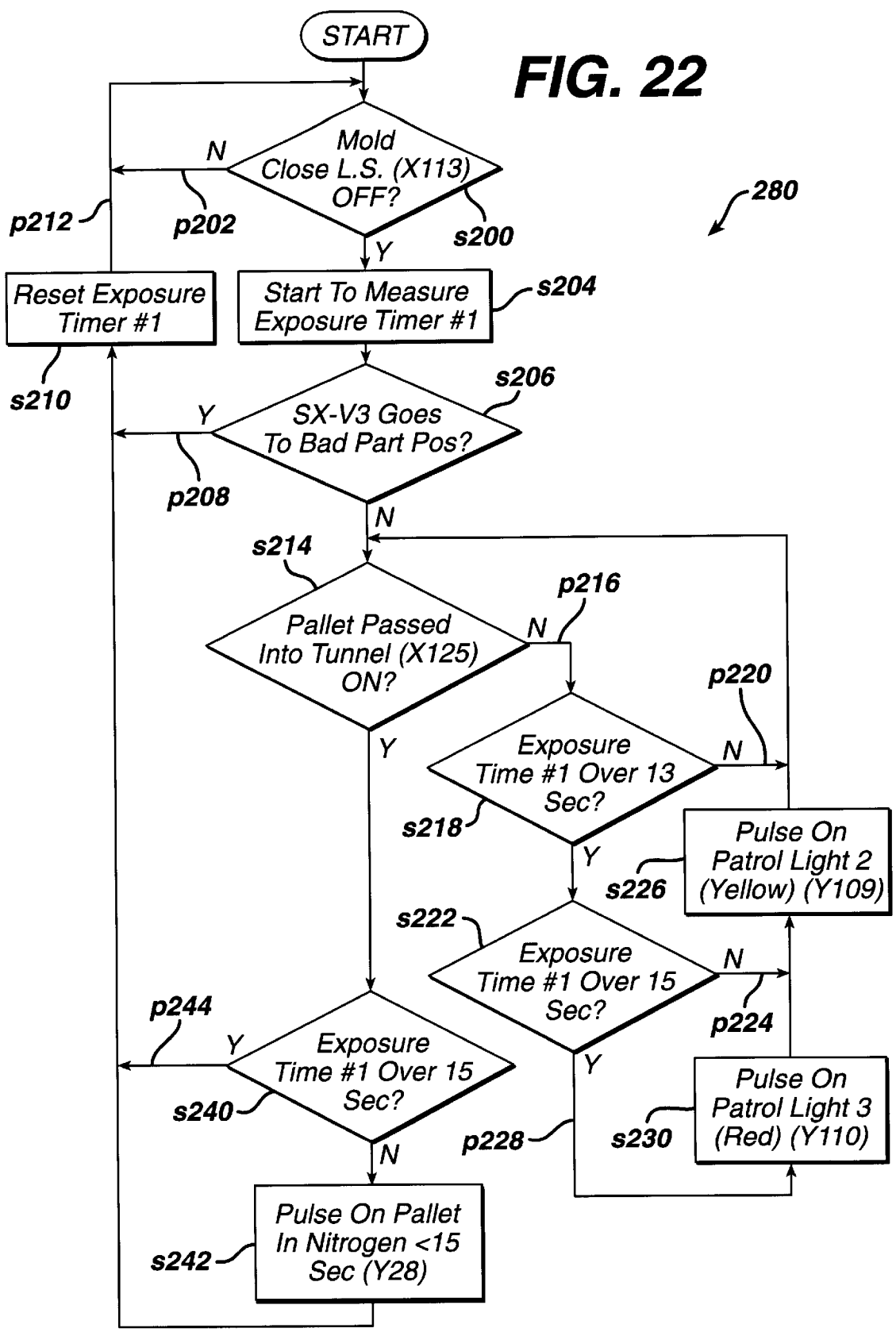
FIG. 22 illustrates a flow chart of an exposure timer sequence activated in transferring base, front and primary package molds according with the present invention.

FIG. 22 shows the exposure timer sequence 280 in detail, which is activated in step s10 in the SX-V3 auto sequence 102 shown in FIG. 12. The exposure timer sequence 280 applies to the fabrication of both the base and front curve mold sections 20, 22 (FIGS. 1–4), which are manufactured by their two different respective devices 40 (FIGS. 6–7) and 40' (FIGS. 25–26). In essence, the base and front curve molded articles 20, 22 are rejected and discarded upon exposure thereof to oxygen or air for a predetermined time, such as for 15 seconds or more. Note, it is not necessary to transfer the primary package mold sections 30, shown in FIG. 5, to a nitrogen environment. Accordingly, the exposure timer sequence 280 of FIG. 22 is not applicable to the transfer of the primary package mold section 30.

As shown in step s200 of FIG. 22, after the exposure timer sequence 280 is activated in step s10 of FIG. 12, the central processor checks a mold close limit switch X113 to determine if the two elements 12, 14 of the molding machine 10 (FIG. 7) are opened. If the mold close limit switch X113 is on, indicating that the molding machine elements 12, 14 are closed, then path p202 is followed back to the beginning of step s200. When the molding machine elements 12, 14 open, which turns off the mold close limit switch X113, then the exposure timer sequence 280 proceeds to step s204.

In step s204, the central processor starts to measure an exposure timer #1. Next in step s206, the central processor ascertains whether the SX-V3 42 is going to the bad part position to release a bad part in the bad part element 96 (FIG. 6). If the SX-V3 42 went to the bad part position 96, then path p208 is followed to step s210, where the central processor resets the exposure timer #1 and path p212 is followed back to the beginning of step s200.

If the SX-V3 42 is not proceeding to the bad part position 96, then the exposure timer sequence 280 proceeds to step s214, where the central processor checks the status of a pallet passed into nitrogen tunnel switch X125. If this switch X125 is off, indicating that pallets 54a (FIG. 18) has not passed into nitrogen tunnel 58, then path p216 is followed to step s218.

In step s218, the central processor checks whether the exposure timer #1 has counted for over 13 seconds. If not, then path p220 is followed back to the beginning of step s214. If the exposure timer #1 has counted for over 13 seconds, then in step s222, the central processor checks whether the exposure timer #1 has counted for over 15 seconds. If not, then path p224 is followed back to the beginning of step s214, through step s226. In step s226, a yellow patrol light is pulsed, by turning on switch Y109, to warn of a possible bad part.

If the exposure timer #1 has counted for over 15 seconds in step s222, then path p228 is followed back to the beginning of step s214, through steps s230 and s226. In step s230, a red patrol light is pulsed, by turning on switch Y110, to warn of a bad part. Thus, when a bad part is detected by having the exposure timer #1 count for over 15 seconds, then both the red and yellow lights are pulsed on. Illustratively, the yellow and red warning lights are located over the robotic SX-V3 assembly 42. Note, none of the manufacturing or transfer assemblies are turned off upon detection of an actual or possible bad parts. Rather, only one or both yellow and red warning lights are flashed.

Returning to step s214, if the pallet passed into tunnel switch X125 is on, indicating that pallets 54a (FIG. 18) did pass into nitrogen tunnel 58, then the exposure timer sequence 280 proceeds to step s240. In step s240, the central processor checks whether the exposure times #1 has counted for over 15 seconds. If not, the exposure timer sequence 280 proceeds from step s240 to step s242. In step s242, switch Y28 is pulsed which pulses a signal that allows identification of good base or front curve molded articles 20, 22 that were exposed to air for less than 15 seconds. Such identification may be tagging the pallet with a proper bar code, for example.

Next, the exposure timer sequence 280 proceeds from step s242 to step s210, where the exposure timer #1 is reset and path p212 is followed to the beginning of the exposure timer sequence 280, ready for recycling upon being started when the two molding elements 12, 14 of the molding machine 10 separate and expose the molded article to air, e.g., in step s10 of FIG. 12.

If the exposure timer #1 has counted for over 15 seconds, then path p244 is followed from step s240 to step s210, where the exposure timer #1 is reset and the exposure timer sequence 280 complete a cycle by returning to its first step s200.

Figure 23:
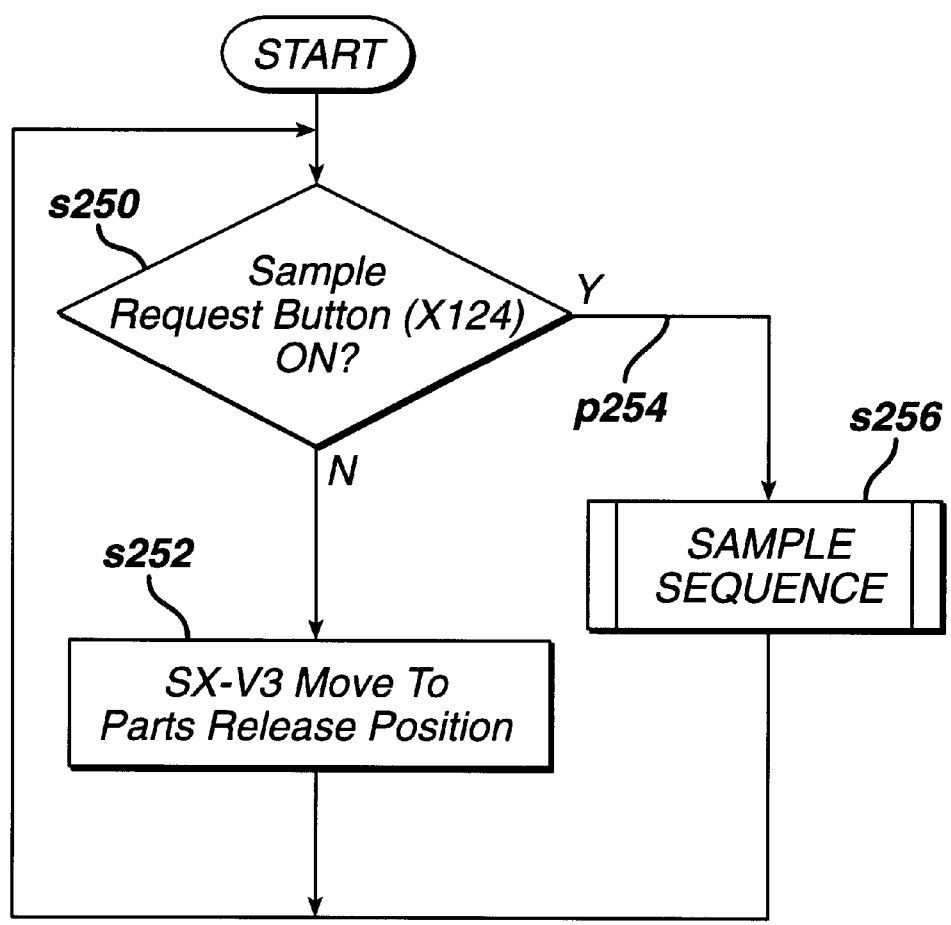
FIGS. 23–24 illustrates a flow chart of an parts sample sequence according with the present invention.
Figure 24A:
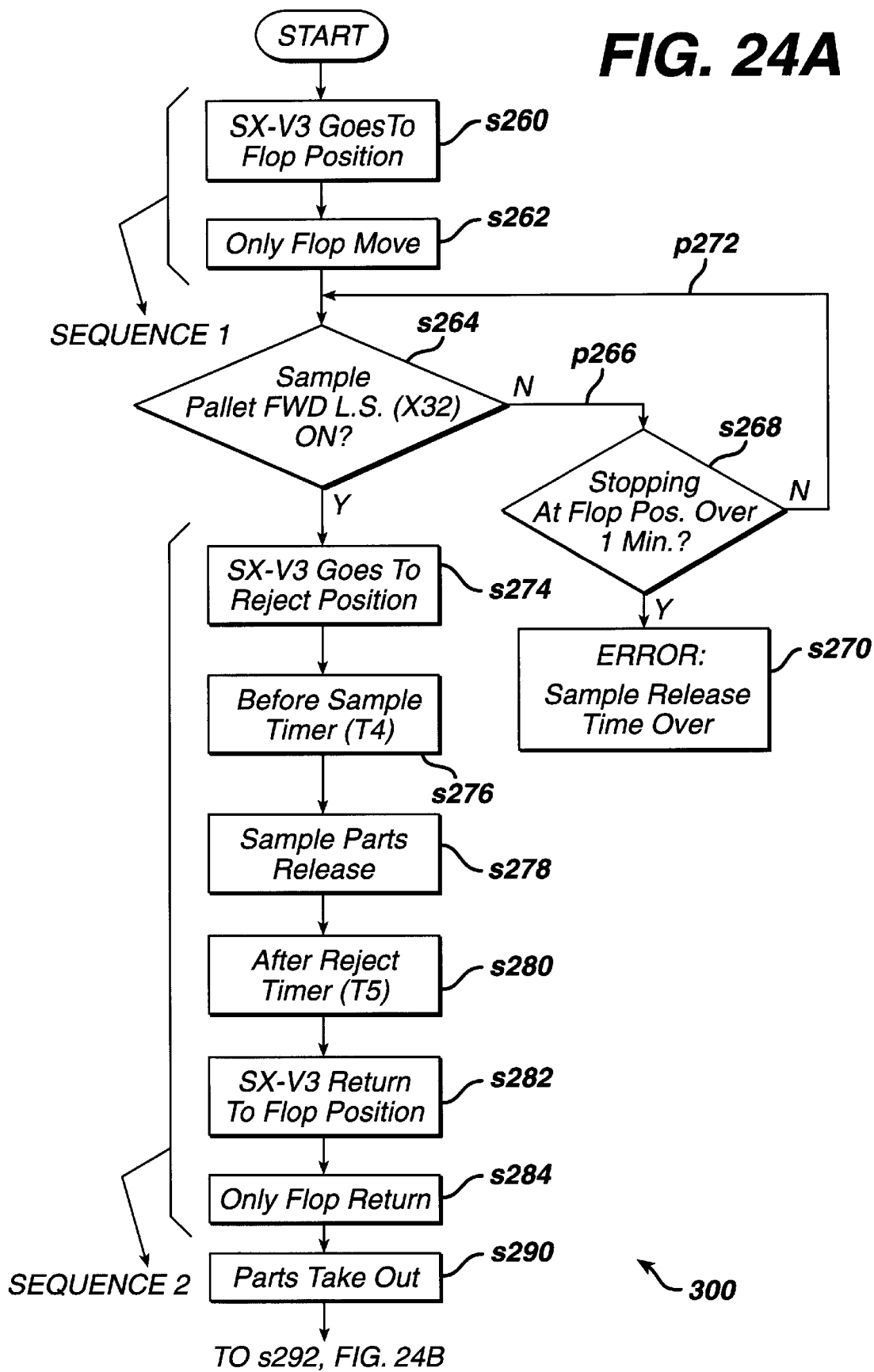

FIGS. 23–24 show steps associated with taking samples of the base curve, front curve, or primary package molded articles 20, 22, 30. FIG. 23 is a parts sample sequence 290 which begins in step s250 by ascertaining the status of a sample request button X124, also shown in FIG. 6. The sample request button X124 is activated when it is desired to collect sample molded articles. In FIG. 6, numeral 240 is a pallet for collecting base curve mold samples 20.

As shown in FIG. 23, if the sample request button X124 is not on, then the parts sample sequence 290 proceeds to step s252, which allows the SX-V3 to continue moving from the molding machine 10 toward the SX-V3 parts release position 46. After step 252, the parts sample sequence 290 returns to its beginning at step s250.

For the case of back curve or primary package molded articles 20, 30, they are released from the SX-V3 suction cups 70 onto the nest 90. However for the case of front curve molded articles 22, they are released from the SX-V3 suction cups 70 directly onto the Cambot, as will be described in connection with FIGS. 25–27.

If the sample request button X124 is on, then path p254 is followed from step s250 to step s256 where a sample sequence 300 is initiated, which is shown in detail in FIG. 24. After completion of step s256, the parts sample sequence 290 returns to step s250.

As shown in FIG. 24, the sample sequence 300 begins in step s260 by moving the SX-V3 to a flop position, after removing the molded articles from the molding machine 10. The flop position is located a safe distance from the part reject position 96 and shown in FIG. 6 as numeral 305. In this flop position 305, the SX-V3 plate 62 has rotated from its vertical position to a horizontal position. In step s262, the central processor stops the SX-V3 arm 60 at the flop location 305 when the sample request button X124 is activated, e.g., by an operator, in step s250 (FIG. 23). Steps s260, s262 are designated as sequence 1.

After activating the sample request button X124 in step s250 (FIG. 23), the sample pallet 240 is moved manually pushed by an operator, for example, from its standby position, shown in FIG. 6, to the bad part release position 96. This must be done within one minute for continued operation. Otherwise, the SX-V3 is stopped and an error is indicated, as will be described in connection with steps s264–s270.

Moving the sample pallet 240 to the bad part release position 96 activates a sample pallet forward limit switch X32, where its status is ascertained by the central processor in step s264. If this switch X32 is not on, indicating there is no sample pallet 240 over the bad parts plate 96, then path p266 is followed to step s268. In step s268, the central processor checks whether the SX-V3 arm 60 has been in the flop position 305 for more than 1 minute. If so, then in step s270, the back curve transfer apparatus 40 is stopped and an alarm is activated indicating that an error during sampling has occurred. Upon correction of this error, the back curve transfer apparatus 40 is reinitialized prior to continuing its normal automatic cycle described above. For example, the SX-V3 and Cambot home sequences 270, 275, shown in FIGS. 20 and 21, respectively, are performed. If the SX-V3 arm 60 has not been in the flop position 305 for more than 1 minute, then path p272 is followed from step s268 back to step s264.

When the sample pallet 240 is moved to cover the bad parts plate 96, thus turning on the sample pallet forward limit switch X32, the sample sequence 300 proceeds from step s264 to step s274, where the SX-V3 moves to the reject position 96. Next in steps s276–s282, the samples are released from the SX-V3 suction cups 70 onto the sample pallet 240. Further, in steps s276, s280, before and after sample timers T4, T5 are activated before and after the sample release step s278, respectively. In step s284, the SX-V3 42 returns to the flop position 305 after releasing the samples in step s278. Similar to step s262, in step s284, the SX-V3 42 stops at the flop position 305. Steps s274 to step s284 are designated as sequence 2.

Next, a similar cycle is repeated twice to discard the next two sets of articles removed from the molding machine 10 as follows. The molded articles are discarded to allow time for sample collection, including moving the sample pallet between the standby and sample collect (or discard) positions 240, 96 (FIG. 6) while the transfer apparatus 40 is continuously operating. Thus, sample collection does not require shutting down the transfer apparatus. Instead, few sets of molded articles are discarded until the sample pallet is moved back to its standby position 240 after collecting a sample from the sample or discard position 96. Note, although during the sample sequence 300 of FIG. 24, two sets of molded articles are discarded, additional sets may also be discarded as needed for safe sample collection, for example, when the transfer apparatus is operating at higher speeds. More particularly, in step s290, the SX-V3 returns to the molding machine 10 and takes out another set of molded articles. The next step s292 performs sequence 1, namely, steps s260, s262.

In step s294, the central processor ascertains the status of a sample safe area limit switch X31, which is activated when the sample pallet is pulled back, e.g., by an operator, from the bad part release position 96 to its standby position 240. When the sample safe area limit switch X31 is not on, then path p296 is followed and steps s298, s300 are performed which are identical to steps s268, s270. Thus if, within 1 minute, the sample safe area limit switch X31 is not on, i.e., if the sample pallet is not removed from the bad part release position 96, then an appropriate sample release time out error message is displayed in step s300 and the SX-V3 is shut down. Illustratively, the error indicates that the sample pallet is still in the bad parts release position 96, and is not yet pulled back to its standby position 240.

If the sample pallet is removed from the bad part release position 96, thus turning on the sample safe area limit switch X31, then after step s294, sequence 2 is performed in step s302. Note, sequence 2 is steps s274 to steps s284. In step s302, the sample is released at a step analogous to step s278. This released sample 20, 22, or 30 is discarded though tube 98, since the sample pallet 240 is no longer over the reject position 96, as ascertained in step s294. This sacrifices a set of molded articles, which may be front, base or primary package molds 20, 22, or 30. The next two steps s304, s306 are identical to step s290, s292. After performing sequence 1 in step s306, the central processor ascertains the status of the sample request button X124 in step s308, as also performed in step s250 of the parts sample sequence 290, shown in FIG. 23.

When the sample request button X124 is not off, then path p310 is followed from step s308, and steps s312, s314 are performed which are identical to steps s268, s270, as well as steps s298, s300. Thus if, within 1 minute, the sample request button X124 is not off, then an error message, e.g., indicating that button X124 is not off, is displayed in step s314 and the SX-V3 is shut down.

If the sample request button X124 is off, then, after step s308, sequence 2 is repeated in step s316. Similar to step s302, another set of molded articles are sacrificed in step s316 by releasing them into the tube 98. In the next step s318, the SX-V3 returns to its waiting position, namely the position shown in FIG. 7, also shown as numeral 68 in FIG. 8, where the SX-V3 plate 62 is in the vertical position. This completes the sample sequence 300 as well as description of steps associated with handling the base curve molded articles 20, upon their removal from the molding machine 10.

A racetrack mode sequence will be described later in connection with FIG. 42–43, where all the base curve molded articles 20 are rejected, i.e., removed from the molding machine 10 and released by the SX-V3 into the bad parts release element 96 for discarding through the tube 98. In the racetrack mode, the pallets continue to move down the conveyor belt 50 into the nitrogen tunnel 58 without containing any molded articles.

(B) Transport of Front Curves by Apparatus

FIGS. 25 and 26 show an apparatus used for transporting front curves 22 of lens forming molds from another molding machine 10', which is similar to the molding machine 10, shown in FIGS. 6–7, used for molding the base curves 20. Elements in FIGS. 25–26, which are similar to their counter parts in FIGS. 6–7, are designated by a adding a prime to the elements in FIGS. 6–7.

The front curve assembly 40' (FIGS. 25–26) is basically identical in design and function to the base curve assembly 40 (FIGS. 6–7), however, the nest 90 used with the base curve assembly 40 is dispensed with. Instead, after removal from the molding machine 10', the front curve are directly transferred from the SX-V3 robot 42' to the Cambot 44' at the SX-V3 parts release location 46'.

As shown in FIG. 26, and unlike the base curve Cambot arm 112 (FIGS. 6–7), the front curve Cambot arm 112' rotates along its longitudinal axis by 180° in direction H. This rotation H is during the Cambot movement, in the horizontal plane, between its horizontal to vertical positions as viewed from the top and shown in FIG. 25, where the front curves 22 are transferred from the SX-V3 suction cup 70' to the Cambot suction cup 116', and then to a conveyor belt 160 for transport to the nitrogen tunnel 58. Note, two separate conveyor belts 160, 50 are shown in both FIGS. 6, 25 for transporting the front and base curves 22, 20, respectively.

Another difference between the back and front curve assemblies 40, 40' is that the front curve Cambot suction cups 116' have a size and shape which are sightly different from the back curve Cambot suction cups 116. The front curve Cambot suction cups 116' do not touch the critical inner curved side 24 (FIG. 1) of the front curve sections 22. Rather, the front curve Cambot suction cups 116' hold the front curve sections 22 from its flanges 28, for example. The front curves 22 are removed from the molding machine 10' in a converse orientation to that of the base curves. Consequently, during their transport to the conveyor belt 160, the front curves 22 are inverted by 180° about their plane in direction H.

As the SX-V3 vacuum head 64' is retracted from the mold elements 12', 14', and rotated into horizontal orientation prior to reaching the SX-V3 parts release location 46', rather than the molded articles 22 being deposited onto a nest 90, as the base curves 20 are in the base curve transport assembly 40 (FIG. 6–7), this nest 90 is rendered redundant and consequently is eliminated together with its operative structure.

The arm 112' of the front curve rotary parts handling system or Cambot 44', which has the rotatable and vertically reciprocable cam-controlled member 110', may be shorter in length than the back curve Cambot arm 112. The front curve Cambot arm 112' deposits the front curves 22 on pallets 54' that travel on a conveyor belt 160 which is adapted to run in simultaneous operative parallel relationship with back curve conveyor belt 50, shown in both FIGS. 6, 25.

Figure 27:
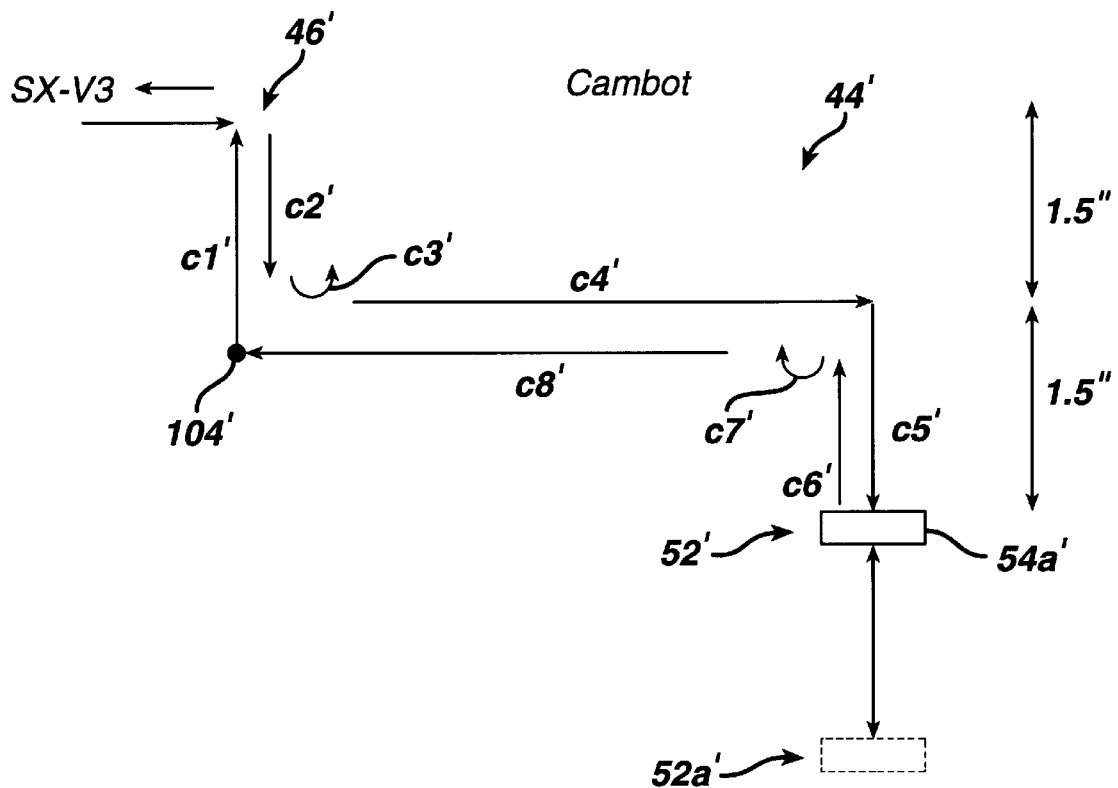
FIG. 27 illustrates movement of a rotary cam-controlled arm for transporting front curve molds according with the present invention.

FIG. 27 shows movement of the Cambot 46' where in its home position 104', the arm 112' is horizontal to locate the plate 114' at the SX-V3 parts release position 46', half way or at the center of its up and down range of 3 inches. In the Cambot home position 104', the Cambot plate 114' faces up. Cambot movement c1' raises the plate 114' up by 1.5 inches from its home position 104' to the SX-V3 parts release position 46', where the raised and up facing plate 114' receives the front curves from the SX-V3 suction cups 70', which is rotated around direction D' to be in the horizontal direction.

After receiving the front curves 22, the Cambot moves down by 1.5 inches, shown as movement c2', rotates c3' by 180° along direction H (FIG. 26). Now, the Cambot plate 114' faces down. Next, the Cambot arm 112' moves by movement c4' to a position which is vertical in regard to the plan view shown in FIG. 25, to locate the downwardly facing plate 114' over a pallet 54' located on the front curve conveyor belt 160. Instead of being sequential movements, the 180° head rotation (in direction H) and 90° arm rotation (in direction G) may be performed simultaneously as a compound movement.

Next the Cambot is lowered (movement c5' in FIG. 27) by 1.5 inches to release the front curves 22 onto the pallet 54'. Thereafter, the Cambot retraces its steps back to the home position 104' through movement c6', which moves the plate 114' 1.5 inches up; movements c7', c8' which rotates head by 180° to face up and moves it to the home position 104', 1.5 inches below the SX-V3 parts release location 46'.

At the Cambot parts release location, which is also the Cambot parts release position 52', the pallets are separated and advanced in sequence as described in connection with FIGS. 18–19, where the leading pallet is then raised by the lift 150 while in alignment with the Cambot plate 114', which is then moved downwardly and the vacuum released in cups 116' so as to enable the front curves to be received in the recesses 134' of the pallet 54'.

After the pallet 54a located at the Cambot parts release position 52 (FIG. 13) receives the front curves 22, the Cambot is raised 1.5 inches, and the lift 150 lowers the pallet 54a' for advancing to the nitrogen tunnel 58, as previously described in connection with FIGS. 18–19.

In essence, with the exception of the elimination of the nest 90 and the rotatable nature of the front curve Cambot arm 112 about its longitudinal axis so as to be able to invert the front curve molds 22, the function and sequence of operation is identical as with that described with respect to the base curve transports assembly 40 of FIGS. 6–7.

Figure 28A:
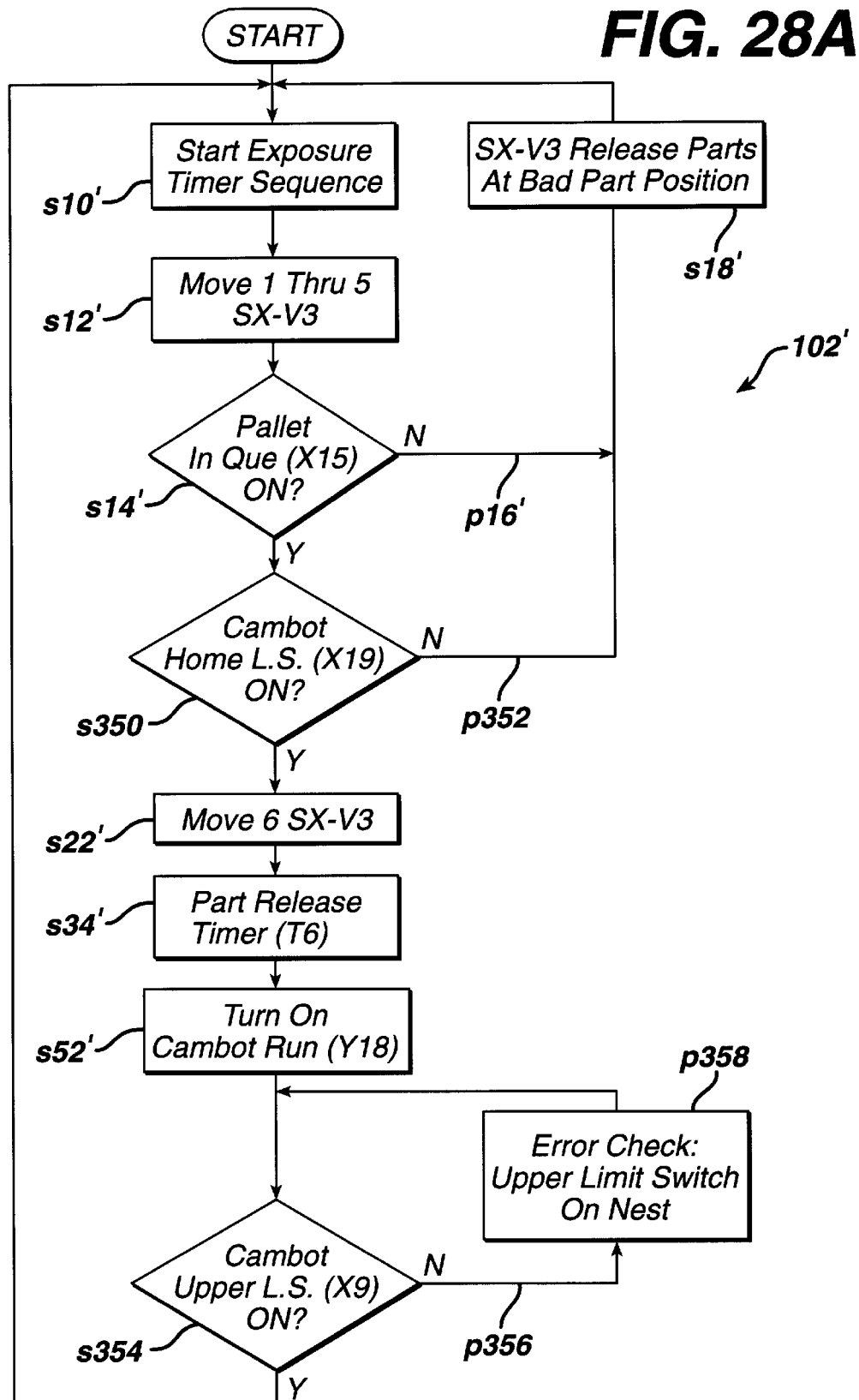
FIG. 28 illustrates a flow chart of a robotic arm automatic sequence to transport front curves according with the present invention.
Figure 28B:
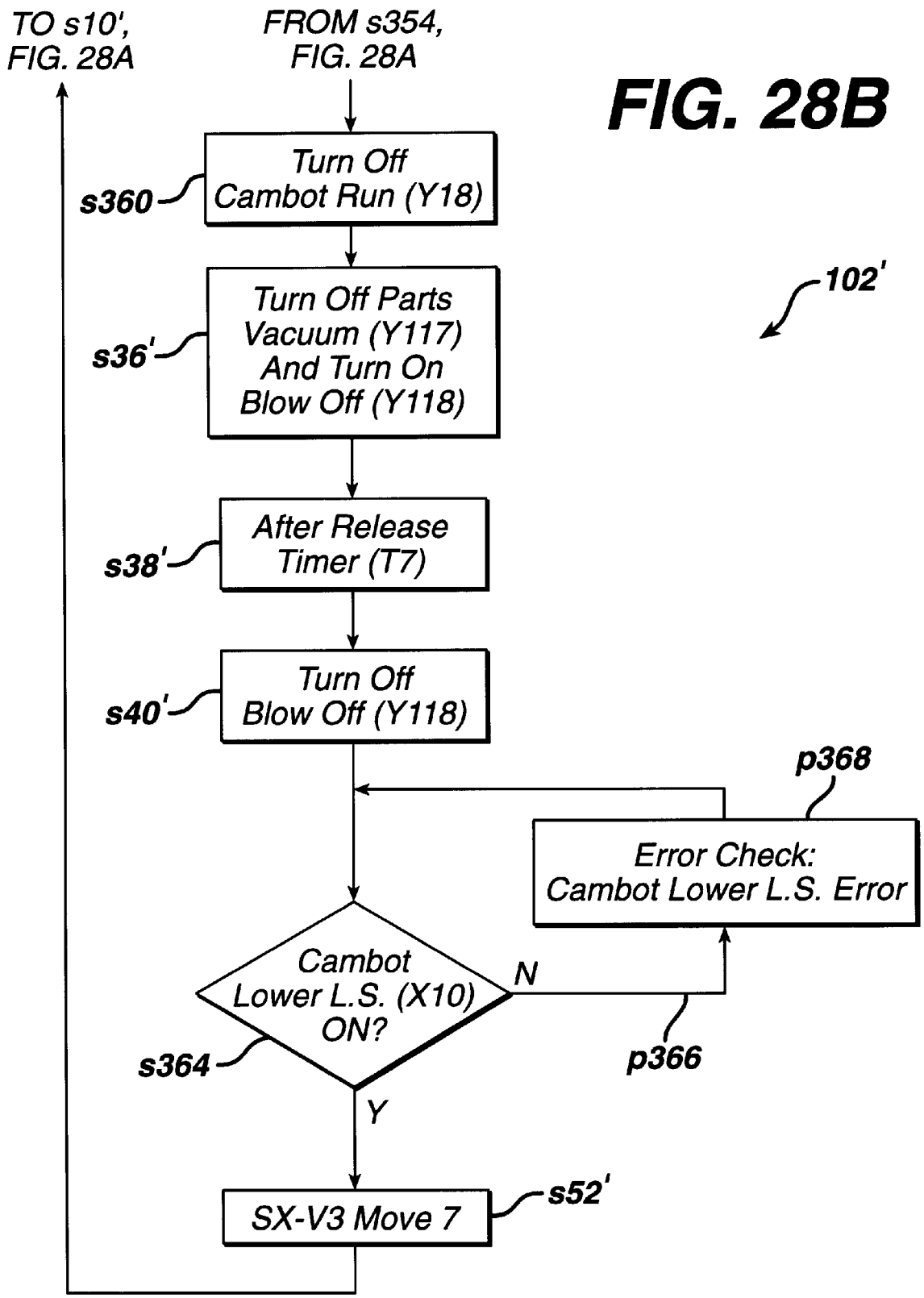

FIG. 28 shows a flow chart 102' of the SX-V3 automatic sequence for front curves. Step s10', s12', s14', s18' of the front curves SX-V3 auto sequence 102' have identical counterparts shown as the same reference numeral, but without the primes, in the base curves SX-V3 auto sequence 102, shown in FIG. 12. Thus, in step s10', the timer sequence 280 shown in FIG. 22 is started when the two molding machine elements 12', 14' separate and air exposure of the front curves 22 begin. As described in connection with the timer sequence 280 shown in FIG. 22, pallets containing overexposed front curves, i.e., exposed to air for more than 15 seconds, are identified as unacceptable for later discarding. In step s12', the SX-V3 moves through movement 1–5 as described in connection with in FIG. 8.

In step s14', the central processor check if the pallet in que switch X15 is on, i.e., whether a pallet 54' is present in the position 25040 to eventually receive the front curve mold sections 22, currently attached by vacuum suction on the SX-V3 suction cups 70'. Similar to that shown in FIGS. 18–19, if a pallet 54b' is not present at the que position 250', i.e., switch X15 is off, then path p16' is followed to step s18' where the SX-V3 42' releases the front curve mold section 22 attached to the SX-V3 suction cups 70' at the bad part position 96' (FIG. 24) attached to the discard vacuum tube 98'.

If a pallet 54b' is present in the que position 250', then after step s14', the front curves SX-V3 auto sequence 102' proceeds to step s350 where the central processor ascertains the status of the Cambot home limit switch X19. This step is similar to steps s58, s82 of the Cambot run sequence 152 shown in FIG. 16. If the Cambot is not at it home position 104' (FIG. 27), i.e., the Cambot home limit switch X19 is off, then path p352 is followed to step s18'.

If the Cambot is at it home position 104' (FIG. 27), i.e., the Cambot home limit switch X19 is on, where the Cambot plate 114' is facing up and is aligned in the SX-V3 part release location 46', ready for moving up 1.5 inches to receive front curve molds 22 from the downwardly facing SX-V3 plate 62', then in step s22', the SX-V3 moves through movement 6 (FIG. 8) to the SX-V3 part release location 46'. In step s34', the part release fine tuning timer T6 delays processing as necessary for proper alignment of the SX-V3 and Cambot suction cups 70', 116', at the SX-V3 part release location 46'.

Next, the Cambot run switch Y18 is turned on to begin a front curve Cambot run sequence 152' that will be described in connection with FIGS. 29–30. After the Cambot run switch Y18 is turned on, the Cambot begins to move up 1.5 inches toward the SX-V3 part release location 46'. When the Cambot moves up 1.5 inches, a Cambot upper limit switch X9 is turned on. In step s354, the central processor ascertains the status of the Cambot upper limit switch X9. If the Cambot upper limit switch X9 is not on, indicating the Cambot has not moved up by 1.5 inches, then path p356 is followed to step s358 where an appropriate error message is displayed and the front curve assembly 40' stops awaiting correction of the error, e.g., by manual intervention.

If the Cambot upper switch X9 is on, indicating the Cambot is up 1.5 inches ready receive the front curve molds 22 from the SX-V3 suction cups 70', then in step s360, the Cambot run is stopped by turning off the Cambot run switch Y18. The following three steps s36', s38', s40' are identical to step s36, s38, s40 in the back curve SX-V3 auto sequence 102 shown in FIG. 12. More particular, in step s36' the SX-V3 vacuum is turned off and air is turned on to blow off the front curves from the SX-V3 suction cups 70' onto the Cambot suction cups 116'. In step s38', the after release timer T7 is turned on to introduce a proper delay that insures complete transfer of the front curve molds 22 from the SX-V3 42' to the Cambot 44'. In step s40', the SX-V3 blow off air is turned off and the Cambot drop 1.5 inches as shown in movement c2' in FIG. 27.

Next, the front curve SX-V3 auto sequence 102' proceeds to step s364, where the central processor ascertains the status of a Cambot lower limit switch X10. If this switch X10 in off, indicating the Cambot has not dropped 1.5 inches yet, then path p366 is followed to step s358 where an appropriate message is displayed, and the front curve assembly 40' may be turned off awaiting error correction, e.g., through operator intervention.

If the switch X10 in on, indicating the Cambot did drop by 1.5 inches and it is safe for the SX-V3 to move, then in step s52', the SX-V3 moves through movement 7, shown in FIG. 8, to its waiting position 68, and the front curve SX-V3 auto sequence 102' returns to its beginning step s10' for recycling and repeating this sequence 102'.

Figure 29A:
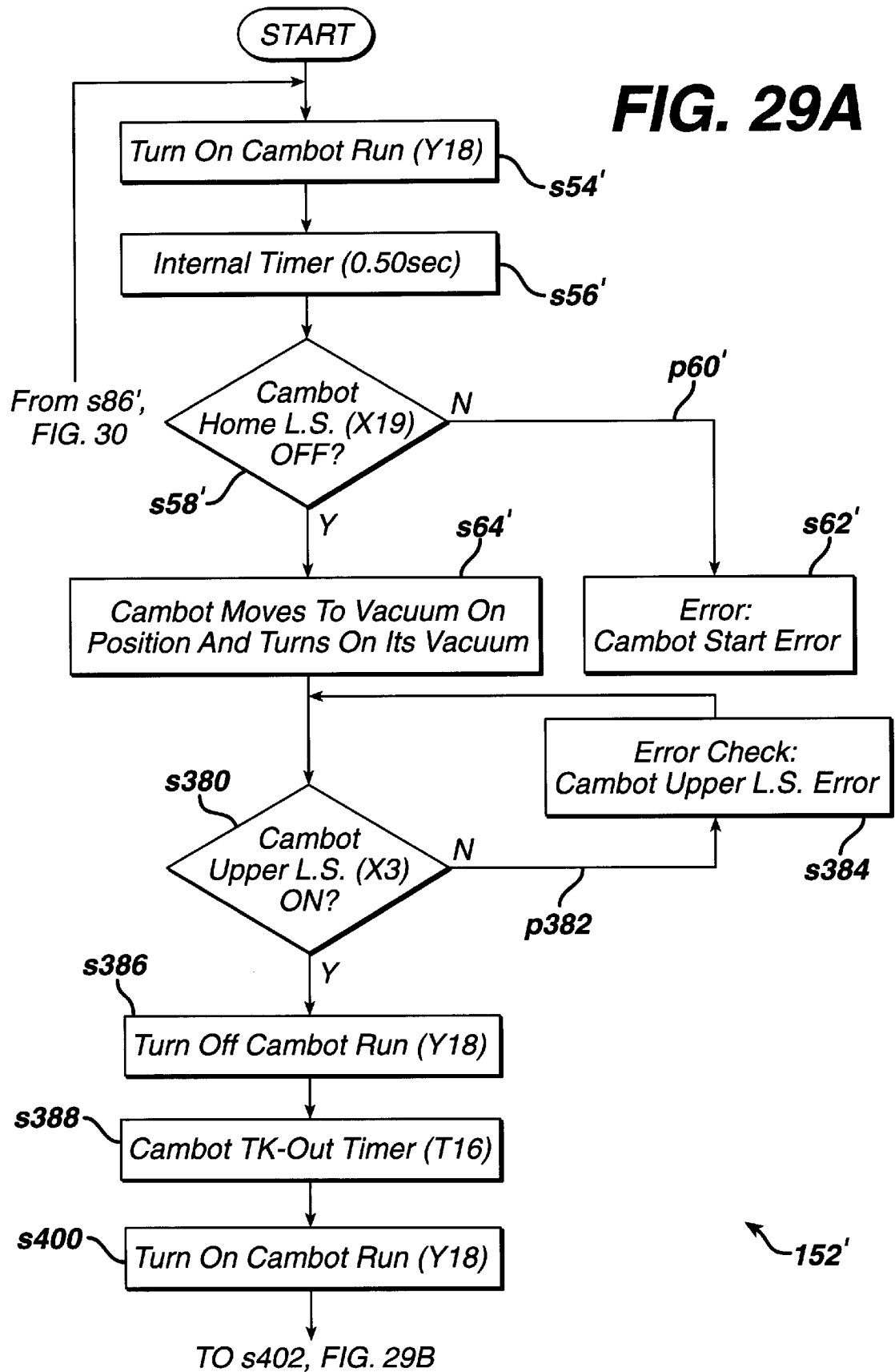
FIGS. 29 and 30 illustrate a flow chart of a cam-controlled arm automatic sequence to transport front curves according with the present invention.
Figure 29B:
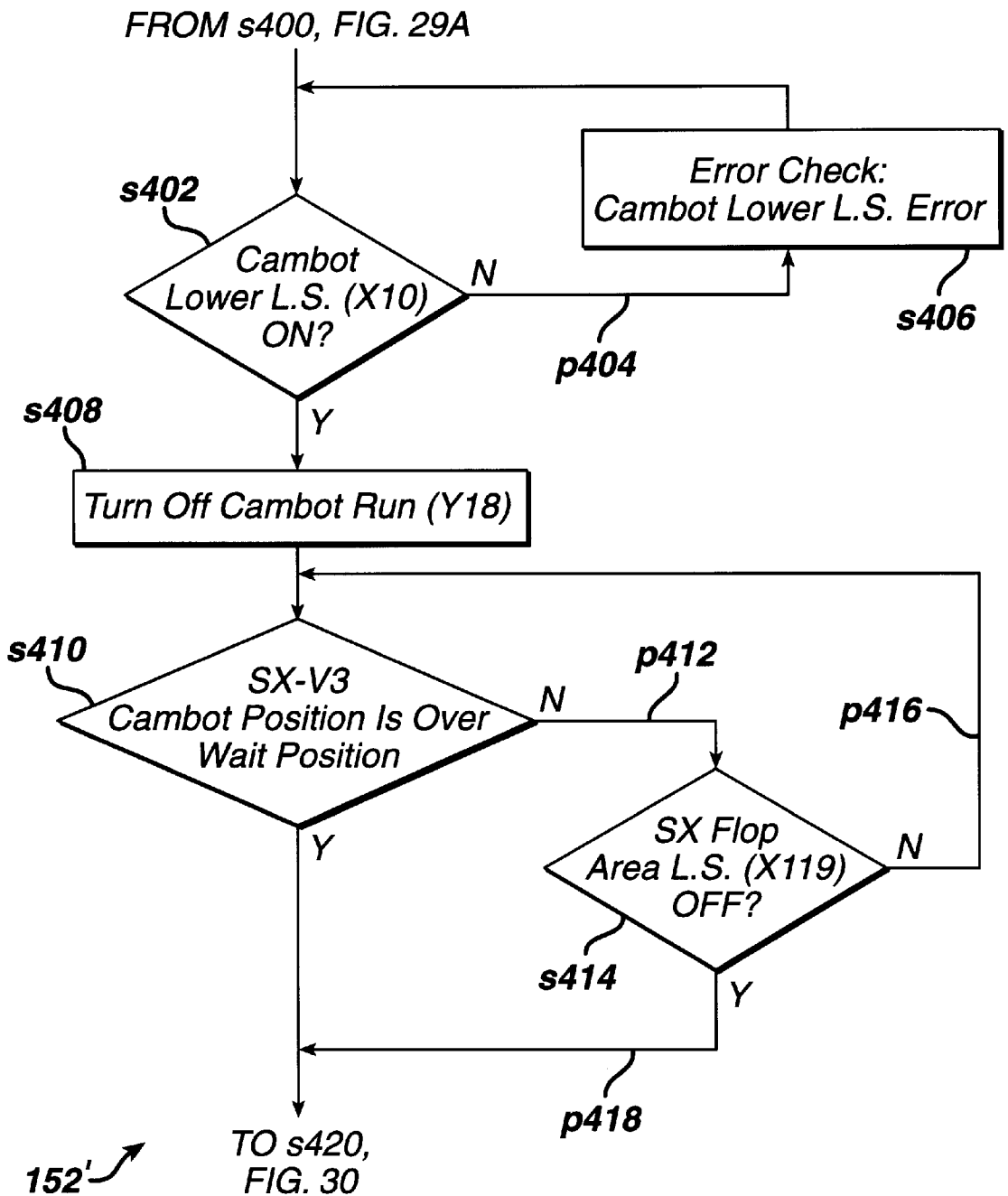
Figure 30:
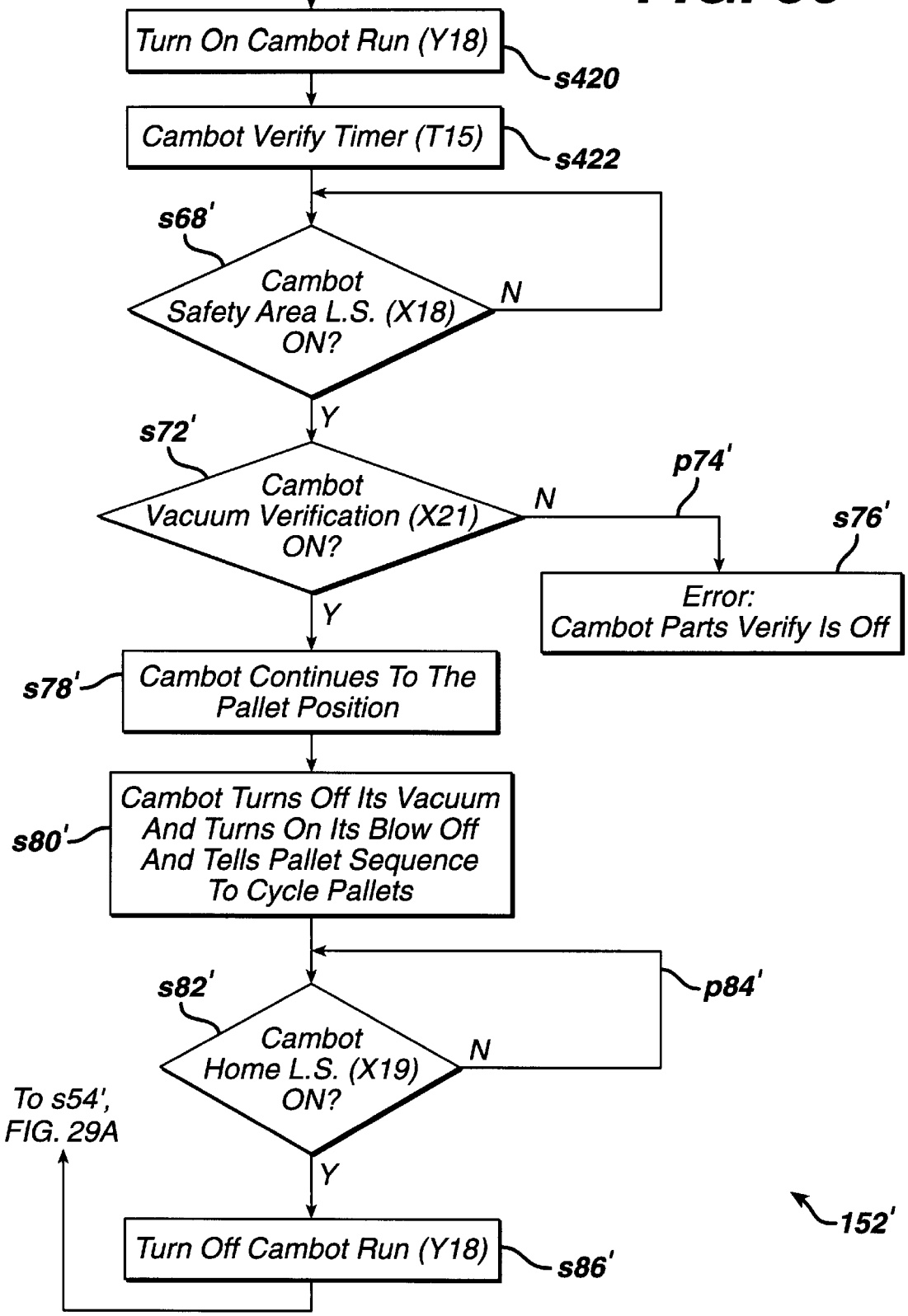
Figure 31:
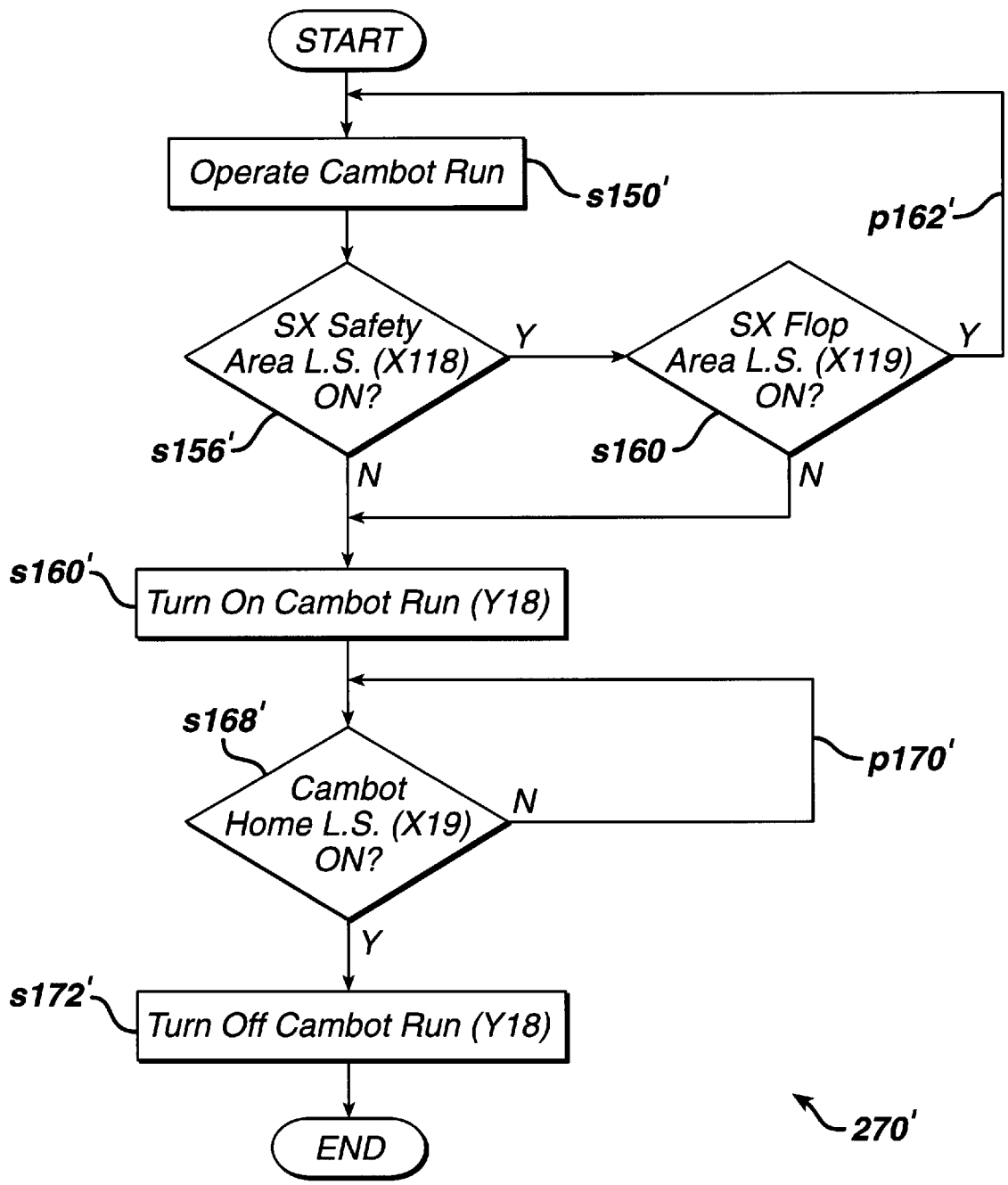
FIG. 31 illustrates a flow chart of a Cambot home sequence for front curve mold sections according with the present invention.

The front curve Cambot run sequence 152', shown in FIGS. 29–30 is described next, which is similar to the back curve Cambot run sequence 152 of FIG. 16. Steps s54', s56', s58', s62', s64' have identical counterpart steps in the back curve Cambot run sequence 152 of FIG. 16. Accordingly, a description thereof is omitted here. From step s64', the front curve Cambot run sequence 152' proceeds to step s380 where, as in step s354 of the front curve SX-V3 auto sequence 102' of FIG. 28, the status of the Cambot upper limit switch X9 is ascertained. If this switch X9 is off, then path 382 is followed to step s384 where an error message is displayed. At this point, the front curve Cambot run sequence 152' returns to step s380.

If the Cambot upper limit switch X9 is on, indicating the Cambot is raised 1.5 inches to receive the front curve molds 22 from the SX-V3 suction cups 116', then the Cambot run is turned off by turning off the Cambot run switch Y18 in step s386. A fine tuning timer T16 is activated in step s388 to provide a delay to allow the transfer of the front curve molds 22 from the SX-V3 suction cups 70' to the Cambot suction cups 116'.

In step s400, where the Cambot suction cups 116' has the front curve molds 22 thereon held by vacuum, the Cambot run is turned on by turning on the Cambot run switch Y18. In step s402, the status of the Cambot lower limit switch is ascertained, similar to step s364 of the front curve SX-V3 auto sequence 102' of FIG. 28. If this switch X10 is off, then the Cambot run sequence 152' proceeds through path p404 to step s406, where an error message is displayed and the sequence returned to step s402. At this point, for example, the front curve apparatus 40' may be stopped for manual intervention for error correction.

If this switch X10 is on indicating the Cambot dropped by 1.5 inches, as shown in movement c2' in FIG. 27, thus it is safe to move the SX-V3 away from the SX-V3 parts release position 46', then in step s408 the Cambot run switch Y18 is turned off until the SX-V3 moves to its waiting position 68, shown in FIG. 8. In step s410, if the SX-V3 current position is not at its waiting position 68, then path p412 is followed to step s414.

In step s414, the central processor ascertain the status of an SX-V3 flop area switch X119. If this switch X119 is on, indicating the SX-V3 has not moved out of the way from its parts release area 46' to its flop area 305' (FIG. 24), then path p416 is followed to repeat step s410. Otherwise, if switch X119 is off indicating the SX-V3 has moved to the flop area 305', then path p418 is followed to next step s420 of the front curve Cambot run sequence 152', shown in FIG. 30.

Returning to step s410, if the SX-V3 current position is at its waiting position 68, then the front curve Cambot run sequence 152' proceeds the step s420 shown in FIG. 30. In step s420, now than the SX-V3 has moved away from its parts release area 46' to its flop area 305', the Cambot run switch Y18 is turned on. In step s422, a fine tuning timer T15 is turned on to introduce a delay in further processing to allow the Cambot to move to a safe area.

The remaining step in the front curve Cambot run sequence 152' is identical to the back curve Cambot run sequence 152, shown in FIG. 16. Thus for brevity, a detailed description of these steps s68'–s86' is omitted, which were described in connection with steps s68–s86, shown in FIG. 16. During these steps s68'–s86', the Cambot transfers the front curve molds 22 to the pallet 54' and returns to the Cambot home position 104' shown in FIG. 27. At this point, the Cambot run is turned off in step s86', where one cycle of the Cambot run sequence 152' is completed, and the sequence 152' returns to its beginning step s54' (FIG. 29).

FIG. 30 shows a front curve Cambot home sequence 270', which is identical to the back curve and the primary package Cambot home sequence 270, described in connection with FIG. 20, except step s152 in FIG. 20 is deleted and not performed in the front curve Cambot home sequence 270' of FIG. 30. This is because the nest 90, shown in FIGS. 6–7 and used in the back curve assembly 40, is deleted from the front curve assembly 40', shown in FIGS. 25–26. Accordingly, the detailed description of the back curve Cambot home sequence 270 of FIG. 20 is equally applicable to the front curve Cambot home sequence 270' of FIG. 31.

Figure 32:
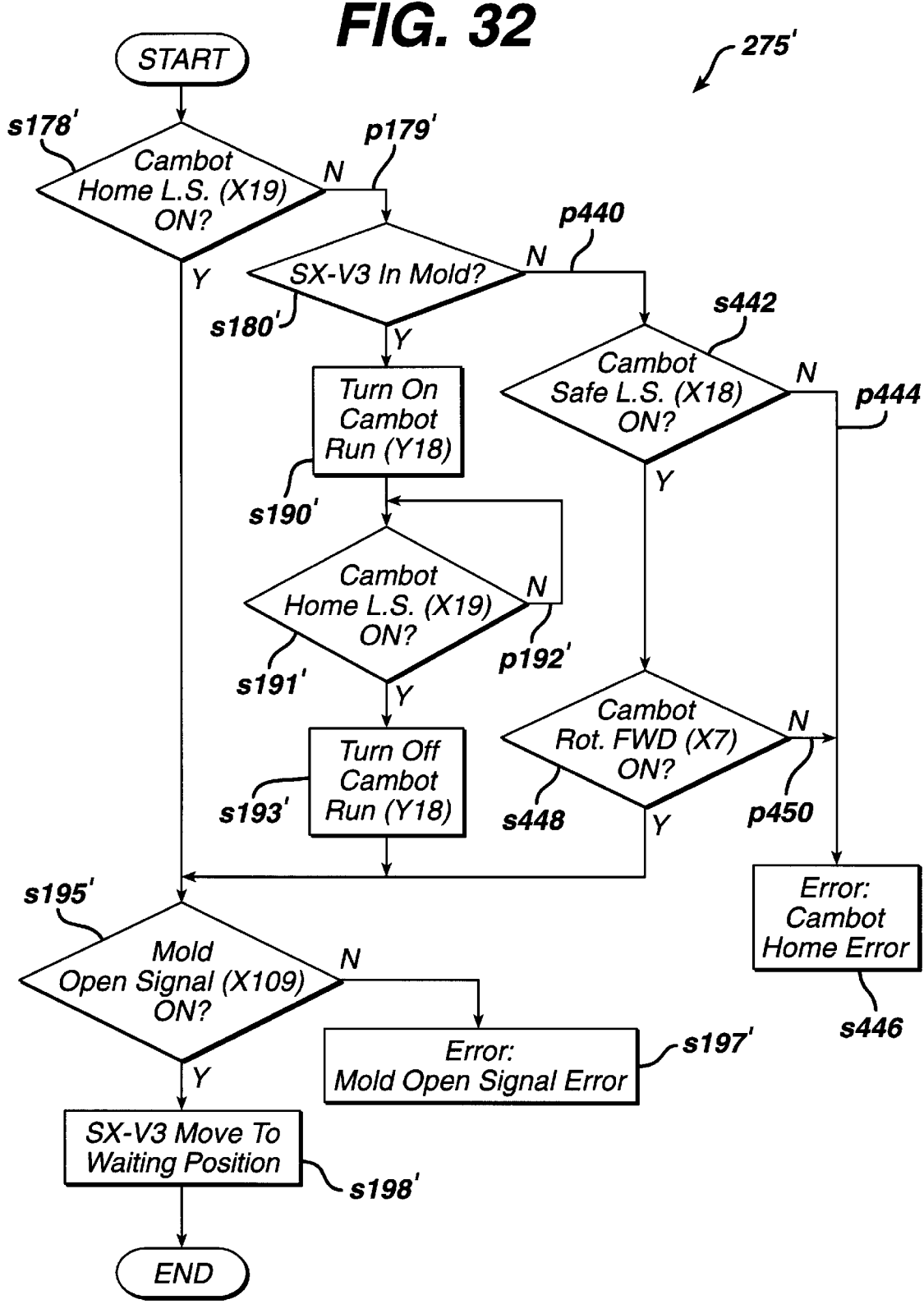
FIG. 32 illustrates a flow chart of a robotic arm home sequence for front curve mold sections according with the present invention.

FIG. 32 shows a front curve SX-V3 initialization or home sequence 275', which is similar to the back curve and the primary package SX-V3 home sequence 275, described in connection with FIG. 21. Comparing FIGS. 21 and 32, it is seen that steps s174 and s175 of the back curve and primary package sequence 275 (FIG. 21) are deleted in the front curve sequence 275' shown in FIG. 32. That is, the front curve SX-V3 home sequence 275' begins with step s178', and ends with step s198' similar to a description given in connection with the back curve and primary package sequence 275, shown in FIG. 21.

Additional steps s442, s446 and s448 are included in the front curve SX-V3 home sequence 275'. More particularly, if the SX-V3 in not in the mold in step s180', then path p440 is followed to step s442. In step s442, the central processor ascertains the status of the Cambot safe limit switch X18, as performed in step s68 of the back curve Cambot run sequence 152, shown in FIG. 16. If this switch X18 is off, then path p444 is followed to step s446, where an appropriate error message is displayed and the front curve transfer assembly 40' is shut down until error correction by manual intervention, for example.

If in step s442, the Cambot safe limit switch X18 in on, then the front curve SX-V3 home sequence 275' continues to step s448. In step s448, the central processor ascertains the status of a Cambot rotate forward switch X7. If this switch X7 is off then path p450 is followed the step s446 where the error message is displayed. Otherwise, if the Cambot rotate forward switch X7 is on, indicating the Cambot arm 112' is flipped to the up position in the direction of the SX-V3 plate 62', then the front curve SX-V3 home sequence 275' proceeds from step s448 to step s195'. Thereafter, the front curve SX-V3 home sequence 275' proceeds following identical steps as the back curve and primary package SX-V3 home sequence 275', shown in FIG. 21.

This completes description of sequences associated with handling the front curve molded articles 22, upon their removal from the molding machine 10.

(C) Transportation of Primary Packaging Base Members

Figure 33:
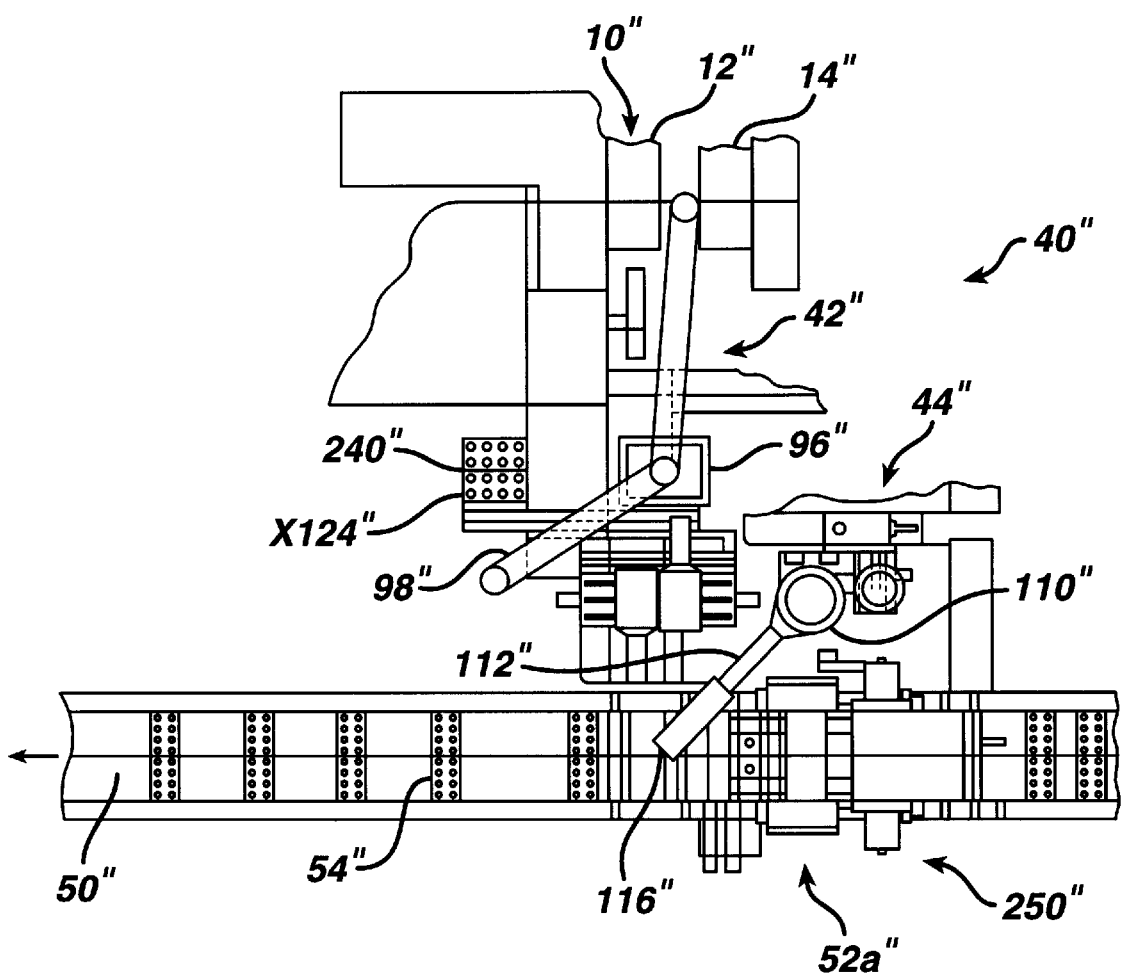
FIG. 33 illustrates a schematic plan view of a primary package transport apparatus according with the present invention.

FIGS. 32 and 33 show an apparatus 40" used for transporting primary packaging base members 30 (FIG. 5) from another molding machine 10", which is similar to the back and front curve molding machines 10, 10', shown in FIGS. 6–7 and 25–26. Elements in FIGS. 33–34, which are similar to their counter parts in FIGS. 6–7 and 25–26, are designated by a adding a double prime to the elements in FIGS. 6–7.

As shown in FIG. 5, the base members 30 of the primary packages for the contact lenses, for example, have a generally flat flange 180 and a depending tab 182 at one end thereof. A cavity 184 is molded in the flat flange 180 for receiving and sealingly storing a molded contact lens therein while immersed in an isotonic saline solution.

Figure 34:
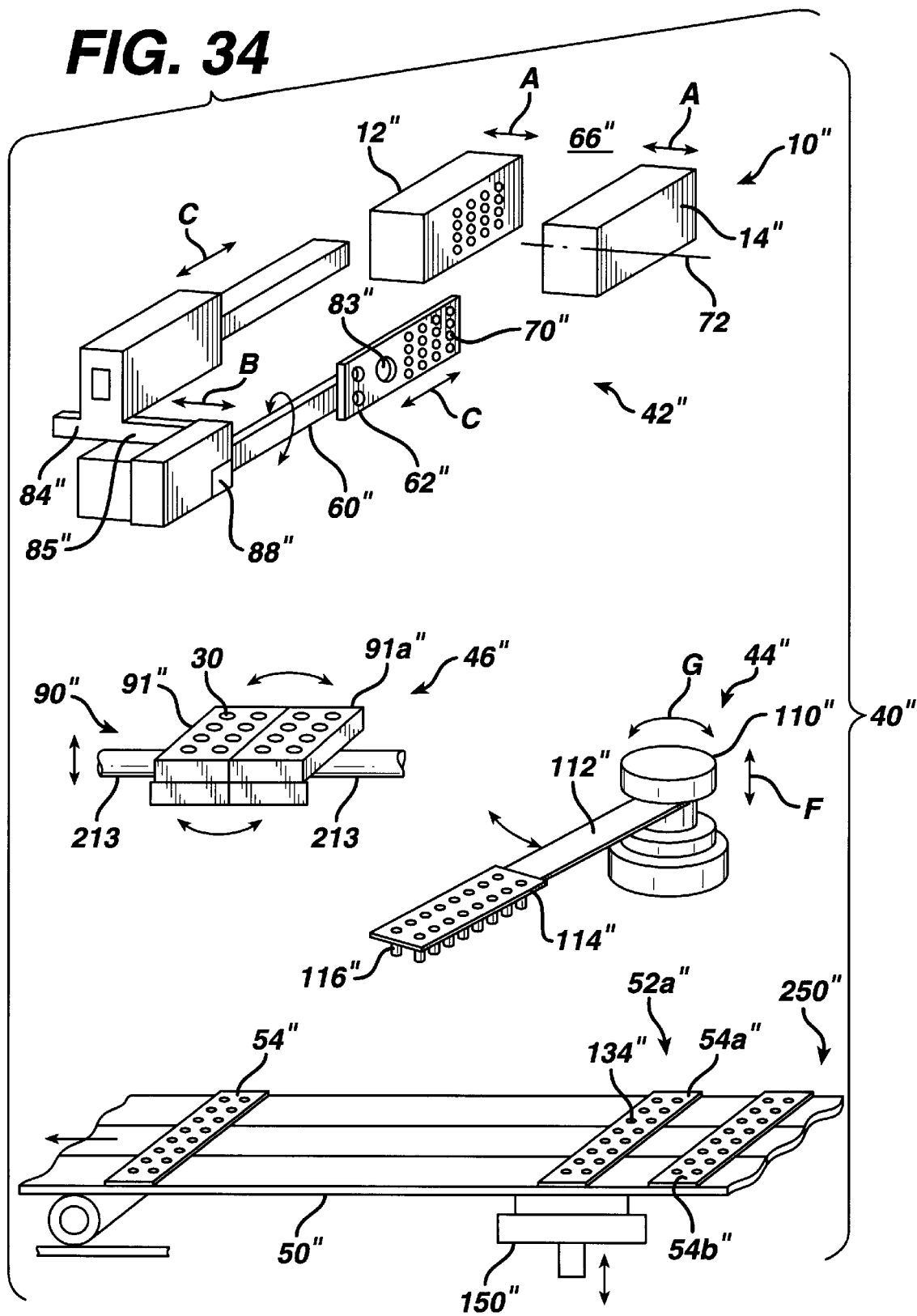
FIG. 34 illustrates a diagrammatic perspective view of the apparatus of FIG. 33 according with the present invention.

As shown in FIG. 34, the SX-V3 plate 62" has somewhat larger sized and spaced apart suction cups 70" than corresponding plates used for retrieving base and front curve mold sections 20, 22. The SX-V3 42" moves through identical movements s1–s7 shown in FIG. 8 to remove primary package molds from the molding machine 10", by vacuum attachment to the vertical plates 62", and place the primary package molds 30 in a horizontal orientation at the SX-V3 parts release location 46".

Prior to pick up by the primary package Cambot 44", the SX-V3 42" performs a set of movements 1–7, shown in FIG. 8. This places a set of primary package molds 30 onto a nest 90" at the SX-V3 parts release location 46". Similar to the nest 90 of the base curve mold transfer assembly 40 shown in FIG. 7, the nest 90" is raised to receive the primary package molds 30 from the SX-V3 suction cups 70". Note, molding machine 10" and SX-V3 suction cups 70" hold a 4×4 array of primary package molds 30. Thus, the SX-V3 suction cups 70" are arranged in a 4×4 array. This is in contrast to the base curve and front curve molding machines and SX-V3 suction cups, where the array of base or front curve sections is a 2×4 array. The 4×4 array of primary package molds 30 may be considered as two 2×4 arrays, shown as reference numerals 91" and 91a" in FIGS. 34–36.

Similar to the SX-V3 4×4 array of suction cups 70", the nest 90" has an array of recesses so as to be able to receive the 4×4 array of primary package or blister package base members 30 (FIG. 5), which are deposited in a single passe of the SX-V3 arm 60" after removing them from the molding machine 10". The two 2×4 primary package arrays 90", 90a" are then hydraulically or pneumatically re-spaced through various drives and cylinders, such as drive 213, shown in FIGS. 35, 36 by rotation about 90° and repositioning, e.g., from two 2×4 arrays into a single 2×8 array, in specific alignment so as to enable pick up by the Cambot suction cups 116" positioned on Cambot head plate 114".

The Cambot 44" transfers the 2×8 array of blister packages 30 from the nest 90" to a pallet 54a" located in a Cambot parts release area 52" on a conveyor belt 50", as shown in FIGS. 34, 13, 18 and 19. This transfer occurs by moving the Cambot 44" through movements c1–c7, which are identical to movements of the base curve Cambot described in connection with FIG. 13. Note, a 2×8 array of blister packages 30 is being transferred, instead of a 2×4 array of back or front curve molds 20, 22, for example, the pallet 54" and conveyor belt 50" have a different size from corresponding ones in the back and front curve transfer assemblies 40, 40' shown in FIGS. 6–7 and 25–26.

As described in connection with FIGS. 18–19, the pallets 54" sequentially advance along the conveyor belt 50", which is also motor-driven by drive 118 in a manner similar to that described in connection with FIGS. 14–15. The leading pallet 54a" is raised by lift 150" (FIG. 34) to the Cambot parts release location (which is similar to location 52 shown in FIG. 13), while the Cambot arm 112" is lowered by 3 inches, for example. The Cambot releases the vacuum in its cups 116" and generates a slight super-atmospheric blow off condition so as to cause the molded articles 30 to be deposited onto recesses 134" in the pallets 54a" for further advance towards downstream processing stations. Note, unlike the base or front curves 20, 22, there is no need to transfer the primary packages 30 to a nitrogen chamber. However, if desired a nitrogen chamber may be included downstream from the primary package transfer assemble 40.

As with the base and front curve transfer assemblies 40, 40', the primary package assembly 40" also enable taking samples using the sample pallet 240", in an identical manner described in connection with FIG. 23–24.

Figure 37A:
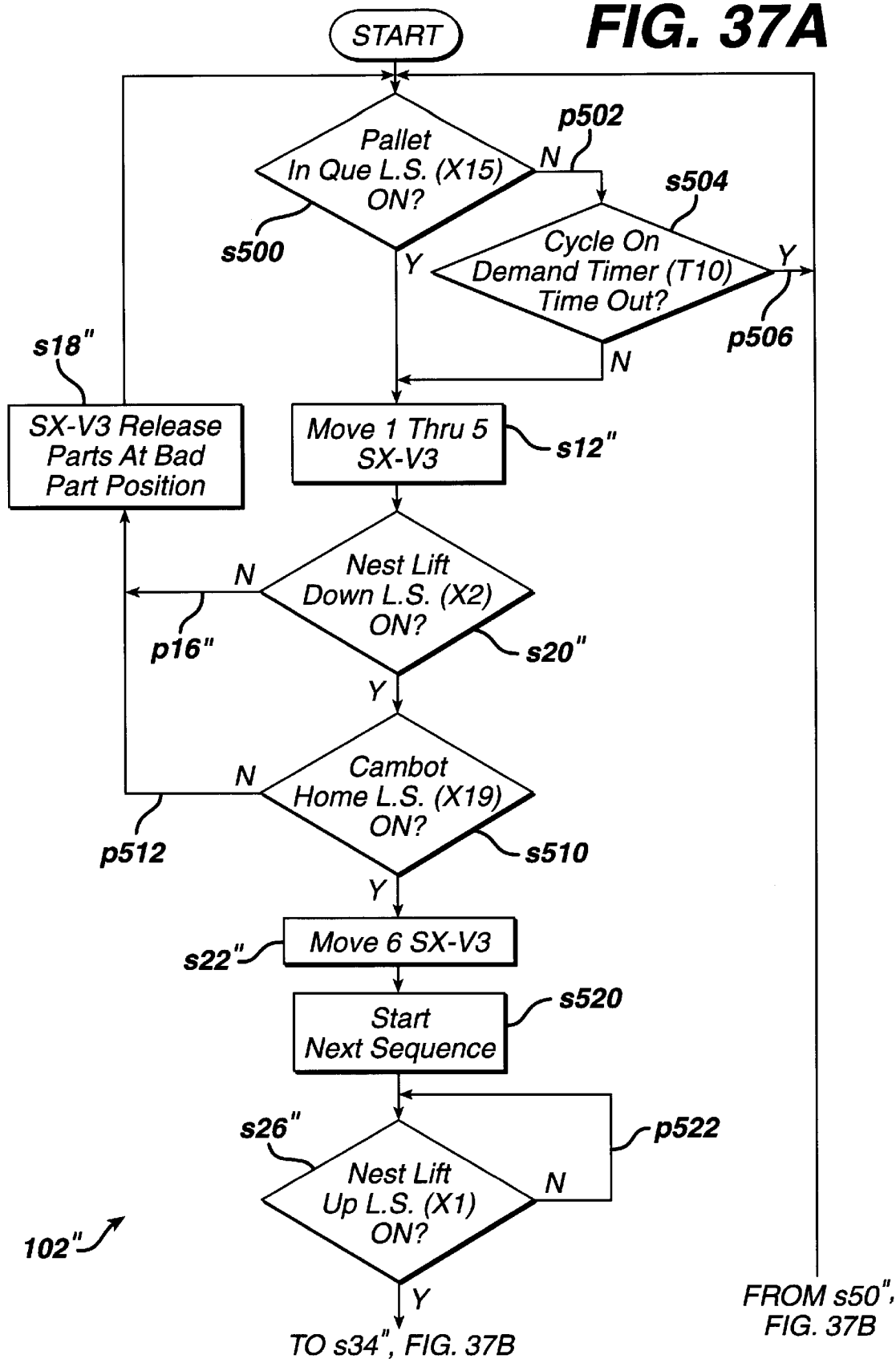
FIG. 37 illustrates a flow chart of a robotic arm automatic sequence to transport primary package molds according with the present invention.
Figure 37B:
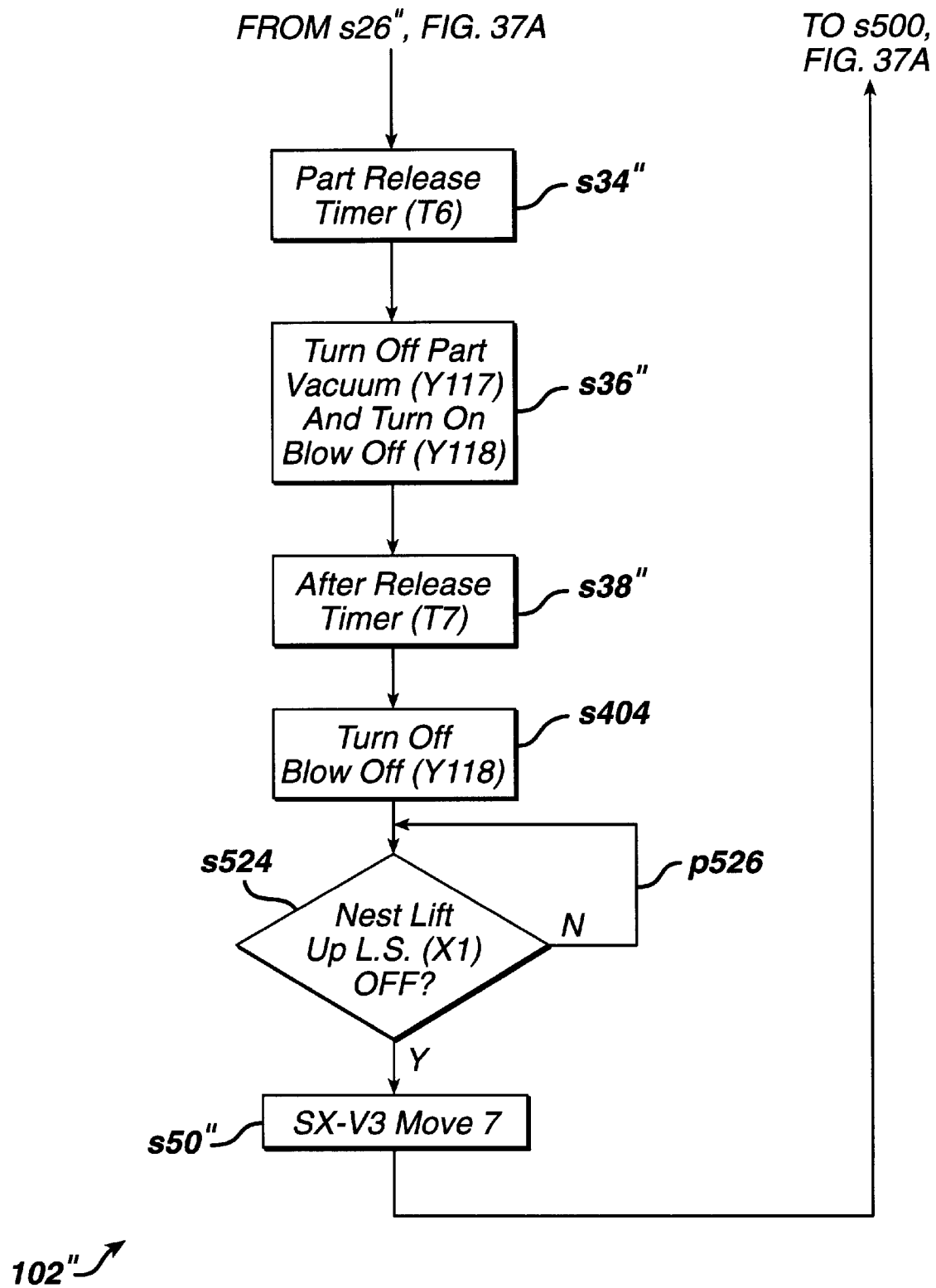

FIG. 37 shows an SX-V3 automatic sequence 102" for transfer of the primary package base molds 30. The primary package SX-V3 auto sequence 102" has similar steps as the base and front curves SX-V3 auto sequences 102, 102', shown in FIGS. 12 and 28, respectively. However, in contrast to the base and front curves SX-V3 auto sequences 102, 102', the primary package SX-V3 auto sequence 102" has a cycle on demand loop, also referred to as a standby mode, as will become apparent.

The primary package SX-V3 auto sequence 102" begins by ascertaining the status of the pallet in que limit switch X15, in step s500, which is similar to step s14 of the base curve SX-V3 auto sequence 102, shown in FIG. 12. If this switch X15 is off, indicating there is no pallet 54b" at the que location 250" (FIG. 34), then the primary package transfer apparatus 40" is stopped, including the molding machine 10", the SX-V3 robot 42" and the Cambot 44", and path p502 is followed to step s504. In step s504, a timer T10 is activated to stop processing if needed.

This allows the pallet 54" to reach the Cambot pre-parts release position 52a".

If timer T10 has timed out in step s504, then path p506 is followed back the step s500. The loop that includes step s500, path p502, step s504 and path p506 back to step s500, is the cycle on demand loop, where essentially the primary package transfer apparatus 40" is stopped, until a pallet reaches the que location 250" (FIG. 34). Although the primary package transfer apparatus 40" is stopped during the cycle on demand or standby loop, it is in a ready state to resume operation, when a pallet reaches the que location 250".

In this ready state, the SX-V3 is in its waiting position 68 (FIG. 8) ready to go into the molding machine 10", which is stopped with its two elements 12", 14" separated and holding a 4×4 array of primary packages 30. Further, in the ready state, the Cambot is in its home position (which is similar to position 104 shown in FIG. 13); the nest 9011 is empty; and the pallet 54a" is raised by lift 150" to the Cambot parts release position (which is similar to position 52 shown in FIG. 13), ready to receive primary packages upon resumption of operation, which occurs when a pallet 54b" reaches the que position 250" (FIG. 34).

When a pallet reaches the que location 250", which turns on the pallet in que limit switch X15. This turns on the primary package transfer apparatus 40" to resume operation, and allows the primary package SX-V3 auto sequence 102" to proceed from step s500 to step s12".

Stopping operation of the primary package transfer apparatus 40" and entering the standby mode, prevents fabrication of primary packages, which would otherwise be discarded, since there is no pallet on the conveyor belt 50" to receive those primary packages. Thus, the cycle on demand mode (which operates the primary package transfer apparatus 40" when a pallet reaches the que location 250", and turns it off otherwise) prevents forming and discarding primary packages.

If timer T10 has not timed out in step s504, then the primary package SX-V3 auto sequence 102" proceeds to step s12", which is also the step performed when the pallet in que limit switch X15 is on in step s500.

Steps s12", s20", s18" are identical to counterpart step in the base curve SX-V3 auto sequence 102 of FIG. 12. More particularly, in step s12", the SX-V3 moves through movements 1–5, shown in FIG. 8, and removes primary packages 30 from the molding machine 10". In step s20", the central processor ascertains the status of the nest lift down limit switch X2. If it is off, indicating the nest 90" is not down, then path 16" is followed and, in step s18", the SX-V3 releases the primary packages 30 at the bad parts position 96" for discarding through the vacuum tube 98", shown in FIG. 33. Next, the SX-V3 auto sequence 102" returns to its beginning at step s500.

If the nest lift down limit switch X2 is on, indicating the nest 90" is down, then in step s510, the central processor ascertains the status of the Cambot home limit switch X19. If this switch X19 is off, then path p512 is followed to step s18", where the SX-V3 releases the primary packages 30 at the bad part position 96" (FIG. 33) and returns to the beginning of the sequence.

If the Cambot home limit switch X19 is on, indicating the nest 90" is down, indicating that the Cambot is at its home position 104 (FIG. 13), then in step s22", the SX-V3 moves to the parts release position 46" through movement 6 described in connection with FIG. 8. Note, the Cambot is at its home position 104 is the Cambot arm 112" position shown in FIGS. 33–34, approximately midway along the lateral direction G between the SX-V3 parts release position 46" and the Cambot parts release position 52".

After step s22", where the SX-V3 is in the parts release position 46", a nest sequence 285 is executed in step s520. The nest sequence 285, as will be described in connection with FIGS. 35–36, rotates and raises the nest 90" for alignment with the SX-V3 suction cups 40" at the SX-V3 parts release position 46". Next in step s26", the central processor ascertains the status of the nest lift up limit switch X1. If this switch X1 is off, then path p522 followed to return to step s26" until the nest is raised (due to execution of the nest sequence 285 in step s520) and the switch X1 turns on.

When the nest lift up limit switch X1 turns on, then in step s34", a delay timer T6 is activated to provide a programmable delay as needed to hold the SX-V3 plate 62" and the nest 90" at the part release location 46". Next in step s36", the vacuum of the SX-V3 cups 70" is turned off, by turning off the vacuum switch Y117, and pressurized air is applied, by turning on the blow off switch Y118, to blow off the primary packages 30 to the nest 90", which is raised to receive them. In step s38", the after release timer T7 is activated to provide a programmable delay prior to turning off switch Y118 to turn off the SX-V3 pressurized air, as needed, for transferring the primary packages 30 from the SX-V3 to the nest. In step s40", the blow off air of the SX-V3, i.e., switch Y118, is turned off.

The nest is lowered once it receives the primary packages 30 from the SX-V3. In step s524, the central processor ascertains the statues of the nest lift up limit switch X1, where path p526 is followed back to step s524, until this switch X1 turns off, indicating the nest is no longer in the up position. Next, in the s50", the SX-V3 arm 60" moves back to its waiting position 68 though movement 7, which is a compound movement that includes rotation along direction D to position the SX-V3 plate 62" in a vertical position, for insertion into the opening 66" of the molding machine 10". This completes one cycle of the primary package SX-V3 auto sequence 102", which is repeated by returning to its first step s500.

Figure 38A:
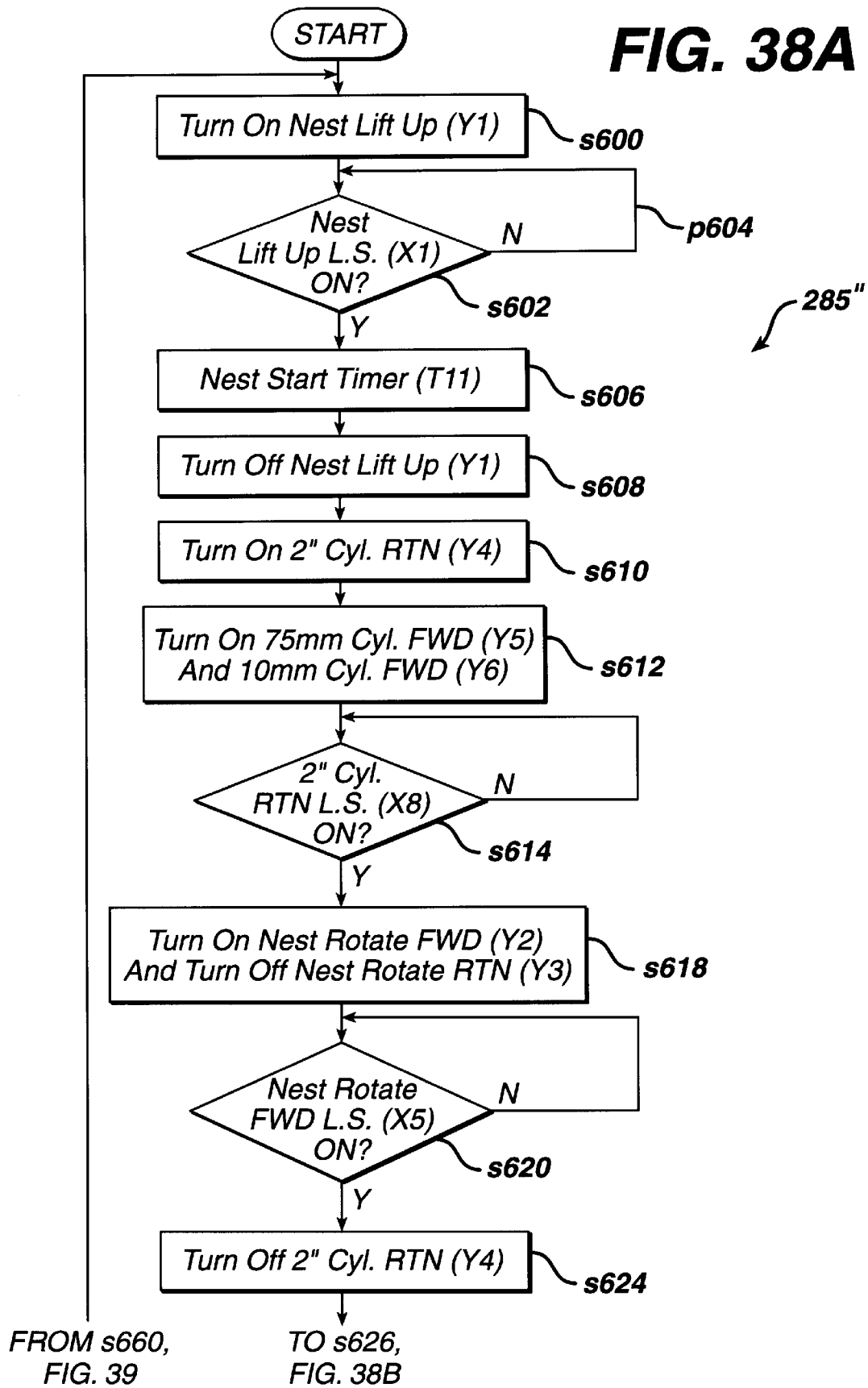
FIGS. 38 and 39 illustrate a flow chart of a nest sequence to transfer primary package mold sections according with the present invention.
Figure 38B:
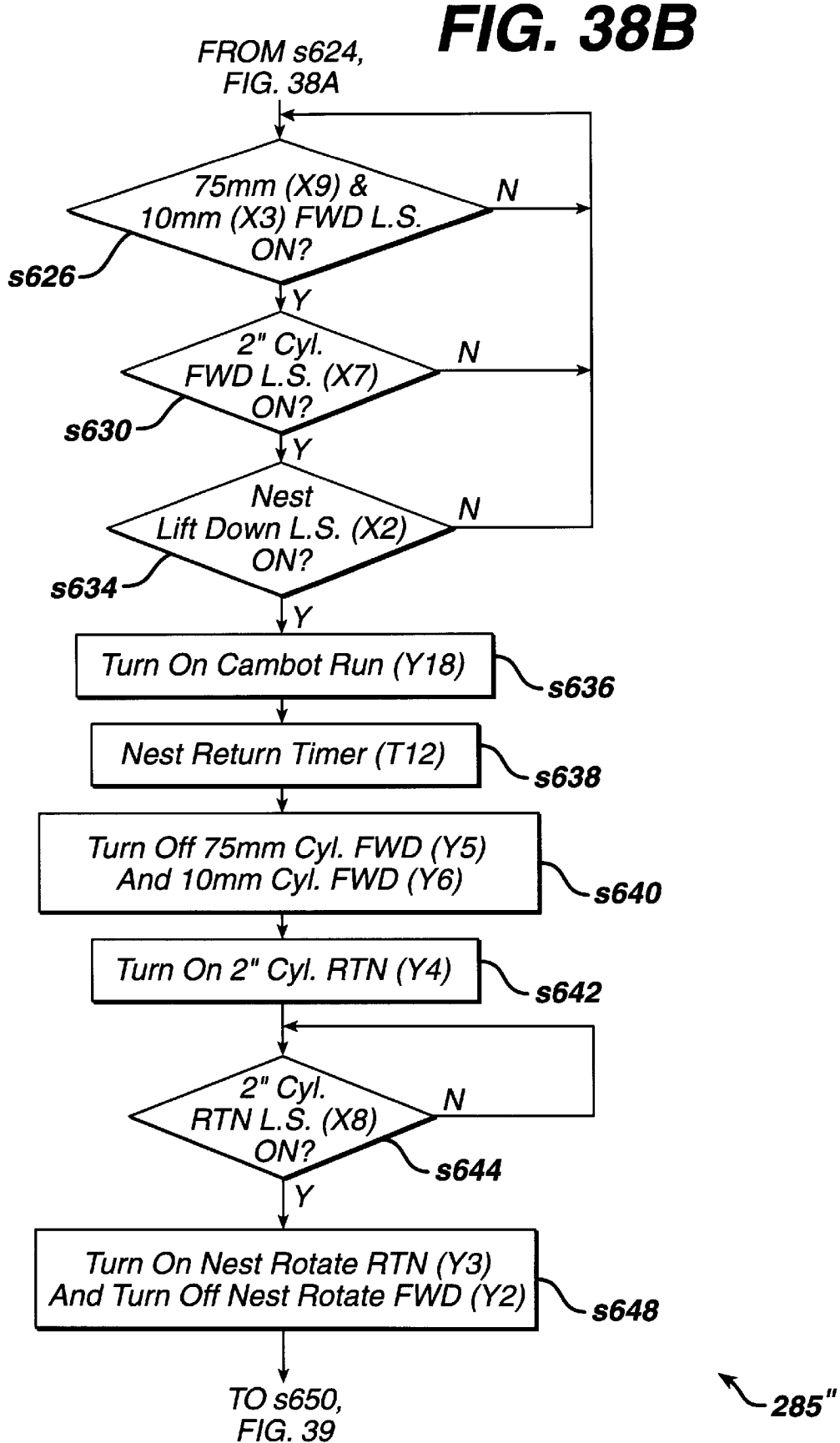
Figure 39:
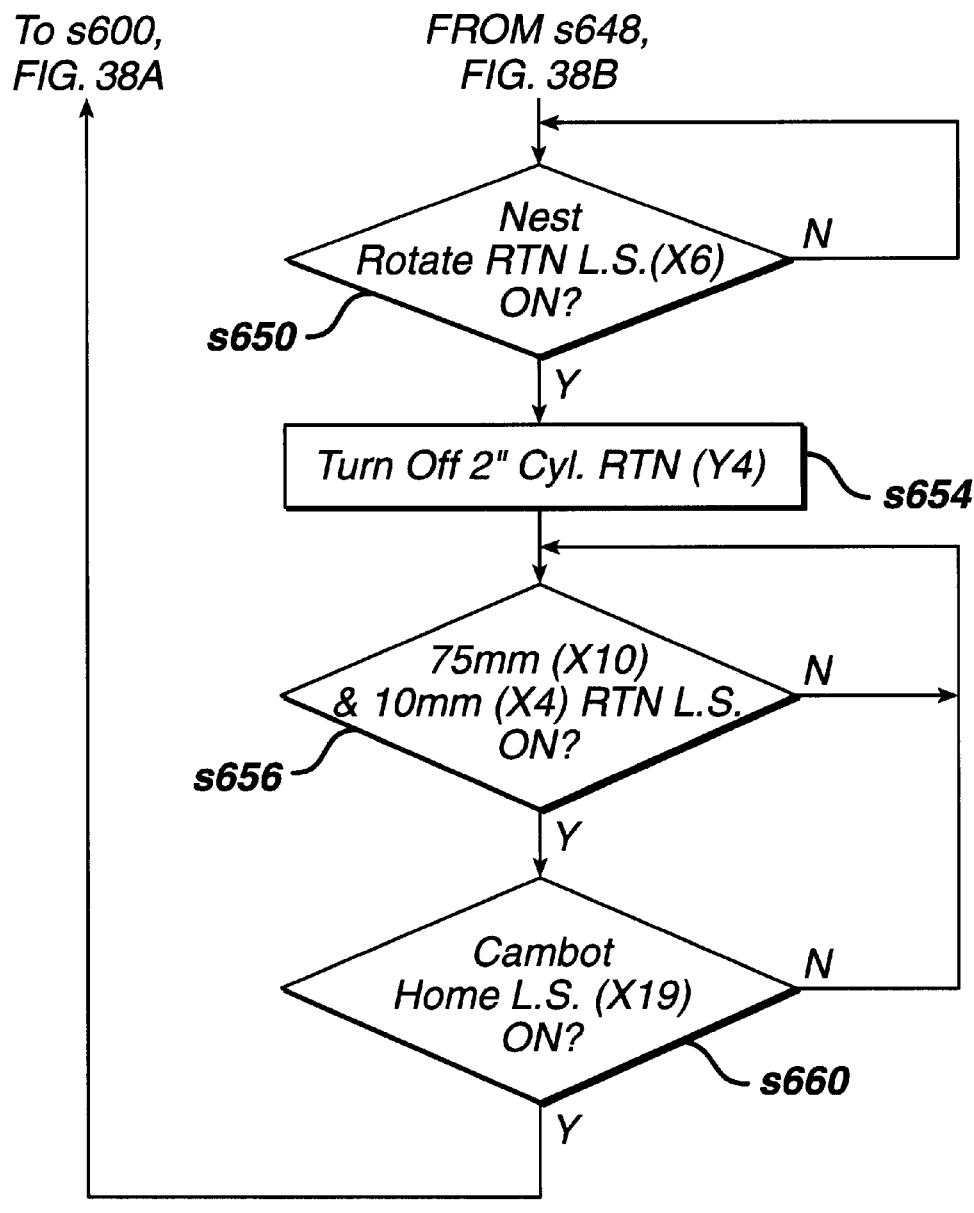

FIG. 38–39 show the nest sequence 285, which is performed in step s520 of the primary package SX-V3 auto sequence 102", shown in FIG. 37. The central processor starts the primary package nest sequence 285 by turning on the nest lift up switch Y1 to raise the nest 90", similar to that described in connection with step s24 in the SX-V3 base curve auto sequence 102, shown in FIG. 12. Next in step s604, the central processor ascertains the status of the nest lift up limit switch X1, as performed in step s12, shown in FIG. 12. If this switch X1 is not on, then path p604 is followed to beginning of step s602.

When the nest lift up limit switch X1 in on, indicating the nest 90" is in the upper position, then in step s606, a nest start timer T1 provides a programmable delay for the nest 90" to remain in the raised position for receiving the primary packages 30.

Figure 35:
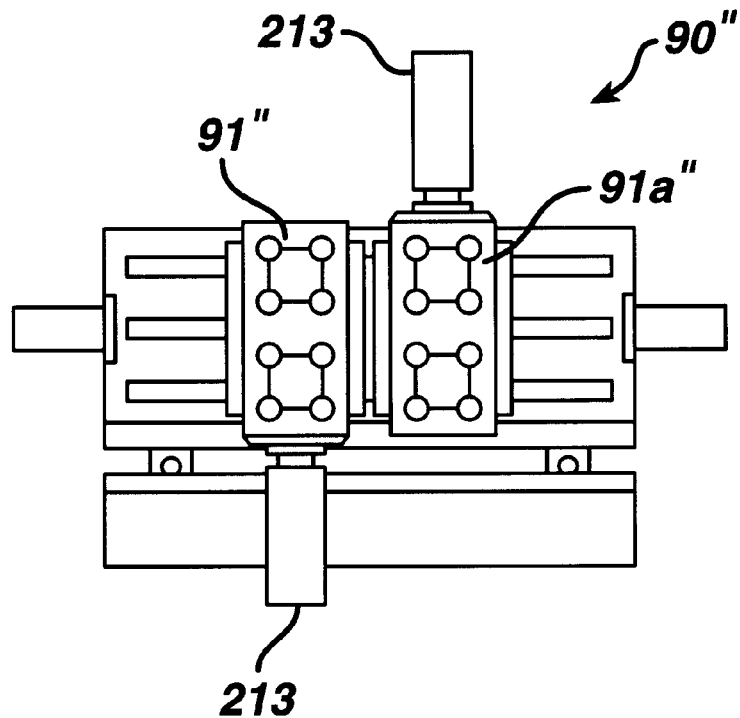
FIGS. 35 and 36 illustrates plan views of a device for rearranging arrays of the primary package molds received from a robotic arm transfer assembly in a first orientation and adapted to be picked up by a cam-controlled arm transfer assembly in a second orientation for further conveyance.
Figure 36:
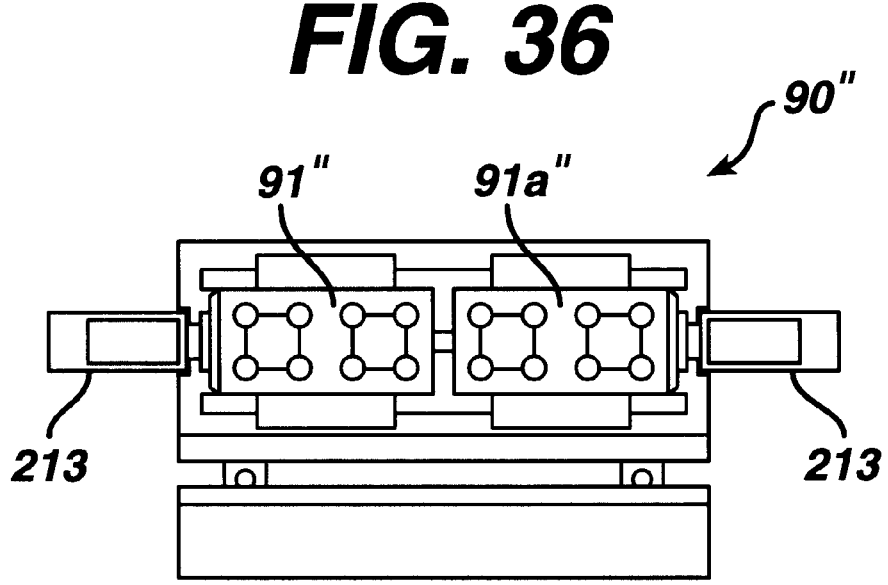

After transfer of the primary packages to the nest 90" using the SX-V3 42", then in step s608, the nest lift up switch Y1 is turned off, thus lowering the nest 90. The following steps s610, s612, s614, s618, s620, s624, s626, s630, s634 activate three pairs of cylinders, e.g., 2", 75 mm and 10 mm cylinders, to rotate the primary packages from two 2×4 arrays, shown in FIG. 35, to a single array of 2×8, as shown in FIG. 36. An additional pair of cylinders is also activated to re-space the primary packages closer together. Note, the two inch cylinder is shown in FIGS. 35, 36 as reference numeral 213. The status of appropriate switches are also checked during those steps to confirm that the primary packages have been resized and re-spaced properly into a tightly packed single 2×8 array, which matches the suction cups 116" of the primary package Cambot plate 114" (FIG. 34).

In step s636, the central processor turns on the Cambot run switch Y18 to activate a Cambot run sequence 152", to be described in connection with FIG. 40, where the Cambot transfers the primary package from the SX-V3 parts release location 46", contained on the nest 90" to the Cambot parts release location 52" on the conveyor belt 50".

In step s638, a nest return timer T12 provides a programmable delay, to allow the Cambot to pick up the primary packages from the nest 90" and move away therefrom. In steps s640 to s656, the cylinders returns to a position to receive the next set of primary packages in the next cycle.

In step s660 shown in FIG. 39, which is the last step in primary package nest sequence 285, the central processor ascertains that the Cambot has moved away from the nest toward its home position 104, shown in FIG. 13. When the Cambot home limit switch X19 is on, i.e., the Cambot is at its home position 104 (FIG. 13) where it is safe to raise the nest 90" up to the SX-V3 parts release position 46" (for receiving the next set of primary packages in the next cycle), then the nest sequence 285 repeats itself by returning the step s600 (FIG. 38), and the nest 90" is raised to begin the next cycle.

Figure 40A:
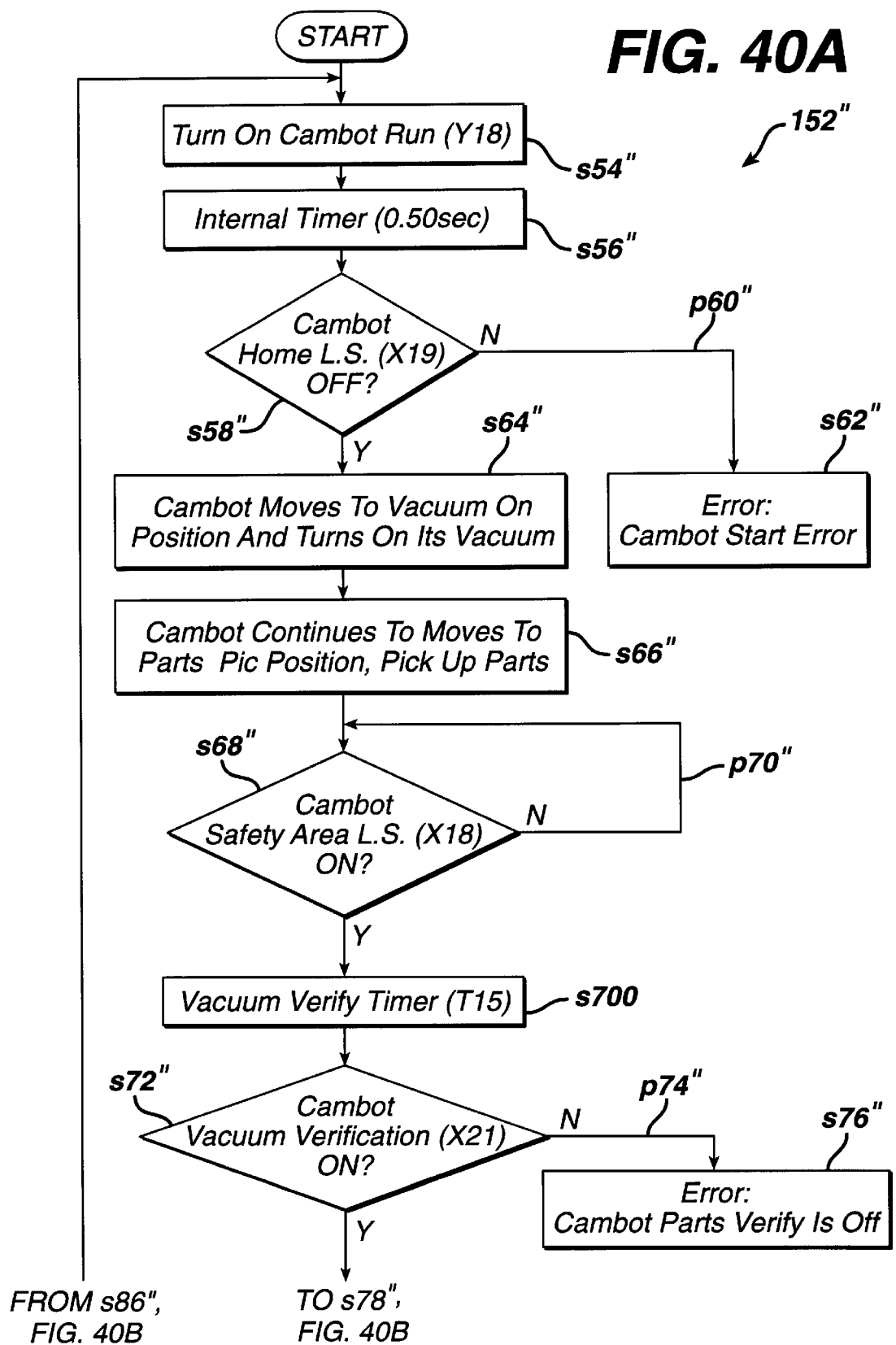
FIG. 40 illustrates a flow chart of a cam-controlled arm automatic sequence to transport primary package mold sections according with the present invention.
Figure 40B:
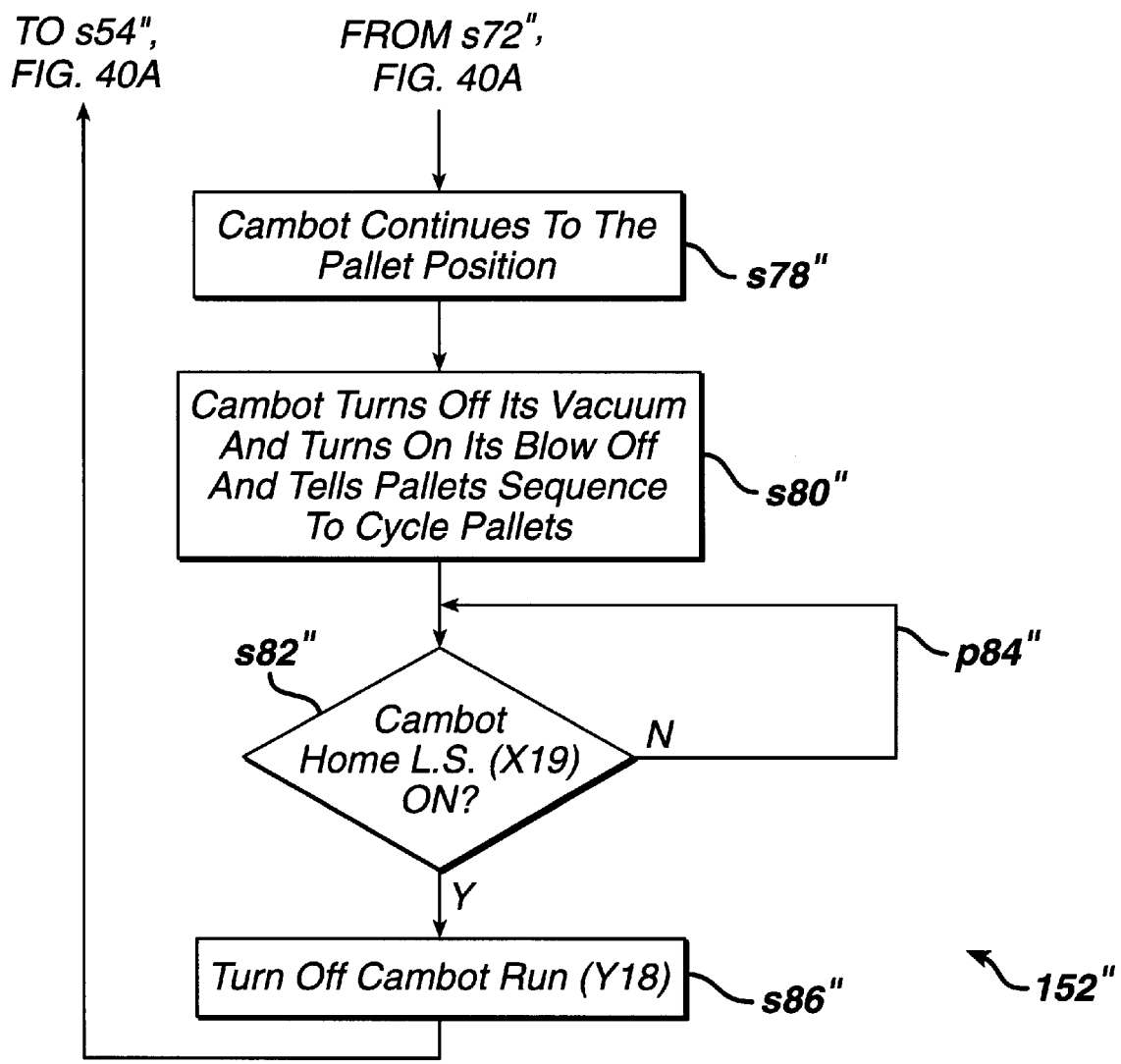

FIG. 40 shows a primary package Cambot sequence 152", which is identical in every respect to the base curve Cambot sequence 152, shown in FIG. 16, with an additional step s700. In Step s700, which is between steps s68" and s72", a vacuum verify timer T15 is activated to provide a programmable delay as needed.

Figure 41A:
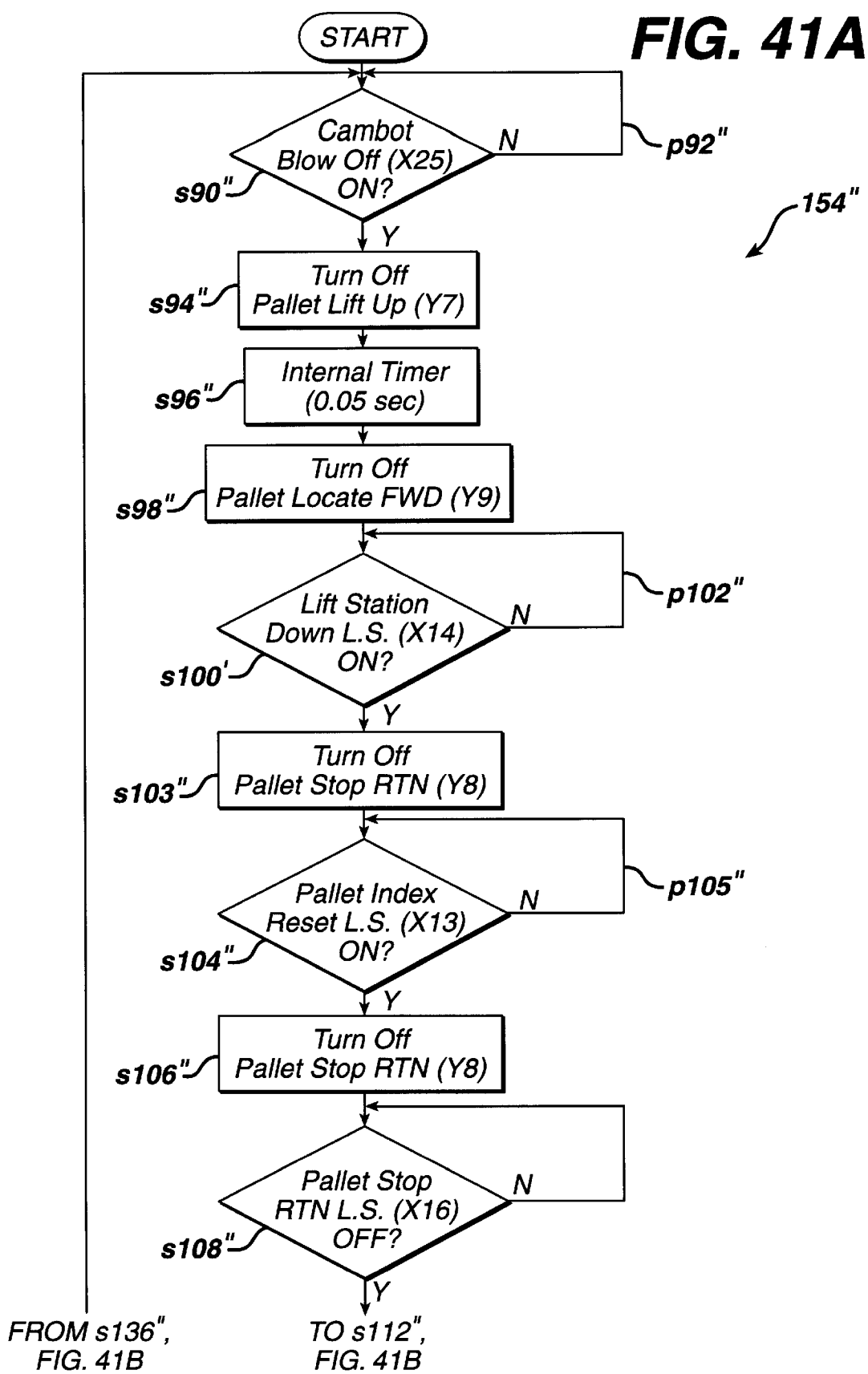
FIG. 41 illustrates a flow chart of an automatic sequence to transfer primary package mold sections according with the present invention.
Figure 41B:
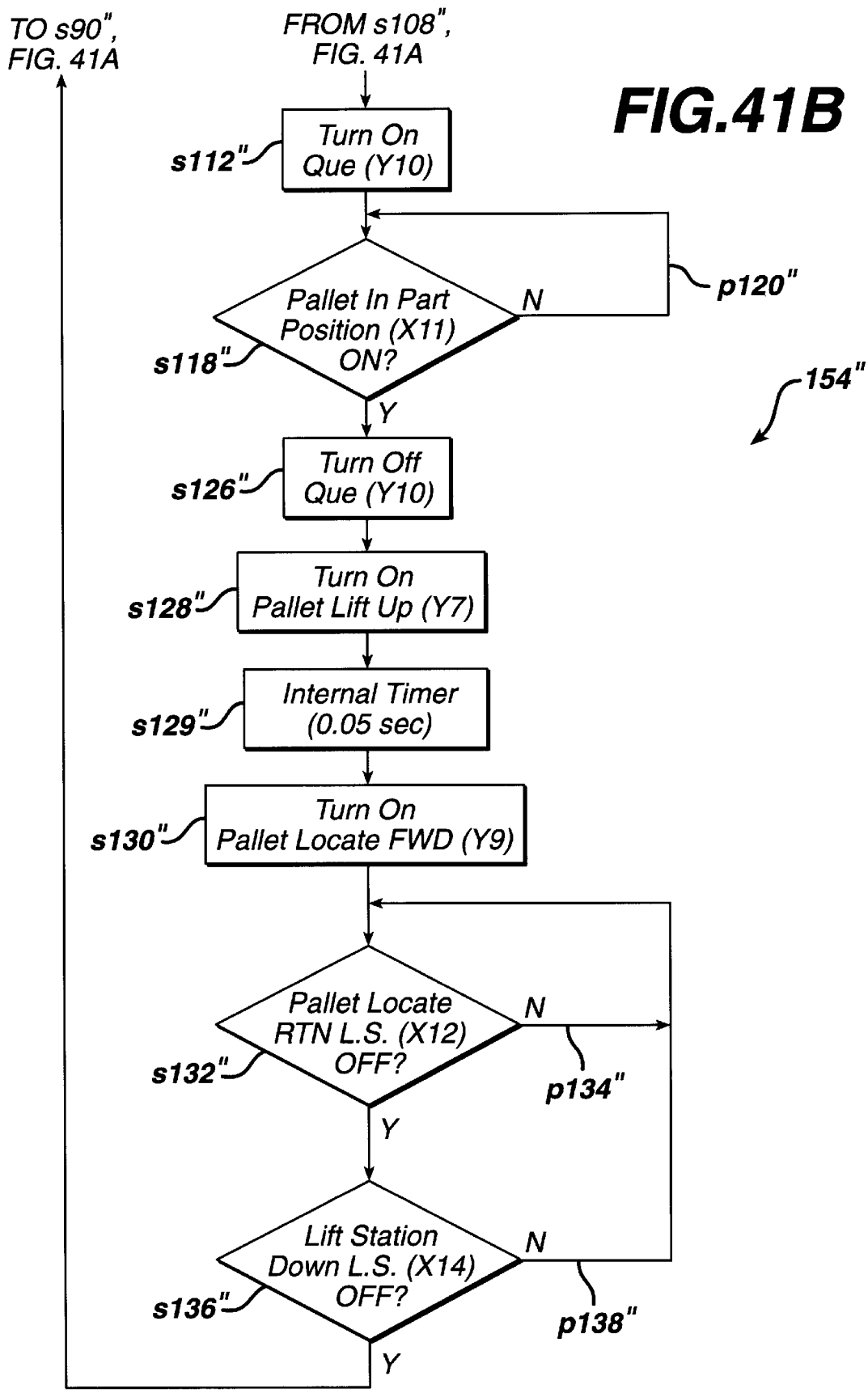

FIG. 41 shows a primary package transfer auto sequence 154", which is identical in every respect to the base/front curves transfer auto sequence 154, shown in FIG. 17, except that the following steps shown in FIG. 17 are deleted in FIG. 41; steps s114, s116, s122, s124. Accordingly, the description of the base/front curves transfer auto sequence 154 (FIG. 17) is equally applicable to the primary package transfer auto sequence 154' of FIG. 41.

FIG. 42 and 43 show racetrack mode sequences 310, 310', which are identical except for their last steps, namely, step s810 shown in FIG. 42, and step s812 shown in FIG. 43. FIG. 42 is the racetrack mode sequence 310 for the primary package molds 30, and FIG. 43 is the racetrack mode sequence 310' for the base and front curve molds 20, 22. In the racetrack mode, molded articles are not placed onto the pallets, for example, due to an error in the transfer assemblies 40, 40', 40". The racetrack mode is entered to prevent shut down of other assemblies associated with the manufacture and packaging of contact lenses, for example. Thus in the racetrack mode, the pallets continue to move down the conveyor belt into downstream processing station without containing any molded articles.

In describing the racetrack mode, for brevity, the primary package racetrack sequence 310, shown in FIG. 42 is described in association with the primary package transfer assembly 40", shown in FIGS. 33–34, is referred to. However, it is understood that the description is equally applicable to the back and front curve racetrack sequence 310', shown in FIG. 43, associated with the back and front curve transfer assemblies 40, 40', shown in FIGS. 6–7 and FIGS. 25–26, respectively. In the racetrack mode first step s800 shown in FIG. 42, which has its counterpart s800' in FIG. 43, the SX-V3 moves to the reject position 96" and discards any molded articles carried on the SX-V3 suction cups 70".

In step s802, the central processor turns off the pallet lift up switch Y7, which lowers lift 150, shown in FIG. 19. In step s804, the pallet locate forward switch Y9 is turned off to separate the pallet locate cylinders 254 as shown by the dotted cylinders 254 in FIG. 18, and described in connection with step s98 of the base and front curve transfer auto sequence 154, shown in FIG. 17.

In step s806 the pallet step return switch Y8 is turned off to move the pallet stops 252 away from each other, as shown by the dotted stops 252 in FIG. 18. Since both the pallet stops 252 and locate cylinders 254 are separated from each other, as shown by the dotted positions in FIG. 18, and the lift 150 is low, the pallet are free to move from the Cambot pre-parts release position 52a to downstream processing stations.

In step s808, the que switch Y10 is turned on. As described in connection with step s112 shown in FIG. 17, this moves the upstream que stoppers 258 toward each other from its position shown as solid lines in FIG. 18, to a position shown as dashed lines for holding the upstream pallet 54c and preventing its movement. In step s810, the central processor turns on a que lift up switch Y11. This flips both the downstream and upstream que stoppers 256, 258 out of the way so that pallet can move downstream on the conveyor belt without hindrance.

As stated, the only difference between the two racetrack mode sequences 310, 310' is the last step. Comparing the two last steps s810, s812, shown in FIGS. 42–43, indicates the same switch Y11 is activated. However, as described in the previous paragraph in connection with step s810, this switch Y11 is the que lift up switch. In contrast for the case of base and front curves transfer assemblies, switch Y11 is the que stopper return switch described in connection with step s116 (and step s122) of the base and front curves transfer auto sequence 154, shown in FIG. 17. Similar to step s116 (FIG. 17), the last step s812 of the base and front curves racetrack sequence 310', the central processor turns on the que stopper return switch Y11 to release the downstream pallet 54b in the que shown in FIG. 18, where the downstream que stoppers 256 are moved away from each other, shown by the dashed lines.

Alternatively in step s808', instead of turning on the que switch Y10 to hold the upstream pallet 54c (FIG. 13), this switch Y10 is turned off in step s808'. This releases the upstream pallet 54c, and upon release of the downstream pallet 54b, the pallets move downstream unhindered, similar to the pallet unhindered movement in the primary package assembly 40'', as described in connection with step s810 of the primary package racetrack sequence 310 (FIG. 39).

From the foregoing, it becomes readily apparent that the present invention is a simplified automatic method that increases speed of operation of assemblies for transferring and transporting of high quality molded articles. The increased speed, as well as better and faster synchronization and communication among the various assemblies is achieved by the central processor that replacing various programmable logic controllers (PLCs). This provides fast and smooth transfer of the molded articles among the various assemblies, and minimizes vibration which would exert a deleterious effect on the quality of the articles being produced.

In addition, the computer controlled method provides flexibility in fine tuning and modifying the various steps as needed, with minimal or no hardware changes. Rather, instructions executed by the computer are changed to modify desired steps. In addition, the computer controlled method allows use of state of the art components, such as incremental encoders that provide exact location of the SX-V3 robotic arm, for example, servo motors that precisely move various elements to desired locations. In addition, closed loop control circuits may be used to increase accuracy and stability of various steps, such as steps involving transfer and movement.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A central processor controlled method for removing and transporting mold sections for fabricating ophthalmic lens from a molding device to an inert chamber in a predetermined time comprising the steps of:
    starting a timer upon opening the molding device and exposing the mold sections to continuously measure exposure time of the mold sections;
    actuating a robotic arm to transport the mold sections from the molding device to an intermediate position;
    actuating a cam-controlled arm to move the cam-controlled arm to a predetermined position to pick the molded sections to transport the mold sections from the intermediate position to a pallet held on a conveyor belt at a cam-arm pre-part release location; and
    releasing the pallet to move on the conveyor belt to the inert chamber.

2. The method of claim 1, wherein the robotic arm actuating step includes the steps of:
    accelerating the robotic arm along a curvilinear path from a waiting position to an opening in the molding device in a synchronism with the opening of the molding device, in accordance with acceleration parameters stored in a memory of a central processor; and
    decelerating the robotic arm after an acceleration time stored in the memory, when the robotic arm is approximately in the opening of the molding device, to provide a damping effect for allowing transfer of the mold sections from the molding machine to the robotic arm.

3. The method of claim 1 further comprising raising a nest to receive the mold sections at the intermediate position.

4. The method of claim 3 further comprising the steps of:
    lowering the nest after transfer thereon of the molded sections from the robotic arm; and
    transferring the molded sections from the lowered nest to the cam-controlled arm.

5. The method of claim 3 further comprising actuating cylinders to rotate and re-space the mold sections contained on the nest.

6. The method of claim 1, wherein the cam-controlled arm actuating step includes the steps of:
    moving the cam-controlled arm to the intermediate position; and
    lowering the cam-controlled arm to pick the molded sections from a nest that receives the mold sections from the robotic arm.

7. The method of claim 6, wherein the cam-controlled arm actuating step further includes the steps of:
    raising the cam-controlled arm up to the intermediate position after picking the molded sections from the nest;
    moving the cam-controlled arm to the pallet;
    lowering the cam-controlled arm while raising the pallet from the cam-arm pre-part release location to a cam-arm part release location; and
    transferring the molded sections from the cam-controlled arm to the pallet.

8. The method of claim 1, wherein the cam-controlled arm actuating step includes the steps of:
    moving the cam-controlled arm to a first position aligned with the intermediate position at a center height of the cam-controlled arm which is lower than intermediate position; and
    raising the cam-controlled arm to the intermediate position from first position to pick the molded sections from the robotic arm.

9. The method of claim 8, wherein the cam-controlled arm actuating step further includes the steps of:
    moving the cam-controlled arm down from the intermediate position to the first position after picking the molded sections;
    relocating the cam-controlled arm along the center height to a second position aligned with the cam-arm pre-part release location;
    lowering the cam-controlled arm to a cam-arm part release location;
    raising a pallet from the cam-arm pre-part release location to the cam-arm part release location; and
    transferring the molded sections onto the pallet.

10. The method of claim 9, wherein the relocating step further comprises rotating the cam-controlled arm by approximately 180° around an axis longitudinal thereto.

11. The method of claim 1, prior to the robotic arm actuating step, further comprising initializing the robotic arm for movement to a waiting position ready for removing the molded sections from the molding device, said waiting position being in a collision free zone.

12. The method of claim 1, prior to the cam-controlled arm actuating step, further comprising initializing the cam-controlled arm for movement to a home position which is in a collision free zone.

13. The method of claim 1 further comprising identifying molded articles as unacceptable when the pallet enters the inert chamber in a time that exceeds the predetermined time.

14. The method of claim 1, prior to the pallet releasing step, further comprising actuating a pallet stop device to stop the pallet at the cam-arm pre-part release location.

15. A central processor controlled method for removing and transporting mold sections for fabricating ophthalmic lens from a molding device to an inert chamber in a predetermined time comprising the steps of:

starting a timer upon opening the molding device and exposing the mold sections to continuously measure exposure time of the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location; and releasing the pallet to move on the conveyor belt to the inert chamber;

raising the pallet from the cam-arm pre-part release location to a cam-arm part release location;

transferring the molded sections from the cam-controlled arm to the pallet; and lowering the pallet containing the molded section from the cam-arm part release location to the cam-arm pre-part release location.

16. A central processor controlled method for removing and transporting mold sections for fabricating ophthalmic lens from a molding device to an inert chamber in a predetermined time comprising the steps of:

starting a timer upon opening the molding device and exposing the mold sections to continuously measure exposure time of the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location; and releasing the pallet to move on the conveyor belt to the inert chamber;

actuating a lift to raise the pallet held at the cam-arm pre-part release location in order for the pallet to receive the molded articles from the cam-controlled arm; and actuating a pallet locate device to hold the raised pallet at a cam-arm part release location.

17. A central processor controlled method for removing and transporting mold sections for fabricating ophthalmic lens from a molding device to an inert chamber in a predetermined time comprising the steps of:

starting a timer upon opening the molding device and exposing the mold sections to continuously measure exposure time of the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location; and releasing the pallet to move on the conveyor belt to the inert chamber;

holding a plurality of pallets in a que upstream from the pallet located at the cam-arm pre-part release location; and after the pallet releasing step, releasing said plurality of pallets one at a time.

18. The method of claim 17, wherein the plurality of pallets releasing step includes actuating a cylinder that simultaneously releases a first one of said plurality of pallets in the que and holds a second of said plurality of pallets.

19. The method of claim 17, wherein the plurality of pallets releasing step includes actuating a first cylinder which holds a first one of said plurality of pallets located in the que; and actuating a second cylinder which releases a second one of said plurality of pallets located downstream from said first one pallet.

20. A central processor controlled method for removing and transporting mold sections for fabricating ophthalmic lens from a molding device to an inert chamber in a predetermined time comprising the steps of:

starting a timer upon opening the molding device and exposing the mold sections to continuously measure exposure time of the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location;

releasing the pallet to move on the conveyor belt to the inert chamber; and actuating the robotic arm to transport the mold sections from the molding device to a discard bin for discarding the molding device, while empty pallets move on the conveyor belt to the inert chamber in a racetrack mode.

21. A central processor controlled method for removing and transporting mold sections for fabricating ophthalmic lens from a molding device to an inert chamber in a predetermined time comprising the steps of:

starting a timer upon opening the molding device and exposing the mold sections to continuously measure exposure time of the mold sections;

actuating a robotic arm to transport the mold sections from the molding device to an intermediate position;

actuating a cam-controlled arm to transport the mold sections from the intermediate position to a pallet held on a conveyor belt at a cam-arm pre-part release location;

releasing the pallet to move on the conveyor belt to the inert chamber; and actuating the robotic arm to transport the mold sections from the molding device to a sample pallet located at a discard location.

22. The method of claim 21 further comprising moving the sample pallet from a standby position to the discard location for receiving the mold sections from the robotic arm.

* * * * *